(12) United States Patent
Zhang et al.

(10) Patent No.: US 12,216,899 B2
(45) Date of Patent: Feb. 4, 2025

(54) DISPLAY ELEMENT DISPLAY METHOD AND ELECTRONIC DEVICE

(71) Applicant: HUAWEI TECHNOLOGIES CO., LTD., Guangdong (CN)

(72) Inventors: Yanan Zhang, Shenzhen (CN); Liang Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 17/771,365

(22) PCT Filed: Sep. 23, 2020

(86) PCT No.: PCT/CN2020/117078
§ 371 (c)(1),
(2) Date: Apr. 22, 2022

(87) PCT Pub. No.: WO2021/082815
PCT Pub. Date: May 6, 2021

(65) Prior Publication Data
US 2022/0374123 A1    Nov. 24, 2022

(30) Foreign Application Priority Data
Oct. 30, 2019    (CN) .......................... 201911047159.8

(51) Int. Cl.
*G06F 3/04886*    (2022.01)

(52) U.S. Cl.
CPC ............... *G06F 3/04886* (2013.01); *G06F 2203/04803* (2013.01)

(58) Field of Classification Search
None
See application file for complete search history.

(56) References Cited

U.S. PATENT DOCUMENTS

| 11,079,995 | B1 * | 8/2021 | Hulbert | G06F 3/04845 |
| 11,137,894 | B1 * | 10/2021 | Chen | G06F 3/04855 |
| 11,809,702 | B2 * | 11/2023 | Klein | G06F 1/1692 |
| 2013/0321340 | A1 * | 12/2013 | Seo | H04M 1/724 345/174 |
| 2015/0227298 | A1 | 8/2015 | Kim et al. | |
| 2015/0309691 | A1 * | 10/2015 | Seo | G06F 3/04883 345/173 |
| 2016/0085319 | A1 | 3/2016 | Kim et al. | |

(Continued)

FOREIGN PATENT DOCUMENTS

| CN | 102981715 A | 3/2013 |
| CN | 104348978 A | 2/2015 |

(Continued)

*Primary Examiner* — Cynthia Segura

(57) ABSTRACT

A method includes: The electronic device detects a status of the first body and a status of the second body (301); determines a main interaction area and a main display area based on the status of the first body and the status of the second body (302); obtains one or more display elements on a to-be-displayed user interface (303); determines a display element type, where the display element type includes a main interaction element and a main display element (304); and displays the main interaction element in the main interaction area and displays the main display element in the main display area (306). The method helps a user better operate the electronic device, and also helps the user view content displayed by the electronic device.

16 Claims, 56 Drawing Sheets

(56) References Cited

U.S. PATENT DOCUMENTS

| | | | | |
|---|---|---|---|---|
| 2016/0357221 | A1* | 12/2016 | Huh | G06F 3/04845 |
| 2018/0039387 | A1* | 2/2018 | Cheong | H04W 4/029 |
| 2019/0207933 | A1 | 7/2019 | Kim | |
| 2020/0012324 | A1* | 1/2020 | Sung | G06F 1/1652 |
| 2021/0096611 | A1* | 4/2021 | Schenone | H04N 21/4316 |
| 2021/0097901 | A1* | 4/2021 | Klein | G06F 3/04845 |
| 2021/0105389 | A1* | 4/2021 | Ko | G06F 3/04845 |
| 2021/0181912 | A1* | 6/2021 | Han | G06F 3/0488 |
| 2021/0247805 | A1* | 8/2021 | Min | H04M 1/0243 |
| 2022/0046182 | A1* | 2/2022 | He | G06F 1/1616 |
| 2023/0019876 | A1* | 1/2023 | Yoon | G06F 1/1643 |

FOREIGN PATENT DOCUMENTS

| | | | |
|---|---|---|---|
| CN | 105980953 | A | 9/2016 |
| CN | 107368150 | A | 11/2017 |
| CN | 107688370 | A | 2/2018 |
| CN | 107770440 | A | 3/2018 |
| CN | 107957839 | A | 4/2018 |
| CN | 109542328 | A | 3/2019 |
| CN | 109725683 | A | 5/2019 |
| CN | 110134304 | A | 8/2019 |
| CN | 110286972 | A | 9/2019 |
| CN | 110381282 | A | 10/2019 |
| CN | 110389802 | A | 10/2019 |
| CN | 110955373 | A | 4/2020 |
| EP | 3223113 | A1 | 9/2017 |
| EP | 3521990 | A1 | 8/2019 |
| EP | 3979628 | A1 | 4/2022 |
| JP | 2011227397 | A | 11/2011 |
| JP | 2014511524 | A | 5/2014 |
| JP | 2019505858 | A | 2/2019 |

* cited by examiner

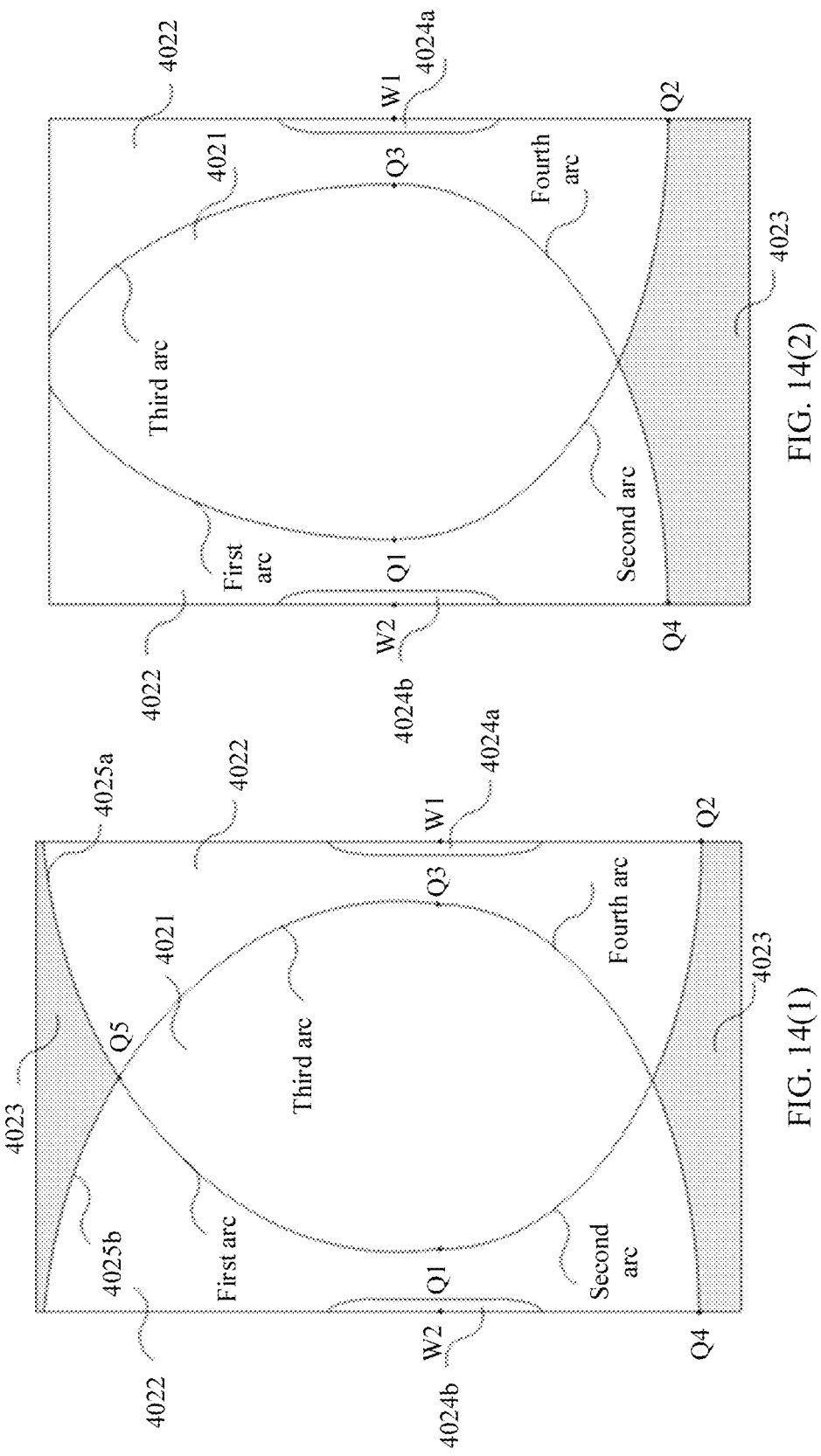

DISPLAY ELEMENT DISPLAY METHOD AND ELECTRONIC DEVICE

CROSS-REFERENCE TO RELATED APPLICATIONS

This application is a National Stage of International Application No. PCT/CN2020/117078 filed on Sep. 23, 2020, which claims priority to Chinese Patent Application No. 201911047159.8, filed on Oct. 30, 2019. Both of the aforementioned applications are hereby incorporated by reference in their entireties.

TECHNICAL FIELD

This application relates to the field of electronic technologies, and in particular, to a display element display method and an electronic device.

BACKGROUND

Touchscreens of electronic devices such as mobile phones and tablets become larger with continuous development of functions of the electronic devices. An electronic device with a relatively large touchscreen can bring better viewing experience to a user, but brings a great challenge to a user operation.

In the conventional technology, to help a user operate an electronic device, the electronic device may detect a gravity direction by using an acceleration sensor, and display a control such as a virtual keyboard on a lower side in the gravity direction. However, accuracy of this method is relatively low. When the electronic device has a foldable screen, postures of the electronic device are different, and controlling display based on only a gravity direction causes poor user experience.

SUMMARY

This application provides a display element display method and an electronic device, to help a user better operate a screen of the electronic device, and also help the user view content displayed by the electronic device.

According to a first aspect, an embodiment of this application provides a display element display method. The method is applied to an electronic device including a first body and a second body. The first body is bendable relative to the second body. The first body and the second body respectively correspond to different display areas of the electronic device. The different display areas include a main interaction area and a main display area. The method includes: The electronic device detects a status of the first body and a status of the second body. The electronic device determines the main interaction area and the main display area based on the status of the first body and the status of the second body. The electronic device obtains one or more display elements on a to-be-displayed user interface. The electronic device determines a display element type. The display element type includes a main interaction element and a main display element. The electronic device displays the main interaction element in the main interaction area and displays the main display element in the main display area.

The main interaction area is an area for a user operation on a display of the electronic device. The main display area is an area for user viewing on the display of the electronic device. The main interaction area and the main display area may be two different display areas of one display, or may be two displays of one electronic device.

The to-be-displayed user interface is an original user interface on which no processing is performed. The to-be-displayed user interface includes an application interface such as an E-book application interface, a photo interface, a video interface, a video call interface, or a music play interface, and a system interface such as a home screen, a leftmost screen, or a lock screen.

The electronic device may display all of the obtained display elements, or may display only some of the obtained display elements.

The body status may include a supported state and an unsupported state. When a body is supported or held, the body is in a supported state. When a body is not supported or not held, the body is in an unsupported state.

The main interaction area and the main display area of the electronic device are determined based on the status of the first body and the status of the second body of the electronic device; display element classification is performed; and the main display element is displayed in the main display area and the main interaction element is displayed in the main interaction area. This helps the user better operate the electronic device, and also helps the user view content displayed by the electronic device.

The main display area and the main interaction area may be determined in different manners. In a possible manner, if the status of the first body and the status of the second body meet a condition that one body is supported and the other body is not supported, the electronic device determines that a display area corresponding to the supported body is the main interaction area, and determines that a display area corresponding to the unsupported body is the main display area. If the status of the first body and the status of the second body meet a condition that both the bodies are supported, the electronic device detects whether the first body and the second body are at different heights. If the first body and the second body are at different heights, the electronic device determines that a display area corresponding to a body at a lower height is the main interaction area, and determines that a display area corresponding to a body at a higher height is the main display area; or if the first body and the second body are at a same height, the electronic device determines that a display area corresponding to a body on the right is the main interaction area, and determines that a display area corresponding to a body on the left is the main display area.

When one body is supported and the other body is not supported, the display area corresponding to the supported body is the main interaction area, and the display area corresponding to the unsupported body is the main display area. This can prevent the user from performing an operation in the display area corresponding to the unsupported body, improve stability of operating the electronic device by the user, help the user perform a touch operation on the electronic device, and implement good user experience. When both the bodies are supported, the display area corresponding to the body at a lower height is the main interaction area, and the display area corresponding to the body at a higher height is the main display area, to conform to an operation habit of the user; or the display area corresponding to the body on the right is the main interaction area, and the display area corresponding to the body on the left is the main display area, to conform to a right-hand operation habit of the user.

The status of the first body and the status of the second body may be identified in different manners. In a possible manner, the electronic device obtains first sensor data of the first body and second sensor data of the second body; determines the status of the first body based on the first sensor data; and determines the status of the second body based on the second sensor data. Details are as follows:

The first sensor data includes pressure values detected by a plurality of pressure sensors on a rear housing of the first body. If the pressure values detected by the pressure sensors are all within a preset pressure value range, and a difference between every two of the pressure values is within a preset difference range, it is determined that the first body is in a supported state. The first sensor data includes a pressure value detected by a pressure sensor on the bezel of the first body. If the pressure value is greater than a preset pressure value, it is determined that the first body is in a held state. The second sensor data includes pressure values detected by a plurality of pressure sensors on a rear housing of the second body. If the pressure values detected by the pressure sensors are all within the preset pressure value range, and a difference between every two of the pressure values is within the preset difference range, it is determined that the second body is in a supported state. The second sensor data includes a pressure value detected by a pressure sensor on the bezel of the second body. If the pressure value is greater than the preset pressure value, it is determined that the second body is in a held state.

In a possible design method, when the electronic device meets a preset trigger condition (first condition), the electronic device may be triggered to perform the foregoing display method.

In a possible manner, the trigger condition may be a preset user operation, for example, an operation of sliding upward from the bottom of a display area, or an operation of touching and holding a display area. In another possible manner, the trigger condition may be that the electronic device is in a folded state.

It should be noted that user interfaces to be displayed on the electronic device before and after folding may be different. For example, the user interface to be displayed before folding is the first user interface, and the user interface to be displayed after folding is the first user interface and a second user interface. The second user interface may be a user interface that is at a same layer as the first user interface. For example, when the first user interface is a home screen, the second user interface may be a leftmost screen. Alternatively, the second user interface may be a user interface that is at an upper layer than the first user interface. For example, when the first user interface is a chat interface of WeChat, a chat information list interface is the user interface at the upper layer than the first user interface. Alternatively, the second user interface may be a recently displayed user interface, that is, a user interface displayed by the electronic device before the first user interface. In this case, the one or more display elements obtained by the electronic device include a display element on the first user interface and a display element on the second user interface.

In a possible design method, after the electronic device is triggered to perform the foregoing display method, the electronic device may repeatedly perform the foregoing display method until the electronic device meets a preset termination condition (second condition). In a possible manner, the foregoing termination condition may be that both the bodies of the electronic device are supported and are at a same height. In another possible manner, the foregoing termination condition may be a preset second user operation, for example, an operation of sliding upward from a lower edge of the main interaction area.

In a possible design method, the method further includes: The electronic device determines a display element level; and displays the main interaction element in the main interaction area and displays the main display element in the main display area based on the display element level.

The display element level may be determined in different manners. In a possible manner, a level of the main interaction element is determined based on an operation habit of the user. For example, a higher use frequency indicates a higher interaction level. In another possible manner, a level of a display element on a user interface is determined based on a level of the user interface. If an interaction level of an interface is level 3, it is determined that an interaction level of a display element on the interface is level 3.

That the electronic device displays the main interaction element in the main interaction area and displays the main display element in the main display area based on the display element levels specifically includes: performing display area level classification, and displaying a display element in a display area of a corresponding level.

A manner of performing level classification on an interaction area includes: The electronic device obtains an area in which the palm of the left hand of the user is continuously in contact with a screen and an area in which the palm of the right hand of the user is continuously in contact with the screen, to obtain a first contact area and a second contact area. The electronic device obtains a farthest distance within which a finger can touch the screen when the user holds the electronic device with the left hand and a farthest distance within which a finger can touch the screen when the user holds the electronic device with the right hand, to obtain a first length and a second length. The electronic device performs level classification on the interaction area based on the first contact area, the second contact area, the first length, and the second length.

Display element level classification and display area level classification are performed; a display element of a relatively high interaction level is displayed in a main interaction area of a relatively high level, to help the user better operate the electronic device; and a display element of a relatively high display level is displayed in a main display area of a relatively high level, to help the user better view content displayed by the electronic device.

Optionally, the method further includes: receiving a third operation of the user, and adjusting a display location of each display element in response to the third operation of the user. For example, a display element in the main display area may be moved to the main interaction area in response to the third operation of the user.

Optionally, in addition to performing display element adjustment that the main display element is displayed in the main display area and the main interaction element is displayed in the main interaction area, the electronic device may further adjust a system operation. For example, the electronic device adjusts the system operation "displaying a notification bar in response to an operation of sliding downward from an upper edge of the display" to "displaying a notification bar in response to an operation of sliding downward from an upper edge of the main interaction area"; or adjusts "in response to an operation that the user slides inward from a right edge of the display, the electronic device performs an operation of returning to a previous interface" to "in response to an operation that the user slides inward from a right edge of the main interaction area, the electronic device performs an operation of returning to a previous interface."

According to a second aspect, this application provides an electronic device. The electronic device includes one or more processors, a memory, and a touchscreen. The memory and the touchscreen are coupled to the one or more processors. The memory is configured to store computer program code. The computer program code includes computer instructions. When the one or more processors execute the computer instructions, the electronic device is enabled to perform the display element display method provided in any possible implementation of the first aspect.

According to a third aspect, this application provides a computer storage medium. The computer storage medium includes computer instructions. When the computer instructions are run on an electronic device, the electronic device is enabled to perform the display element display method provided in any possible implementation of the first aspect.

According to a fourth aspect, an embodiment of this application provides a computer program product. When the computer program product runs on a computer, the computer is enabled to perform the display element display method provided in any possible implementation of the first aspect.

It may be understood that the electronic device according to the second aspect, the computer storage medium according to the third aspect, or the computer program product according to the fourth aspect provided above is configured to perform the display element display method provided in any possible implementation of the first aspect. Therefore, for beneficial effects that can be achieved, refer to beneficial effects in the corresponding method. Details are not described herein again.

BRIEF DESCRIPTION OF DRAWINGS

The following describes the accompanying drawings used in embodiments of this application.

FIG. 4 to FIGS. 13E-1 and FIG. 13E-2 are schematic diagrams of a scenario of a display element display method according to an embodiment of this application;

FIG. 14(1) and FIG. 14(2) are a schematic diagram of level classification of a main interaction area according to an embodiment of this application;

FIG. 15 to FIGS. 19B-1 and FIG. 19B-2 are schematic diagrams of another scenario of a display element display method according to an embodiment of this application.

DESCRIPTION OF EMBODIMENTS

The following describes embodiments of this application with reference to the accompanying drawings in embodiments of this application.

The following describes some terms in embodiments of this application to help persons skilled in the art have a better understanding.

In embodiments of this application, a "user interface" is an interface displayed on a display of an electronic device. The user interface may include any application interface. The user interface further includes a status bar.

In embodiments of this application, a "display element" is content displayed on an application interface, including content displayed on each application interface for viewing by a user and content for performing an operation by the user.

In embodiments of this application, "a plurality of" means two or more than two.

In embodiments of this application, terms such as "first" and "second" are merely used for distinguishing, but cannot be understood as an indication or implication of relative importance, or as an indication or implication of a sequence.

Figure 1A:
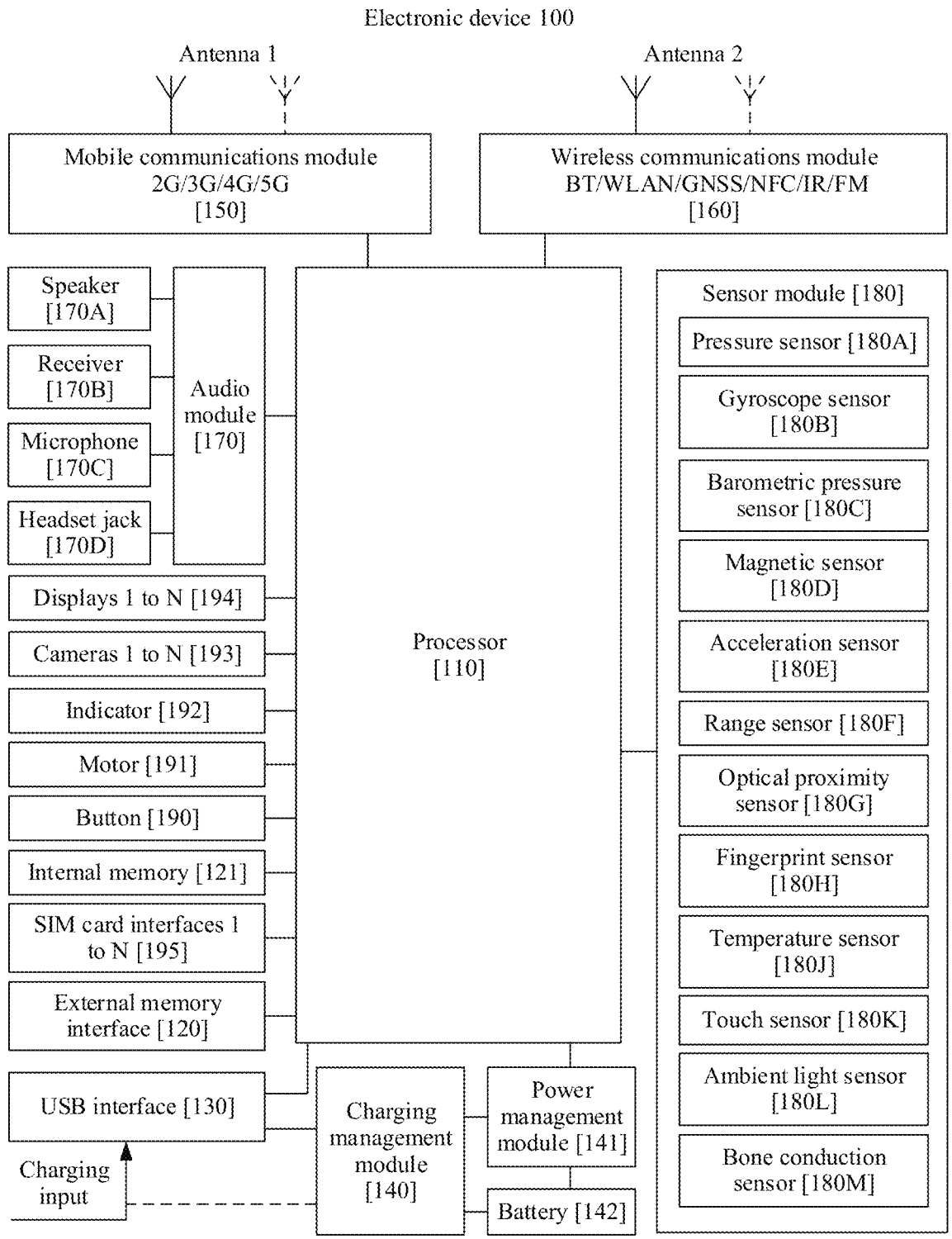
FIG. 1A to FIG. 1F are schematic diagrams of a structure of an electronic device 100 according to an embodiment of this application.

The electronic device in embodiments of this application is first described. FIG. 1A is a schematic diagram of a structure of an electronic device 100 according to an embodiment of this application.

The electronic device 100 may be any electronic device having a display, for example, a portable electronic device such as a mobile phone or a tablet computer, a non-portable electronic device such as a desktop computer or a television, a wearable electronic device such as a band or a watch, a vehicle-mounted device, or a smart home device. This is not limited in embodiments of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in some embodiments of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset for playing audio through the headset, or may be configured to connect to another electronic device such as an AR device.

It may be understood that an interface connection relationship between the modules shown in some embodiments of the present invention is merely used as an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to increase antenna utilization. For example, the antenna 1 may be multiplexed as a diversity antenna in a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The display 194 may be a foldable screen. A user may fold the display 194. For example, as shown in FIG. 3C, when the display 194 is folded, the display 194 may be divided into a first display area and a second display area by using a bending part as a boundary. The electronic device 100 may display different content in the first display area and the second display area.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may further process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a transfer mode between human brain neurons, and may further continuously perform self-learning. The electronic device 100 may implement applications such as intelligent cognition through the NPU, for example, image recognition, facial recognition, speech recognition, and text understanding.

The external memory interface 120 may be configured to connect to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to implement various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and an address book) created when the electronic device 100 is used, and the like. In addition, the internal memory 121 may include a high-speed random access memory, and may further include a nonvolatile memory, for example, at least one magnetic disk storage device, a flash memory, or a universal flash storage (universal flash storage, UFS).

The electronic device 100 may implement audio functions such as music playing and recording functions through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or listens to a voice message, the receiver 170B may be placed near a human ear to listen to a voice.

The microphone 170C, also referred to as a "mike" or a "microphone", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to implement a noise reduction function in addition to a function of collecting a sound signal. In some other embodiments, three, four, or more microphones 170C may be alternatively disposed in the electronic device 100, to collect a sound signal, implement noise reduction, and identify a sound source, so as to implement a directional recording function and the like.

The headset jack 170D is configured to connect to a wired headset. The headset interface 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects strength of the touch operation based on the pressure sensor 180A. The electronic device 100 may also calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to a first pressure threshold is performed on a Messages icon, an instruction for creating an SMS message is executed.

Figure 1B:
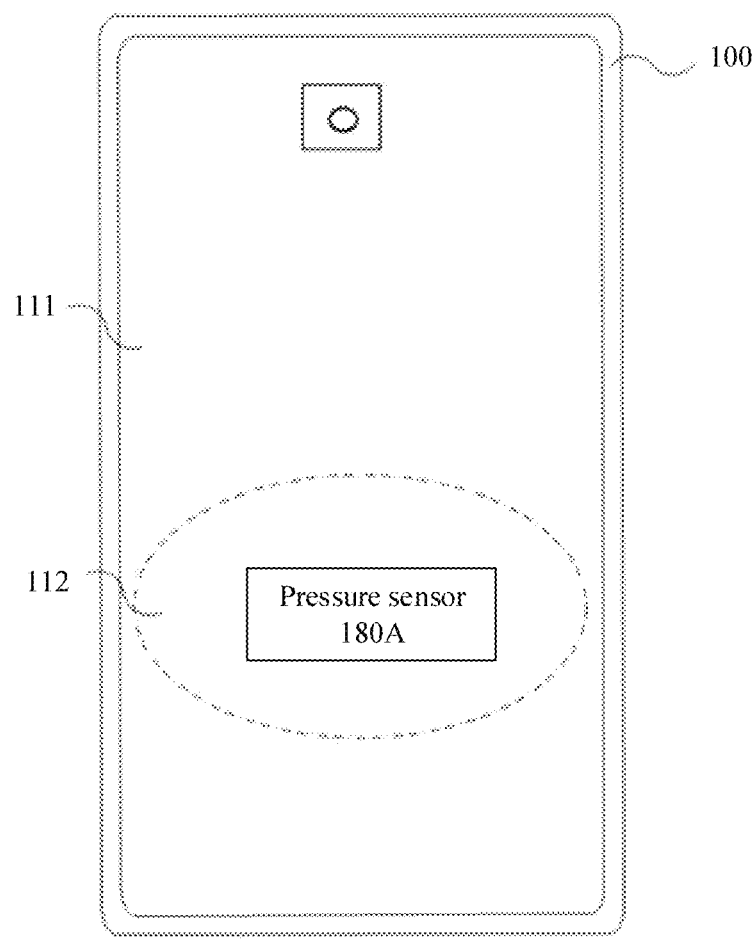
Figure 1C:
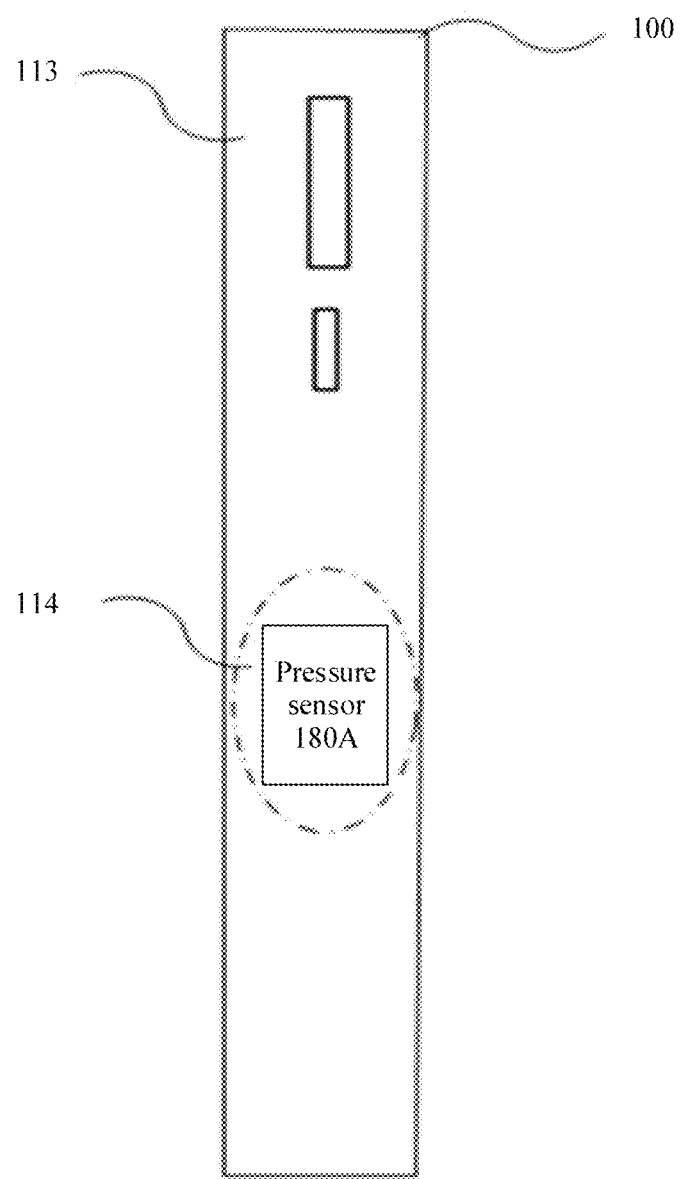
Figure 1D:
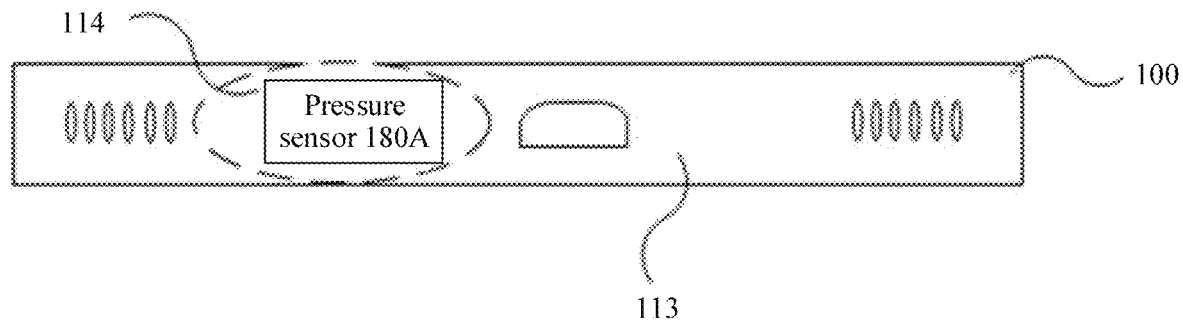

The pressure sensor 180A may be disposed on a rear housing 111 (for example, as shown in FIG. 1B) and/or a bezel 113 (for example, as shown in FIG. 1C and FIG. 1D) of the electronic device 100. The electronic device may detect a physical state of the electronic device based on the pressure sensor 180A. For example, the electronic device may detect a holding state and a supporting state based on the pressure sensor 180A. For example, the electronic device 100 may determine, by using a pressure value detected by the pressure sensor 180A disposed on the bezel 113, whether the electronic device 100 is held. If the pressure value is greater than a preset pressure value, the electronic device determines that the electronic device is in a held state. Optionally, a location 114 that is set by the pressure sensor 180A may be obtained by collecting statistics about habits of a plurality of users holding the bezel 113 of the electronic device 100. For example, the electronic device 100 may determine, by using a pressure value detected by the pressure sensor 180A disposed on the rear housing 111, whether the electronic device 100 is supported. Specifically, a plurality of pressure sensors 180A may be disposed in an area 112 of the rear housing 111 of the electronic device 100. If it is detected that pressure values detected by the plurality of pressure sensors 180A are all within a preset pressure value range, and a difference between every two of the pressure values is within a preset difference range, the electronic device 100 determines that the electronic device is in a supported state.

The gyroscope sensor 180B may be configured to determine a motion posture of the electronic device 100. In some embodiments, angular velocities of the electronic device 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-controlled gaming scenario. It may be understood that, when the electronic device is supported, the electronic device remains stationary, and an angular velocity detected by the gyroscope sensor 180B approaches 0; and when the electronic device is held, the electronic device slightly jitters as the hand shakes, and an angular velocity detected by the gyroscope sensor 180B is unstable within a preset time. Therefore, the electronic device 100 may detect a holding state and a supporting state by using the gyroscope sensor 180B. For example, when a pressure value detected by the pressure sensor disposed on the rear housing 111 is greater than the preset pressure value, and the angular velocity detected by the gyroscope sensor approaches 0, the electronic device determines that the electronic device is in a supported state.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 can detect opening and closing of a flip cover based on the magnetic sensor 180D. Further, a feature such as automatic unlocking upon opening of the flip cover is set based on a detected opening or closing state of the flip cover.

The acceleration sensor 180E may detect magnitude of accelerations in various directions (usually on three axes) of the electronic device 100. When the electronic device 100 is still, the acceleration sensor may detect magnitude and a direction of gravity. The acceleration sensor may be further configured to identify a posture of the electronic device, and is used in an application such as switching between a landscape mode and a portrait mode or a pedometer.

Figure 1E:
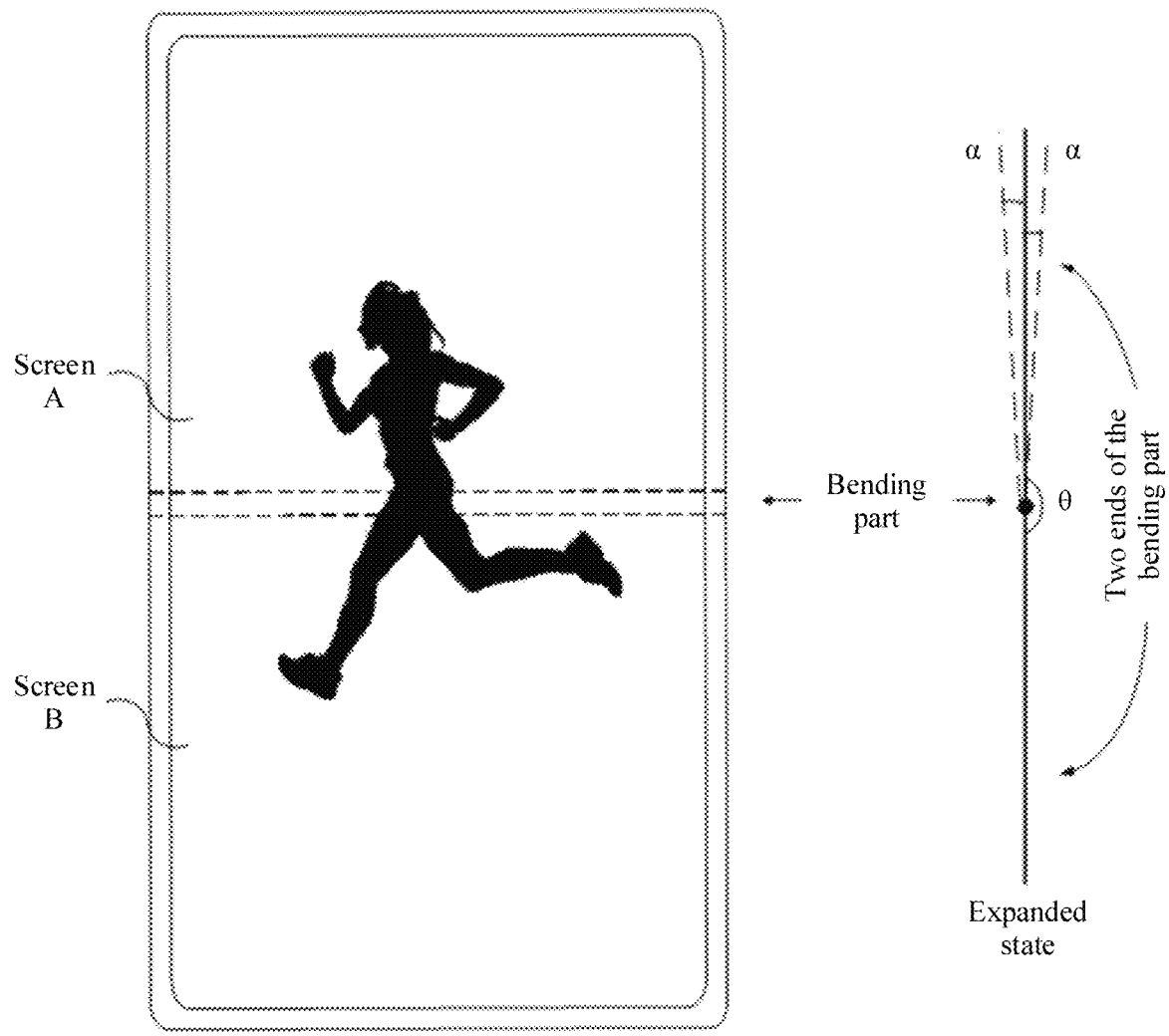
Figure 1F:
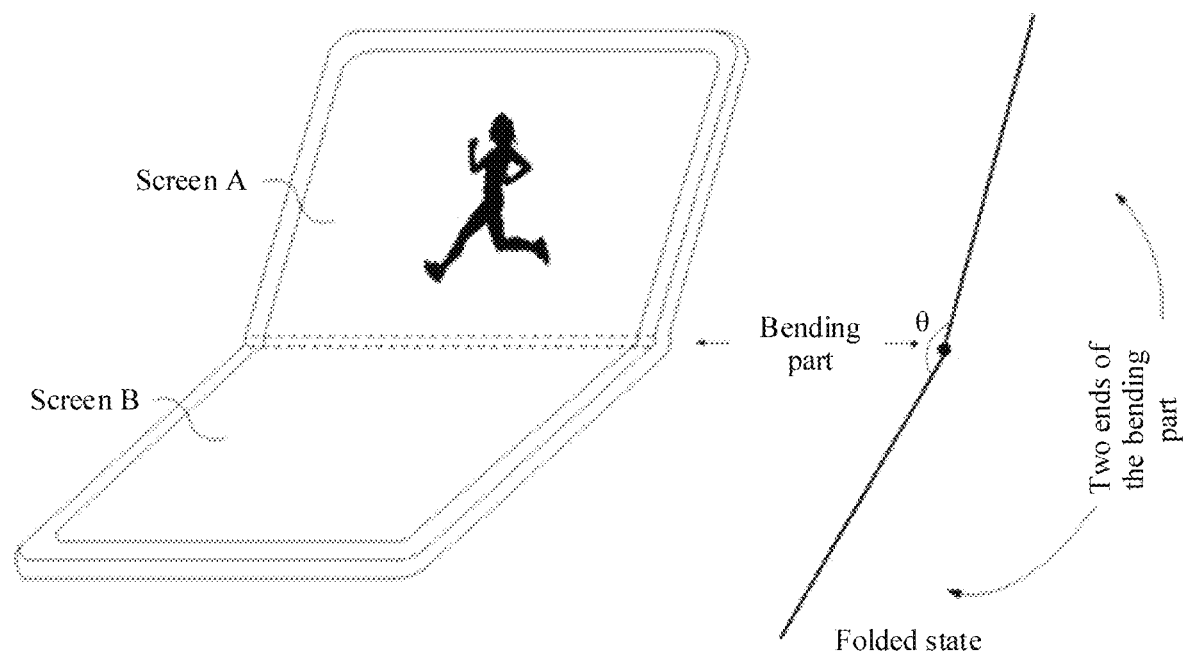

When the electronic device has a foldable screen, the acceleration sensor 180E may be further configured to identify a value of an included angle θ between the first display area and the second display area. The electronic device may determine, based on the value of the included angle θ, that the electronic device is in an expanded form (as shown in FIG. 1E) or a folded state (as shown in FIG. 1F). When the included angle θ meets a first condition, the electronic device determines that the electronic device is in a folded state. When the included angle meets a second condition, the electronic device determines that the electronic device is in an expanded state. For example, the first condition may be 180−α<θ<180+α, where α is a non-negative angle value, and α may be 0 or may be slightly greater than 0; and the second condition is different from the first condition, and may be β1<θ<β2, where β2 may be 180 or β2 may be slightly less than 180, and β1 may be any value greater than or equal to 0 and less than β2. It should be noted that the folded state and/or the expanded state of the electronic device may alternatively be determined by using another method in embodiments of this application.

The range sensor 180F is configured to measure a distance. The electronic device 100 may measure a distance in an infrared manner or a laser manner. In some embodiments, in a photographing scenario, the electronic device 100 may measure a distance by using the range sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, the electronic device may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of the present invention, an Android system of a layered architecture is used as an example to illustrate a software structure of the electronic device 100.

Figure 2:
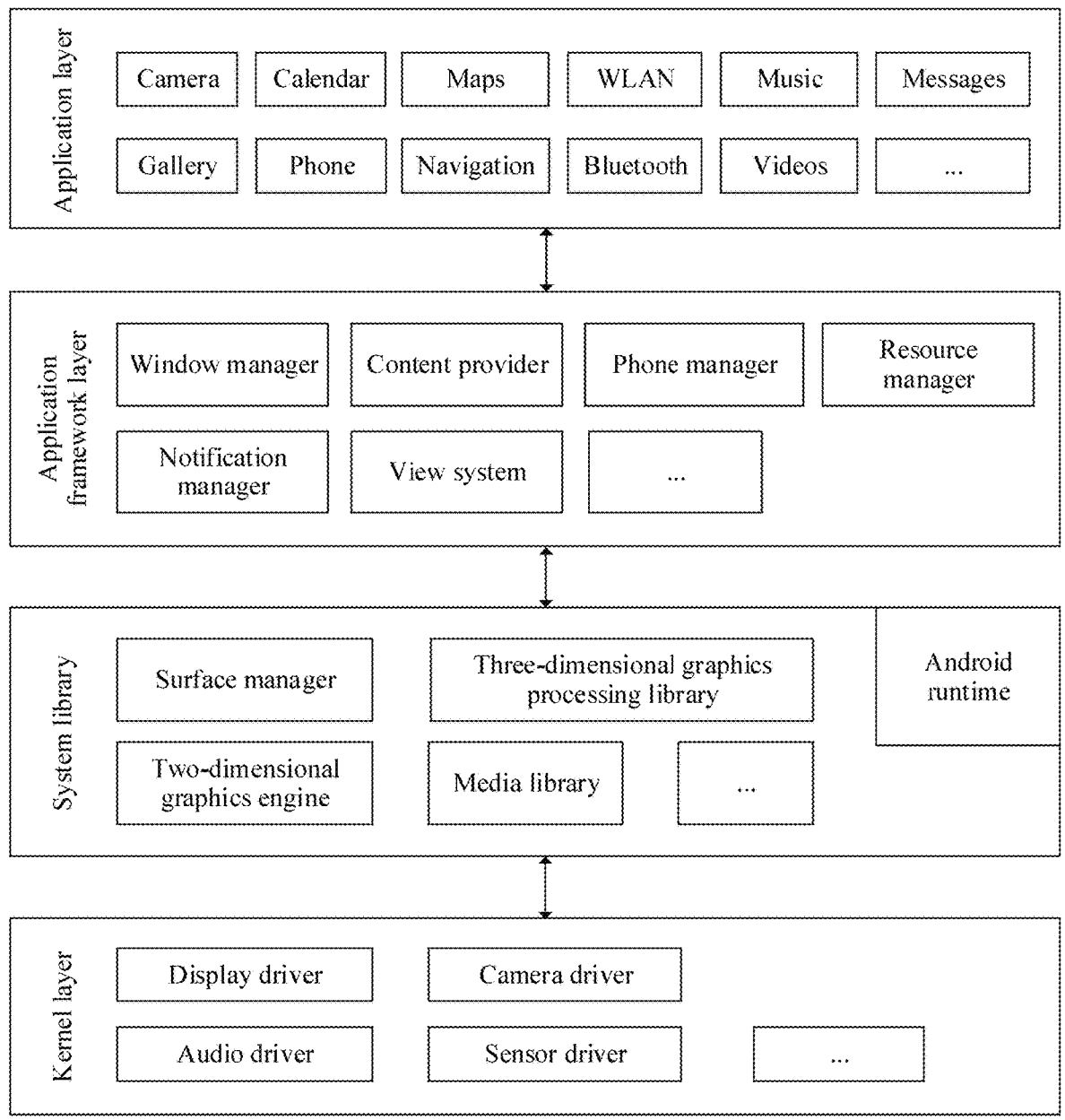
FIG. 2 is a block diagram of a software structure of an electronic device 100 according to an embodiment of this application.

FIG. 2 is a block diagram of the software structure of the electronic device 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is played, the electronic device vibrates, or an indicator blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 193.

The following specifically describes embodiments of this application with reference to the accompanying drawings. An example in which the electronic device 100 is a mobile phone is used in the following embodiments. In some embodiments, a main interaction area and a main display area of a display of the electronic device are determined based on a physical state of the electronic device. By determining a display element type, the electronic device displays a main interaction element in the main interaction area of the display, to help a user operate the electronic device; and displays a main display element in the main display area of the display, to help the user view content. This improves user experience.

Figure 3A:
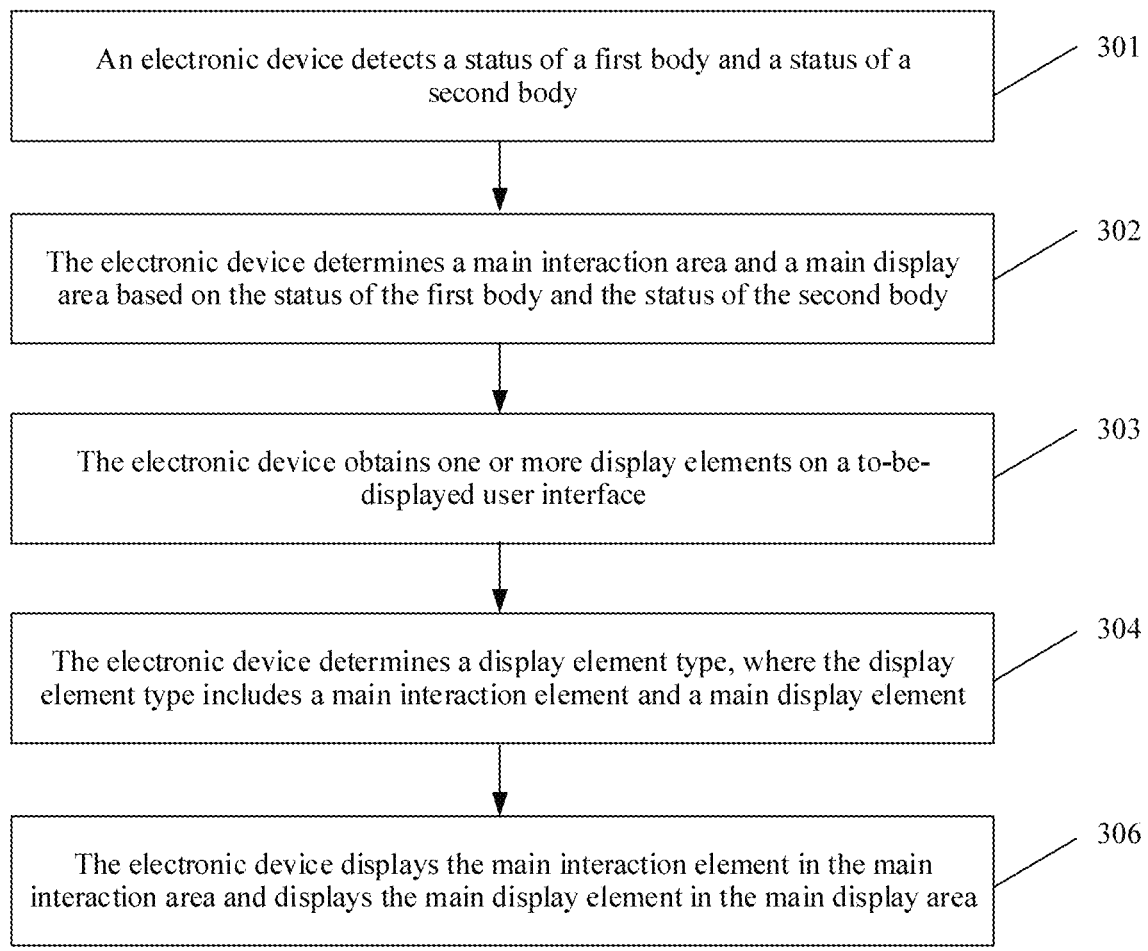
FIG. 3A is a schematic flowchart of a display element display method according to an embodiment of this application.

FIG. 3A is a schematic flowchart of a display element display method according to an embodiment of this application. The method is applied to an electronic device including a first body and a second body. The first body is bendable relative to the second body. The first body and the second body respectively correspond to different display areas of the electronic device. The different display areas include a main interaction area and a main display area. The method includes step 301 to step 306. Details are as follows:

Step 301: The electronic device detects a status of the first body and a status of the second body.

For example, step 301 may include step 3011 and step 3012. Details are as follows:

Step 3011: Obtain first sensor data of the first body and second sensor data of the second body.

The first sensor data may include detection data of one or more sensors of the first body. The second sensor data may include detection data of one or more sensors of the second body.

For example, the first sensor data includes first data of a first sensor and second data of a second sensor. The second sensor data includes third data of a third sensor and fourth data of a fourth sensor. The first sensor and the second sensor are one or more pressure sensors 180A respectively disposed on a rear housing and a bezel of the first body of the electronic device. The third sensor and the fourth sensor are one or more pressure sensors 180A respectively disposed on a rear housing and a bezel of the second body of the electronic device.

Step 3012: Determine the status of the first body based on the first sensor data, and determine the status of the second body based on the second sensor data.

The status of the first body and the status of the second body may include a holding state and a supporting state of each body. For a method for determining a holding state or a supporting state based on sensor data, refer to the descriptions in FIG. 1A to FIG. 1F. Details are not described herein again.

Step 302: The electronic device determines the main interaction area and the main display area based on the status of the first body and the status of the second body.

The "main interaction area" may be an area for a user operation on a display of the electronic device. The "main display area" may be an area for user viewing on the display of the electronic device. The "main interaction area" and the "main display area" may be two different display areas of one display, or may be two displays of one electronic device.

For example, determining the main interaction area and the main display area based on the status of the first body and the status of the second body may specifically include:

(1) If one body of the electronic device is held or supported (referred to as "supported" below) and the other body is not held or not supported (referred to as "unsupported" below), the electronic device determines that a display area (referred to as a "supported display area" below) corresponding to the supported body is the main interaction area, and determines that a display area corresponding to the unsupported body (referred to as an "unsupported display area" below) is the main display area.

Figure 3B:
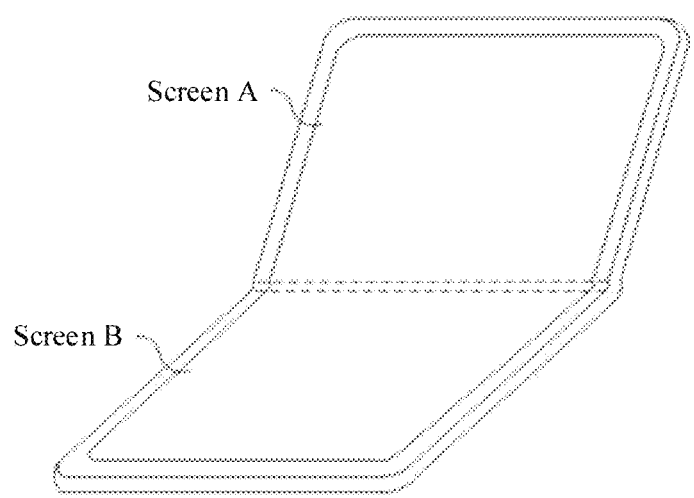
FIG. 3B and FIG. 3C are schematic diagrams in which an electronic device is in a first supported state according to an embodiment of this application.
Figure 3C:
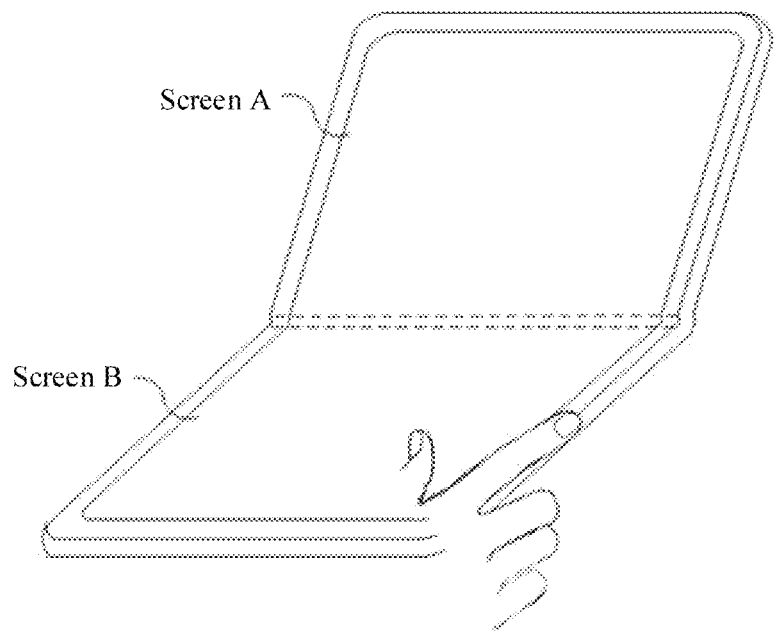

For example, as shown in FIG. 3B, the electronic device is placed on a desktop. If one body of the electronic device is supported by the desktop and the other body of the electronic device is not supported, the electronic device may determine that a display area (referred to as a "supported display area" below) corresponding to the supported body is the main interaction area, and an unsupported display area is the main display area. For another example, as shown in FIG. 3C, if one body of the electronic device is held by a user with a hand and the other body is not supported, the electronic device may determine that a display area (referred to as a "held display area" below) corresponding to the held body is the main interaction area, and an unsupported display area is the main display area. For ease of description, a state in which "one body is supported and the other body is not supported" is referred to as a "first supporting state" for short below.

(2) If both the bodies of the electronic device are supported (which is referred to as a "second supporting state" below), the electronic device may determine the main display area and the main interaction area by using one or more of the following policies.

Policy 1: Determine the main display area or the main interaction area based on postures of the first body and the second body.

For example, if the two bodies are at different heights, the electronic device determines that a display area (referred to as a "lower display area" below) corresponding to a body at a lower height is the main interaction area, and determines that a display area (referred to as an "upper display area" below) corresponding to the other body at a higher height is the main display area. If the two bodies are at a same height, the electronic device determines that a display area (referred to as a "right display area" below) corresponding to a body on the right is the main interaction area, and determines that a display area (referred to as a "left display area" below) corresponding to a body on the left is the main display area.

Policy 2: Determine the main display area or the main interaction area based on the holding state/supporting state of the first body and the second body.

For example, if one body is supported and the other body is held, the electronic device determines that a display area (referred to as a "supported display area" below) corresponding to the supported body is the main interaction area, and determines that a display area (referred to as a "held display area" below) corresponding to the held body is the main display area.

Step 303: The electronic device obtains one or more display elements.

The one or more display elements are one or more display elements on a to-be-displayed user interface. The to-be-displayed user interface is an original user interface on which no processing is performed.

Step 304: The electronic device determines a display element type, where the display element type includes a main interaction element and a main display element.

The "main interaction element" is a display element used to receive a user operation. For example, the main interaction element may be a button, a slider bar, an input box, or a drop-down menu. The electronic device may receive an operation performed by the user on the main interaction element. For example, the operation performed on the main interaction element may include tapping, sliding, entering, or dragging. In response to the operation performed on the main interaction element, the electronic device may perform a corresponding interaction function. For example, in response to an operation performed by the user on the slider bar, the electronic device scrolls displayed content. For another example, in response to a tap operation performed by the user on a play button, the electronic device starts/pauses video playing. It may be understood that the foregoing examples are merely used to explain the main interaction element. The main interaction element may further include another element. This is not limited in some embodiments of this application.

The "main display element" is a display element used to display content viewed by the user. The electronic device may display different content by using the main display element. The foregoing content may be a text, a picture, a video, or the like. For example, the text content may be an E-book or news, the picture may be a photo, and the video may be a movie or a TV series.

Step 306: The electronic device displays the main interaction element in the main interaction area and displays the main display element in the main display area.

For example, the display of the electronic device includes a first display area and a second display area. When the first display area of the electronic device is the main interaction area and the second display area is the main display area, the electronic device displays the main interaction element (for example, a control for controlling volume or a control for controlling play) in the first display area and displays the main display element (for example, a control for displaying lyrics) in the second display area.

In this solution, the main interaction area and the main display area of the electronic device are determined based on the status of the first body and the status of the second body of the electronic device; display element classification is performed; and the main display element is displayed in the main display area and the main interaction element is displayed in the main interaction area. This helps the user better operate the electronic device, and also helps the user view content displayed by the electronic device.

In addition, when one body is supported and the other body is not supported, the display area corresponding to the supported body is the main interaction area, and the display area corresponding to the unsupported body is the main interaction area. This can prevent the user from performing an operation in the display area corresponding to the unsupported body, improve stability of operating the electronic device by the user, help the user perform a touch operation on the electronic device, and implement good user experience.

When both the bodies are supported, the display area corresponding to the body at a lower height is the main interaction area, and the display area corresponding to the body at a higher height is the main display area, to conform to an operation habit of the user; or the display area corresponding to the body on the right is the main interaction area, and the display area corresponding to the body on the left is the main display area, to conform to a right-hand operation habit of the user.

For ease of understanding, the following describes the method in this application with reference to a specific example.

Example 1

Figure 4:
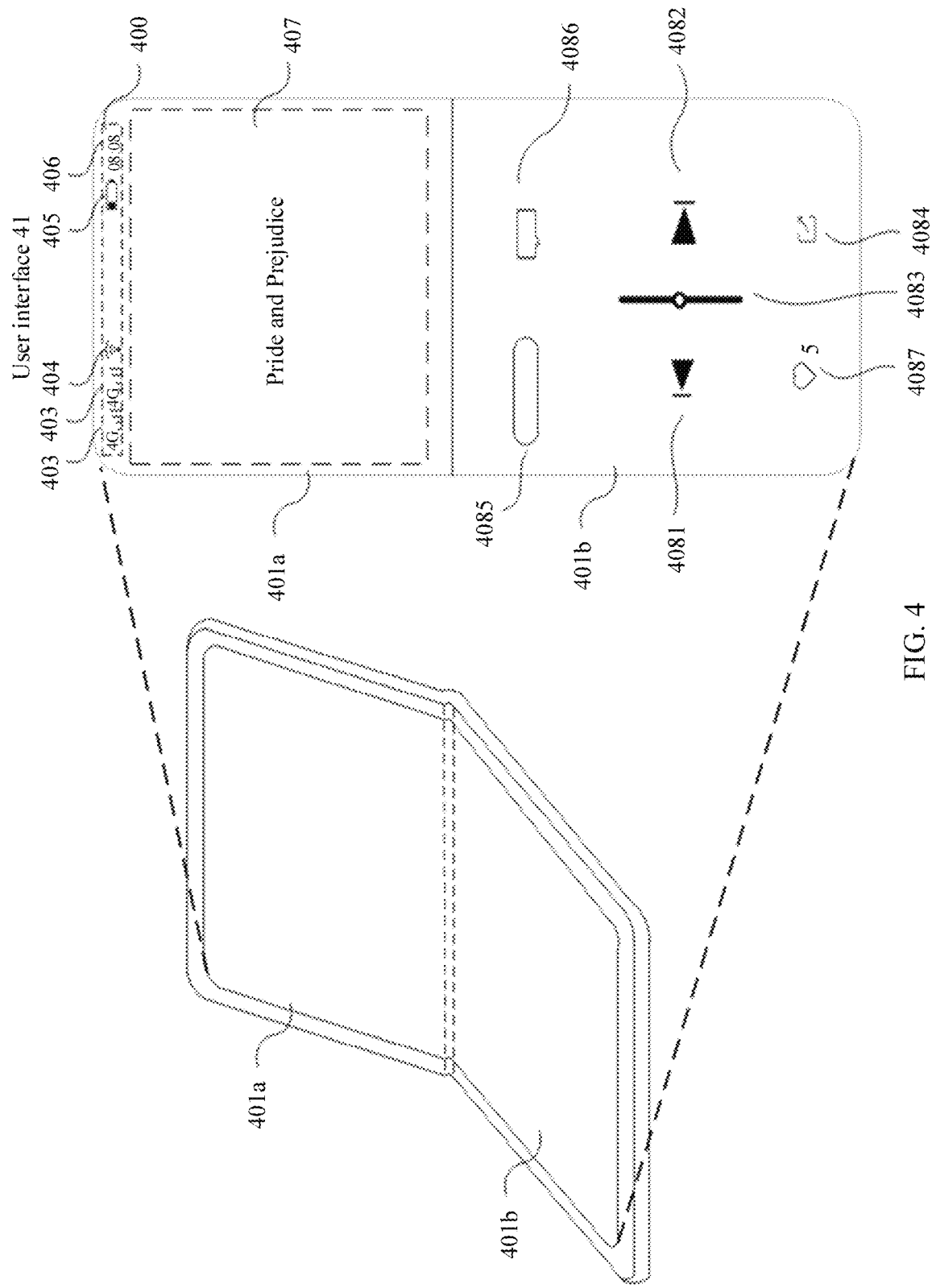

As shown in FIG. 4, the electronic device is placed on a desktop in a folded form. The electronic device includes a first display area (for example, a display area 401a) corresponding to the first body and a second display area (for example, a display area 401b) corresponding to the second body.

(Step 301) A pressure sensor A in a rear housing area of the first body is supported by the desktop, and a pressure sensor B in a bezel area of the first body is not stressed. The electronic device may determine, based on a pressure value detected by the pressure sensor A and a pressure value detected by the pressure sensor B, that the first body is supported. A pressure sensor C in a rear housing area of the second body and a pressure sensor D in a bezel area of the second body are not stressed. The electronic device may determine, based on a pressure value detected by the pressure sensor C and a pressure value detected by the pressure sensor D, that the second body is not supported.

(Step 302) If the display area 401b is supported and the display area 401a is not supported, the electronic device determines that the supported display area 401b is the main interaction area, and determines that the unsupported display area 401a is the main display area.

(Step 303) The to-be-displayed user interface includes display elements such as E-book text content 407, a previous chapter selection 4081, a next chapter selection 4082, an up/down slide control 4083, a forward button 4084, a comment input box 4085, a comment view button 4086, a like button 4087, and a status bar 400. The status bar 400 may include a signal strength indicator 403 of a mobile communications signal, a signal strength indicator 404 of a Wi-Fi signal, a battery status indicator 405, and a time indicator 406.

(Step 304) The electronic device determines that the E-book text content 407 and the status bar 400 are main display elements, and determines that the previous chapter selection 4081, the next chapter selection 4082, the up/down slide control 4083, the forward button 4084, the comment input box 4085, the comment view button 4086, and the like button 4087 are main interaction elements.

It may be understood that the status bar 400 and the E-book text content 407 are used for user viewing, and therefore are main display elements. The user may tap the previous chapter selection 4081 and the next chapter selection 4082 and slide the up/down slide control 4083 to control display of the E-book text content 407. The user may tap the forward button 4084 to enter a forward interface. The user may tap the comment input box 4085 to enter a comment input interface and enter a comment. The user may tap the comment view button 4086 to view historical comment content. The user may tap the like button 4087. Therefore, the previous chapter selection 4081, the next chapter selection 4082, the up/down slide control 4083, the forward button 4084, the comment input box 4085, the comment view button 4086, and the like button 4087 are main interaction element.

(Step 306) The electronic device displays a user interface 41. The main display elements (for example, the status bar 400 and the E-book text content 407) are displayed in the display area 401a. The main interaction elements (for example, the previous chapter selection 4081, the next chapter selection 4082, the up/down slide control 4083, the forward button 4084, the comment input box 4085, the comment view button 4086, and the like button 4087) are displayed in the display area 401b.

Optionally, when the following first conditions are met, the electronic device may trigger to perform step 301 to step 306.

Policy 1: The electronic device receives a first operation of the user. The first operation may be a preset gesture operation or the like, for example, may be an operation of sliding upward from the bottom of a display area or may be touching and holding a display area.

Policy 2: The electronic device is in a folded state.

For ease of understanding, the following describes the method in this application with reference to specific examples.

Example 2

Figure 5A:
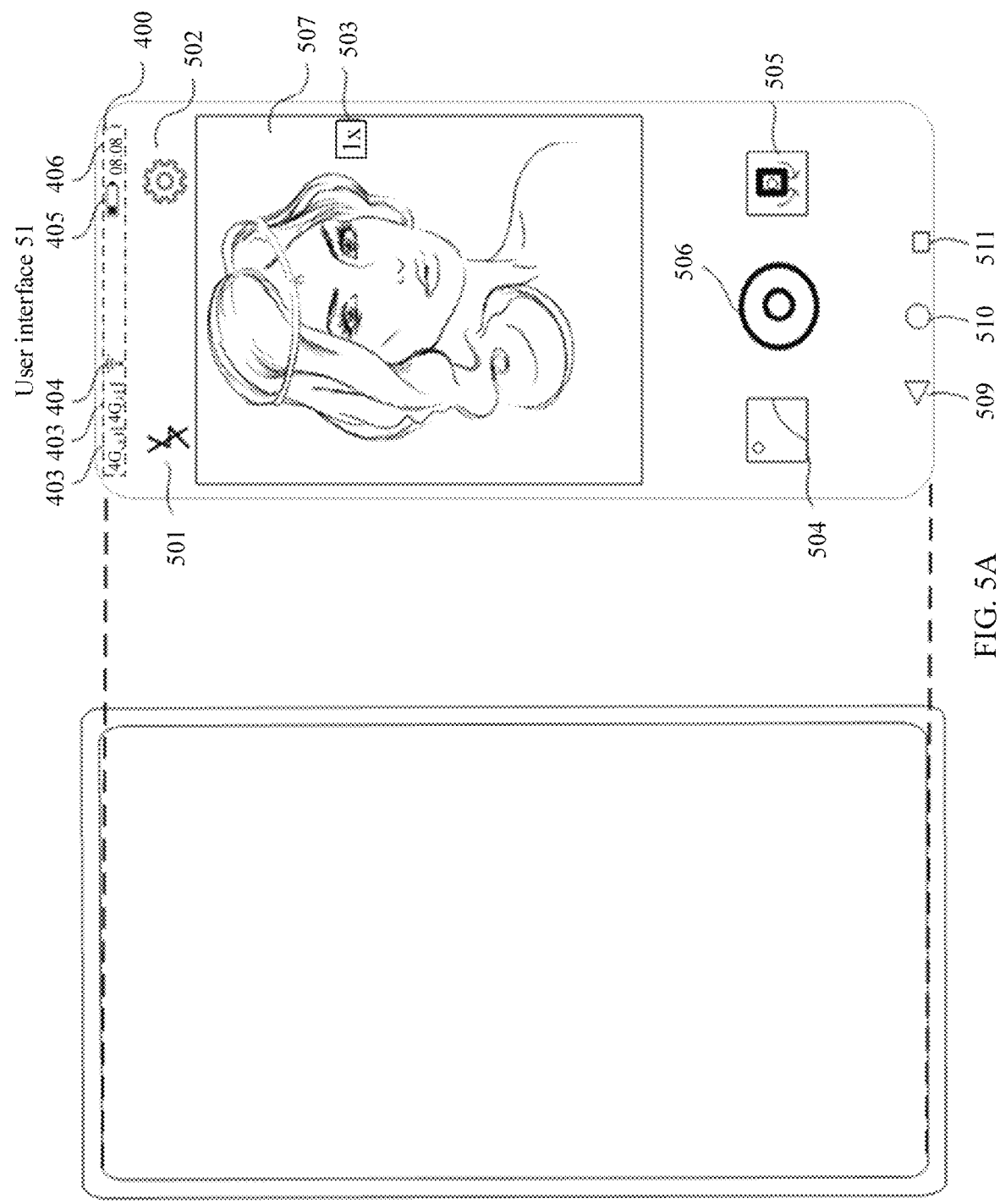
Figure 5B:
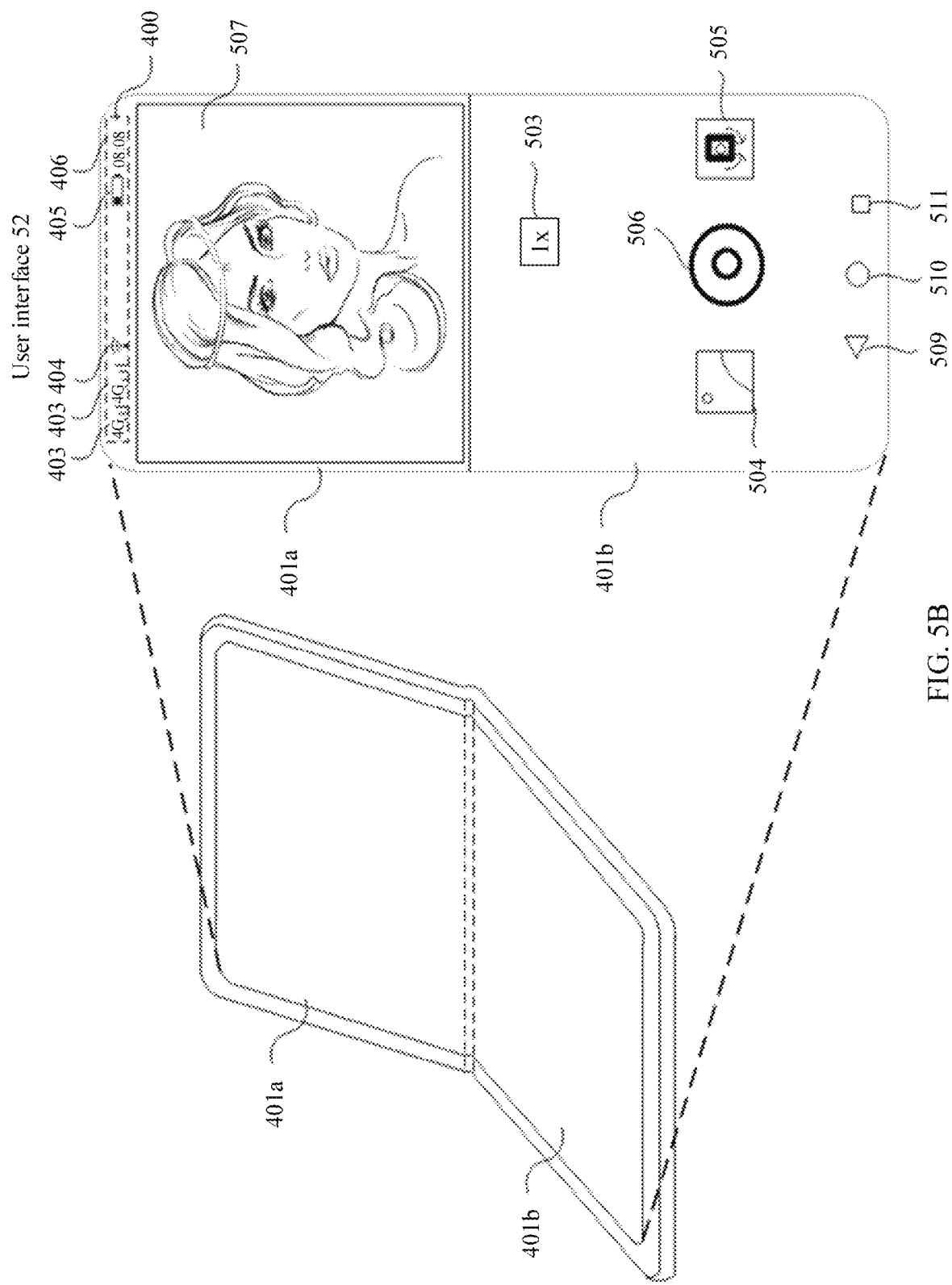

As shown in FIG. 5A, the electronic device is in an expanded state. The electronic device displays a user interface 51. The user interface 51 includes the status bar 400 and a first application interface (for example, a photo interface). The photo interface includes display elements such as a flash button 501, a camera function setting button 502, a magnification button 503, a picture display function button 504, a camera switch 505, a photo function button 506, a viewfinder frame 507, a three-button navigation button 509, a three-button navigation button 510, and a three-button navigation button 511. The user folds the electronic device and places the electronic device on the desktop. When the electronic device displays the user interface 51, if it is detected that the electronic device switches from an expanded state to a folded state, the electronic device may perform step 301 to step 306. The electronic device displays a user interface 52. As shown in FIG. 5B, the main interaction elements (for example, the magnification button 503, the picture display function button 504, the camera switch 505, the photo function button 506, the three-button navigation button 509, the three-button navigation button 510, and the three-button navigation button 511) are displayed in the main interaction area (for example, the display area 401b), and the main display elements (for example, the viewfinder frame 507 and the status bar 400) are displayed in the main display area (for example, the display area 401a).

Example 3

Figure 6A:
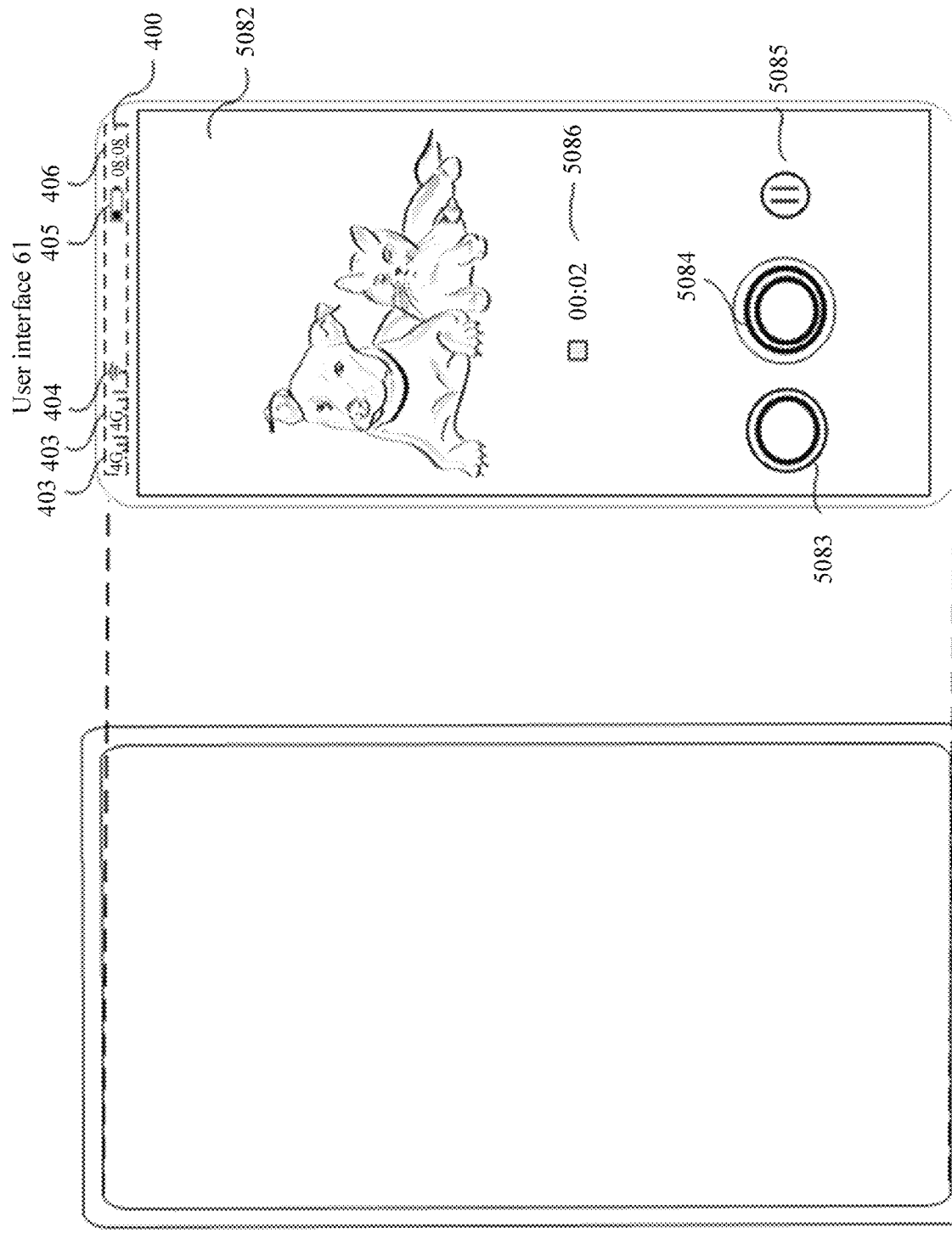
Figure 6B:
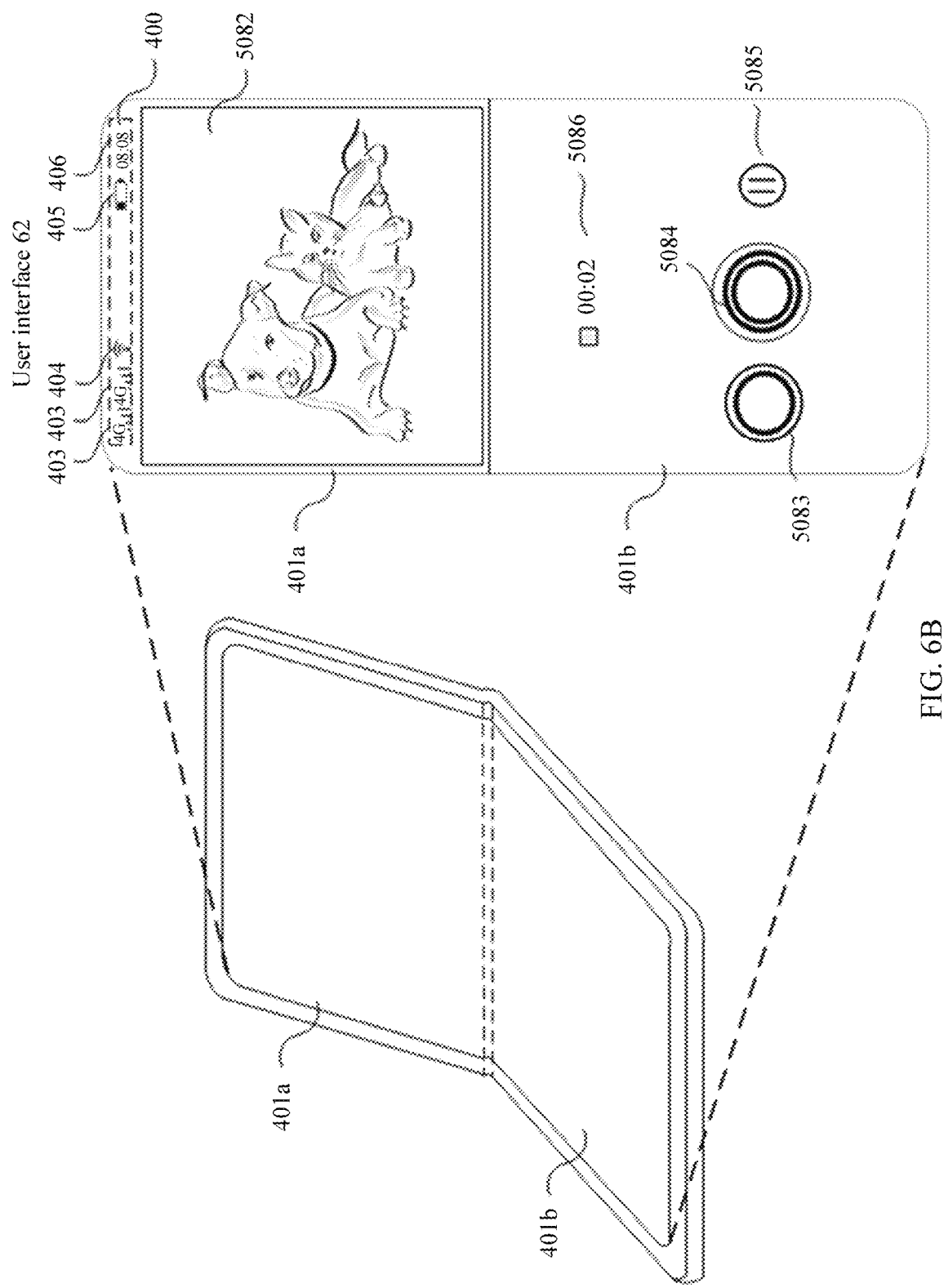

This is similar to Example 2. As shown in FIG. 6A, the electronic device is in an expanded state. The electronic device displays a user interface 61. The user interface 61 includes the status bar 400 and a first application interface (for example, a video interface). When the electronic device displays the user interface 61, if it is detected that the electronic device switches from an expanded state to a folded state, the electronic device performs step 301 to step 306 to display a user interface 62. As shown in FIG. 6B, the main interaction elements (for example, a photo button 5083, a video button 5084, a pause button 5085, and a timing button 5086) are displayed in the main interaction area (for example, the display area 401b), and the main display elements (for example, the status bar 400 and a viewfinder frame 5082) are displayed in the main display area (for example, the display area 401a).

Example 4

Figure 7A:
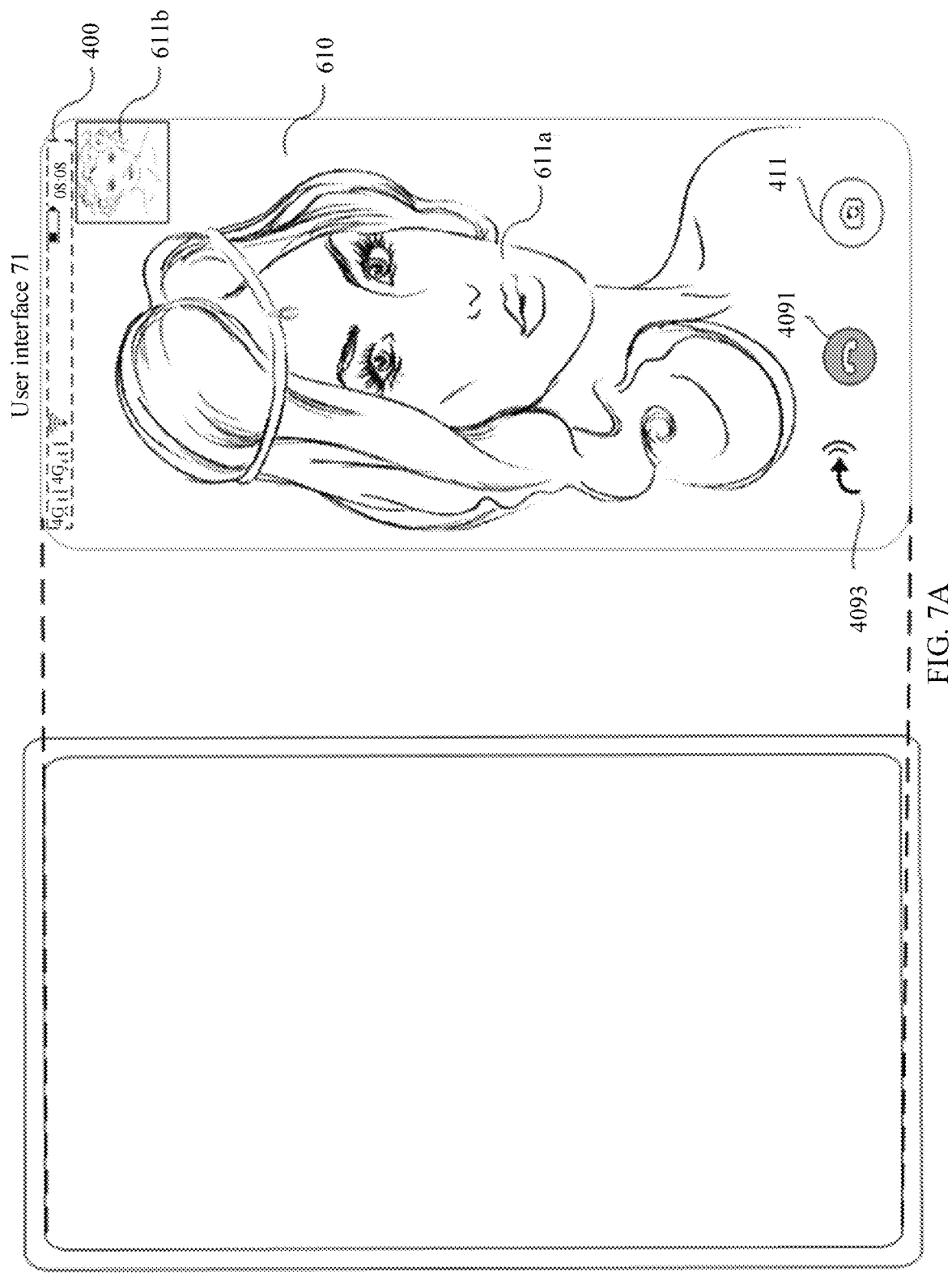
Figure 7B:
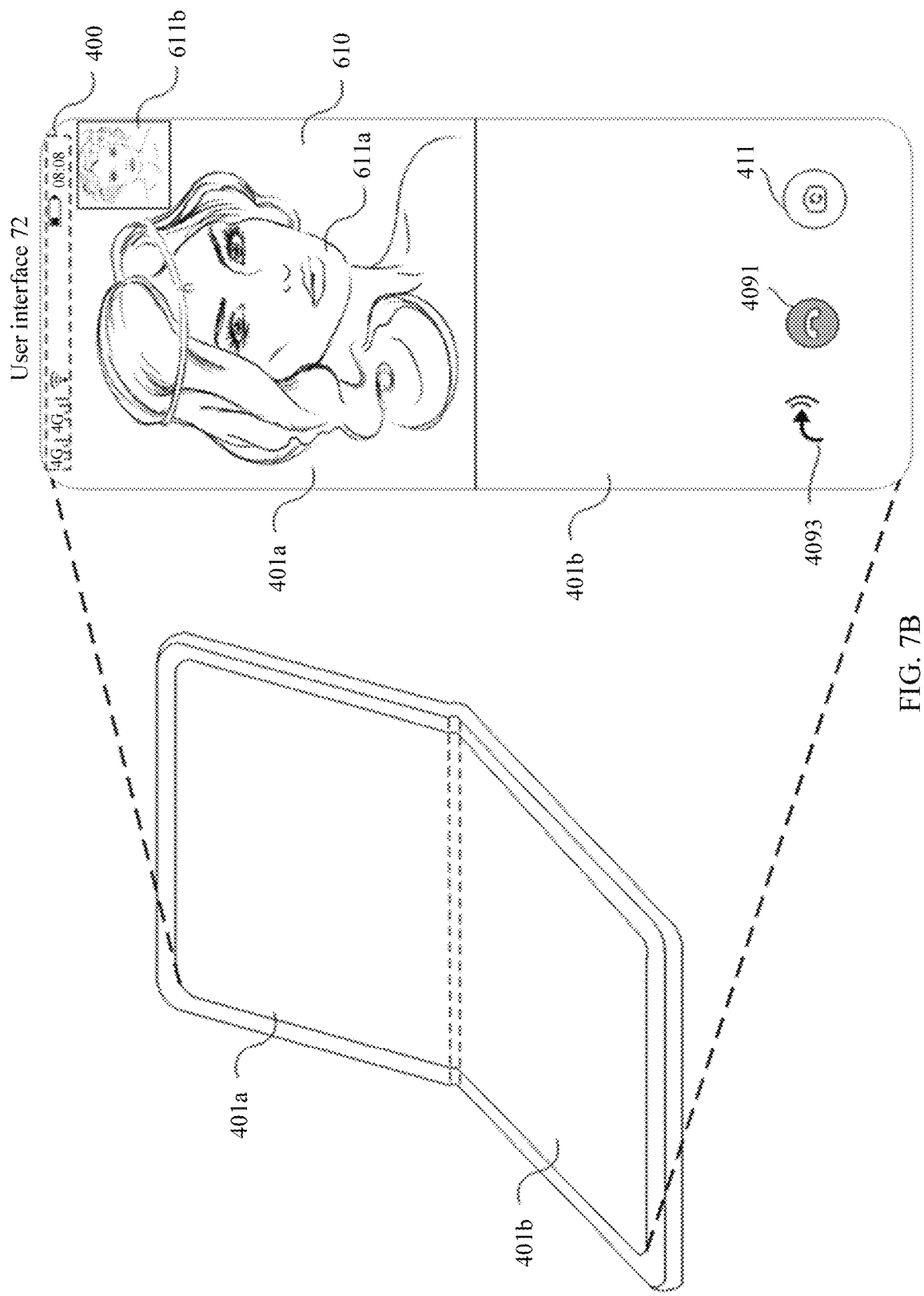

This is similar to Example 2 and Example 3. As shown in FIG. 7A, the electronic device is in an expanded state. The electronic device displays a user interface 71. The user interface 71 includes the status bar 400 and a first application interface (for example, a video call interface). As shown in FIG. 7B, when the electronic device displays the user interface 71, if it is detected that the electronic device switches from an expanded state to a folded state, the electronic device displays a user interface 72. The main interaction elements (for example, a voice answer button 4093, a reject button 4091, and a camera switch button 411) are displayed in the main interaction area (for example, the display area 401b), and the main display elements (for example, a video picture 611a of a called party, a video picture 611b of a call party, and the status bar 400) are displayed in the main display area (for example, the display area 401a).

Example 5

Figure 8A:
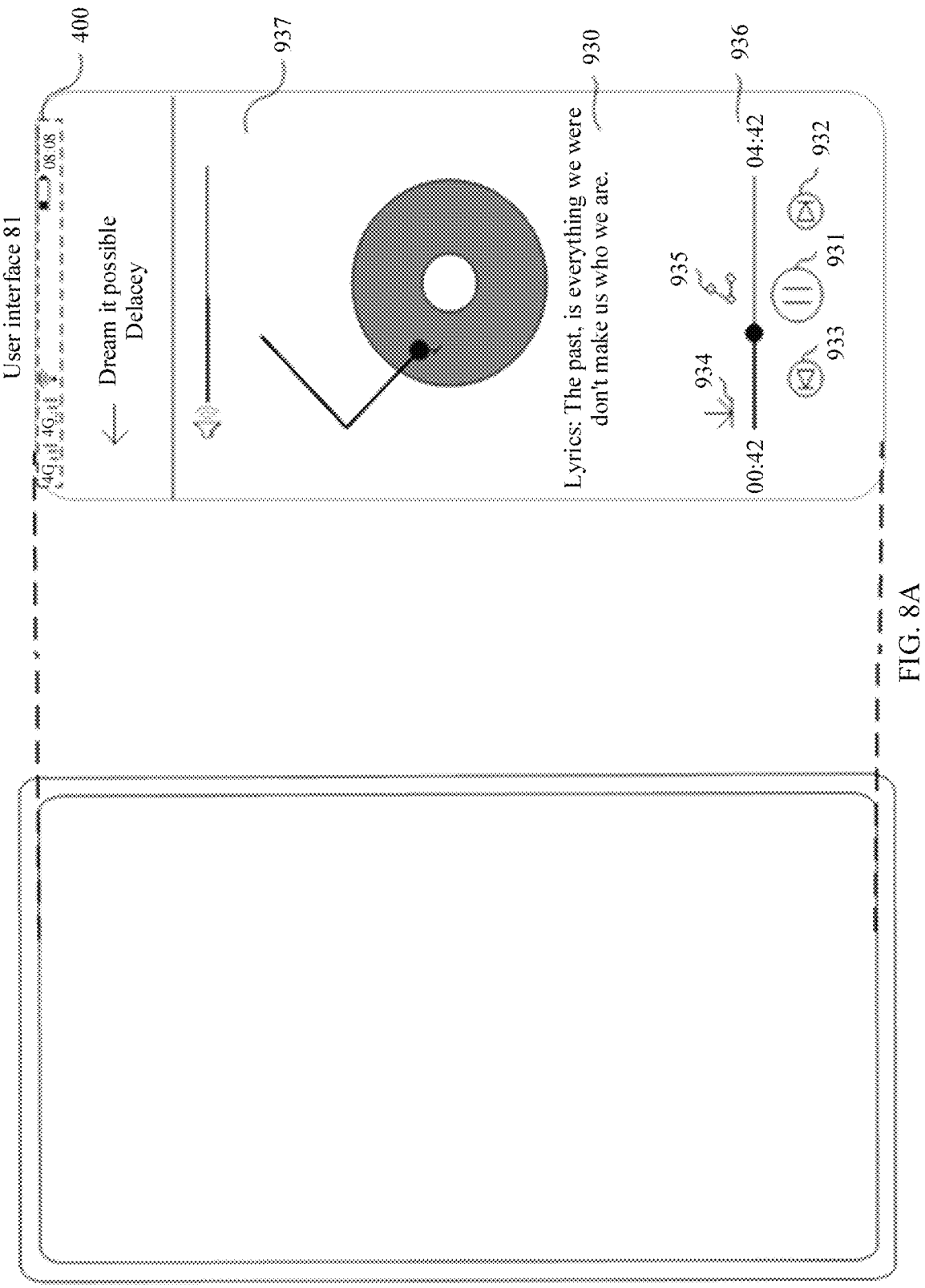
Figure 8B:
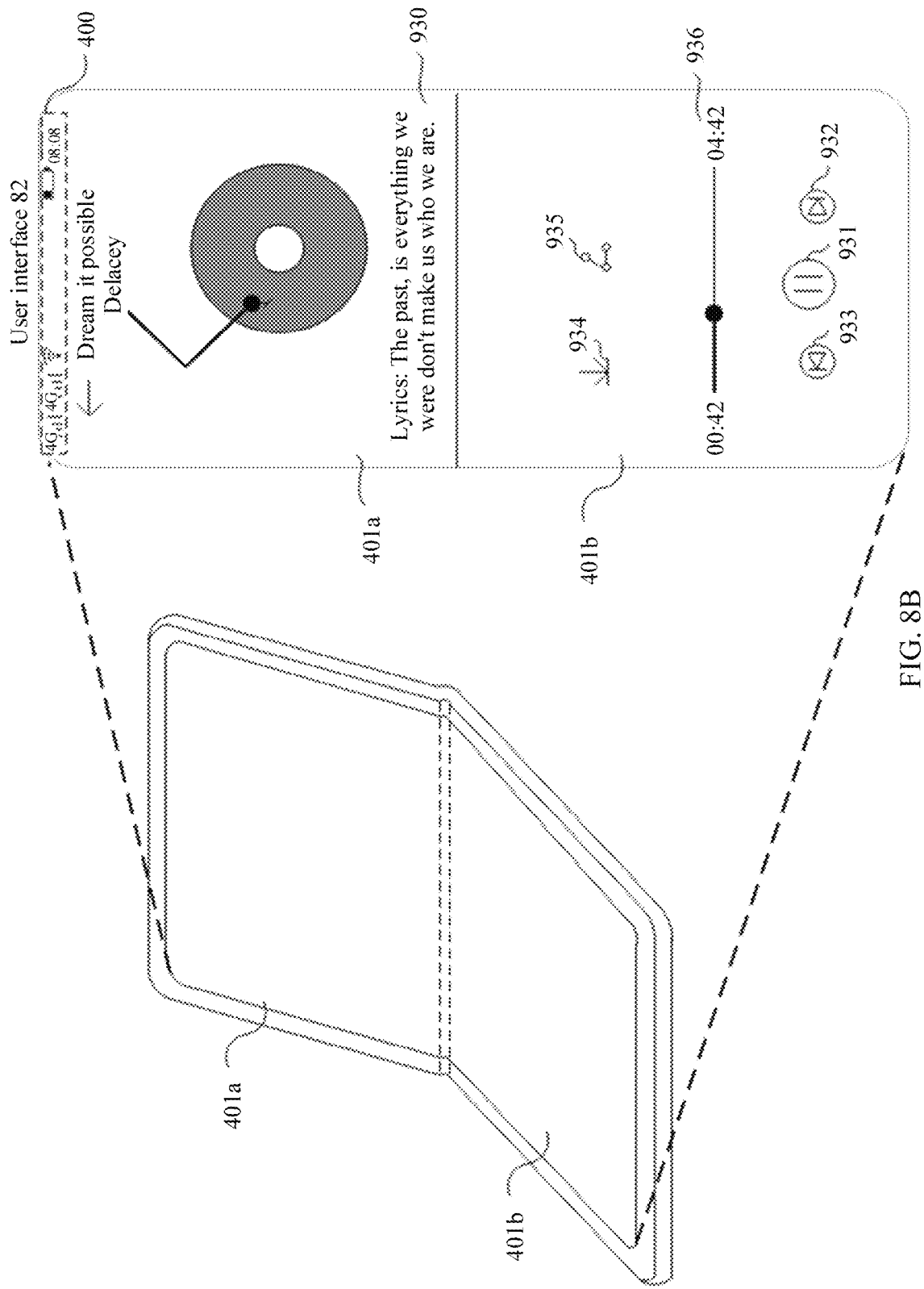

This is similar to Example 2 to Example 4. As shown in FIG. 8A, the electronic device is in an expanded state. The electronic device displays a user interface 81. The user interface 81 includes the status bar 400 and a first application interface (for example, a music play interface 937). As shown in FIG. 8B, when the electronic device displays the user interface 81, if it is detected that the electronic device switches from an expanded state to a folded state, the electronic device displays a user interface 82. The main interaction elements (for example, a pause play button 931, a fast-forward play button 932, a rewind play button 933, and a play progress button 936) are displayed in the main display area (for example, the display area 401b), and the main display elements (for example, lyrics 930 and the status bar 400) are displayed in the main display area (for example, the display area 401a).

It should be noted that Example 2 to Example 5 are described by using an example in which the to-be-displayed interface includes the first application interface and the status bar. It may be understood that the to-be-displayed interface may also include a system interface and a status bar (for example, Example 6). The system interface may be a home screen, a leftmost screen, a lock screen, or the like.

Example 6

Figures 1, 9A:
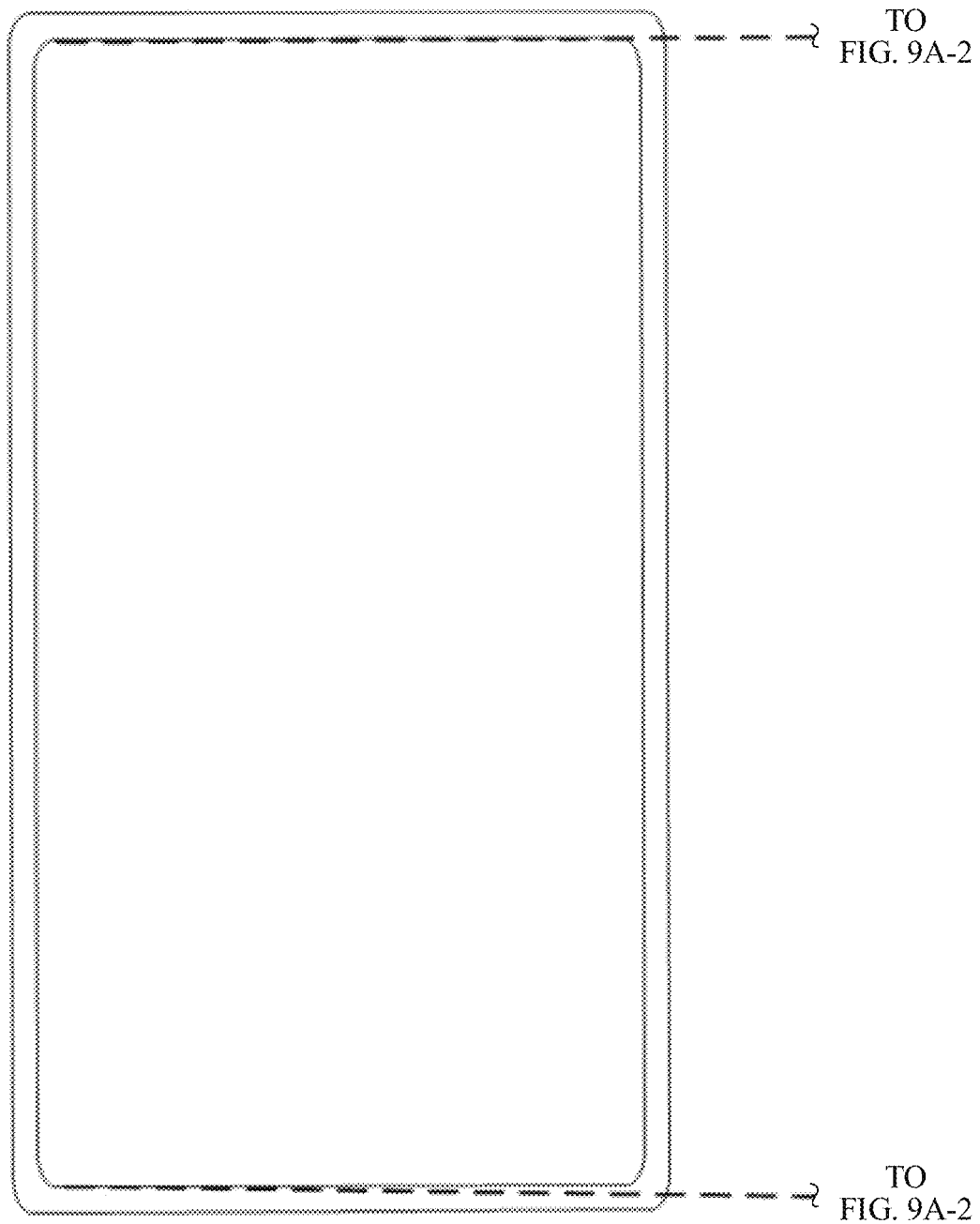
Figures 2, 9A:
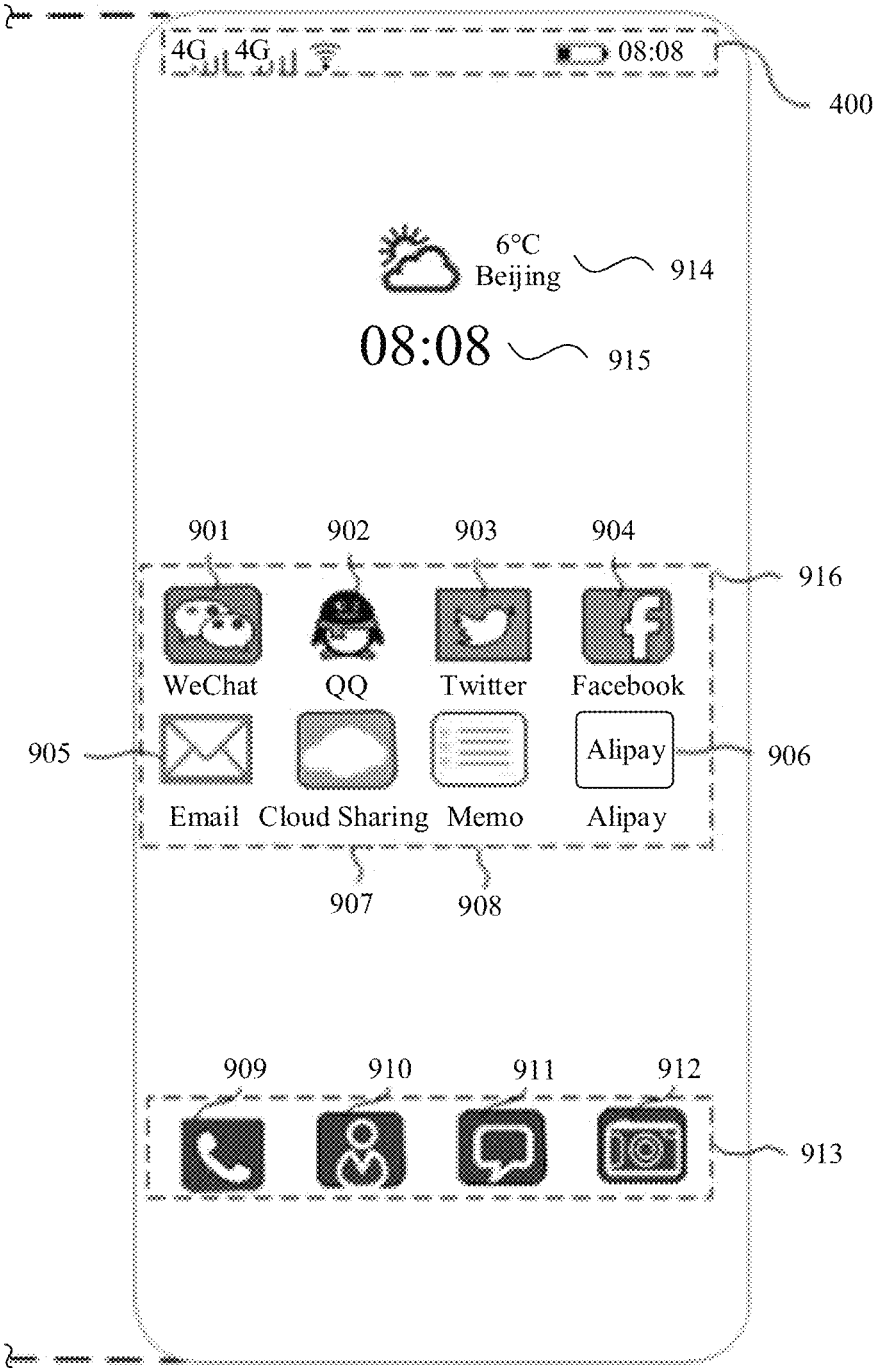
Figures 1, 9B:
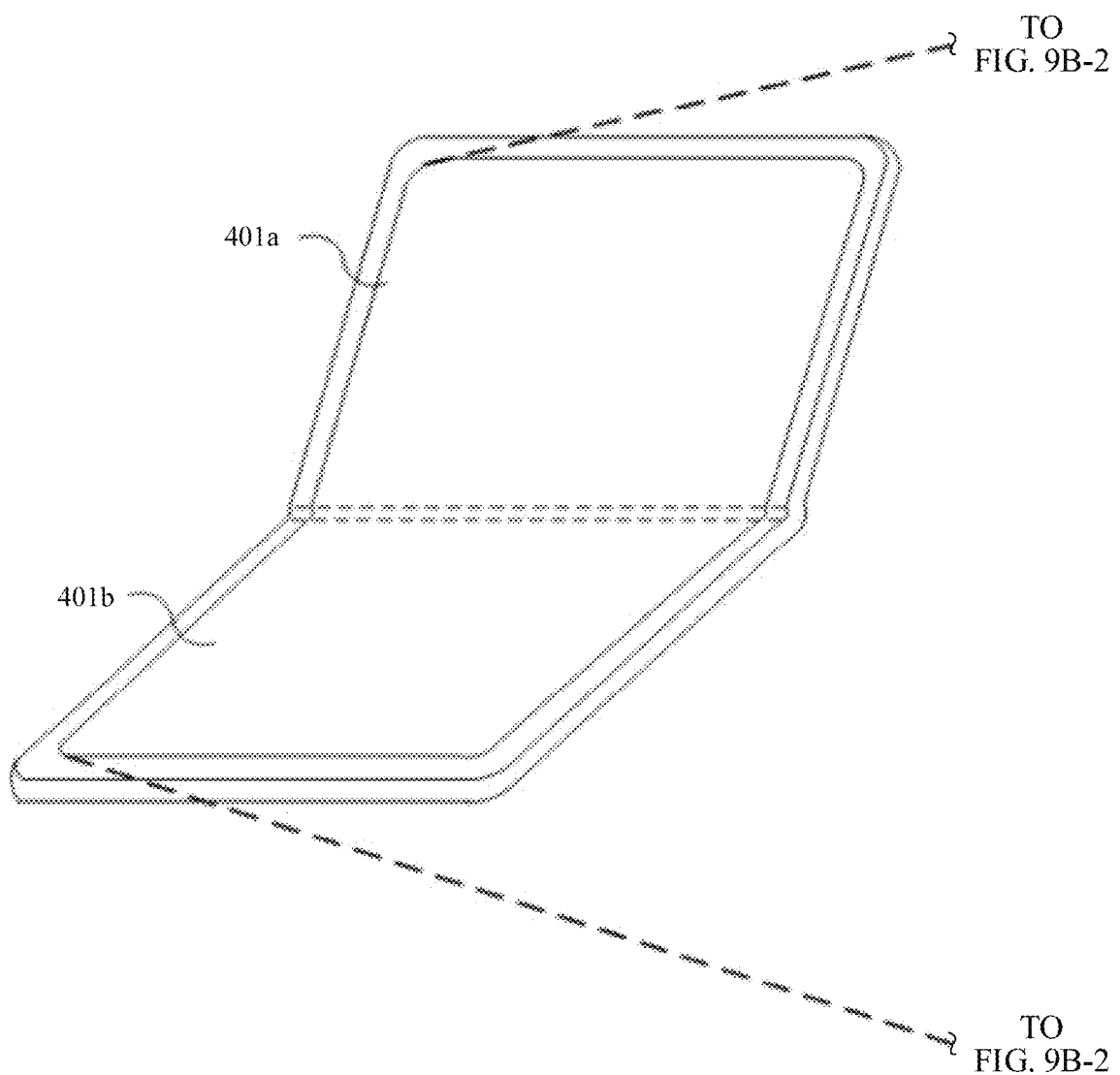
Figures 2, 9B:
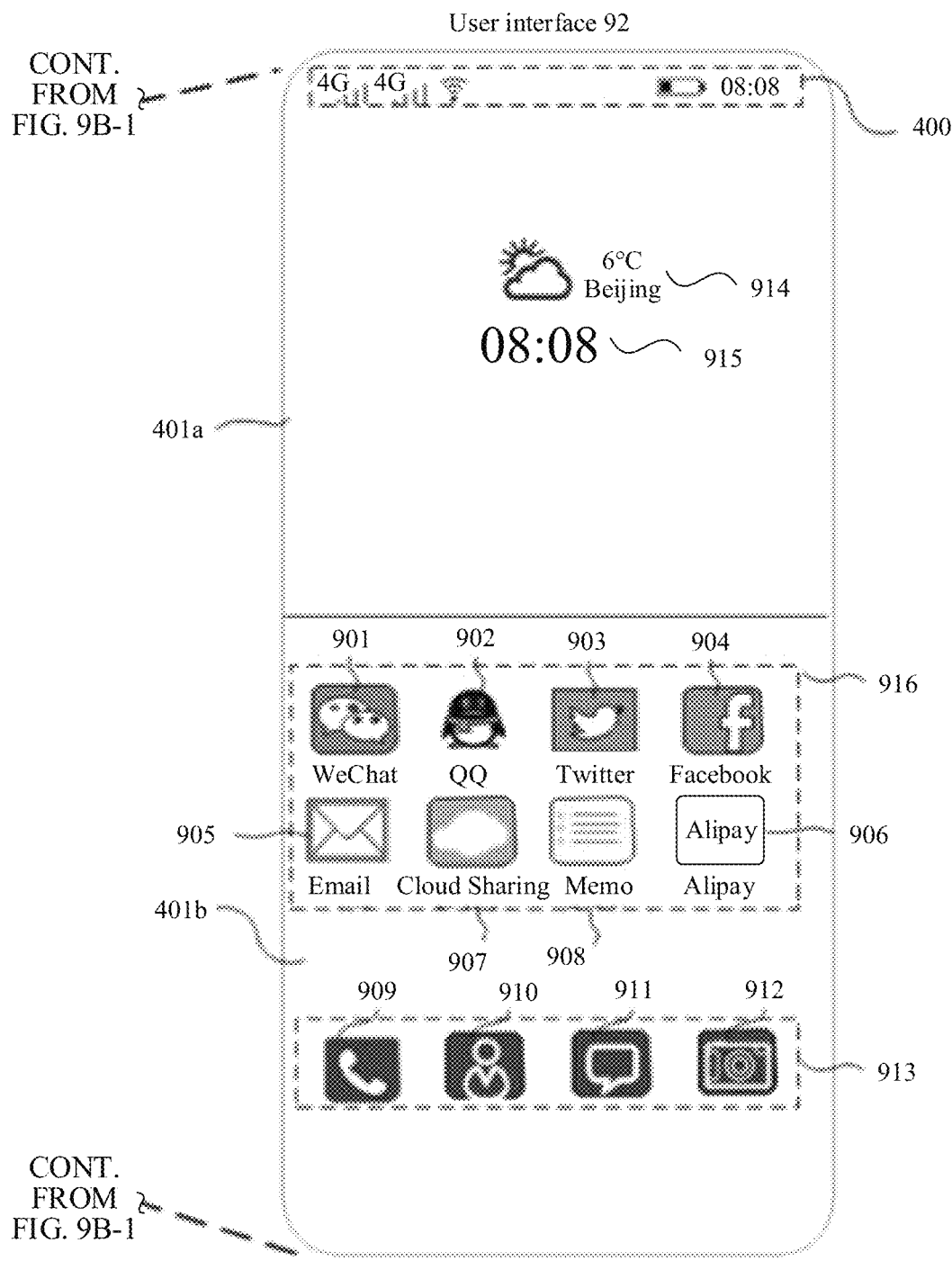

As shown in FIG. 9A-1 and FIG. 9A-2, the electronic device is in an expanded state. The electronic device displays a user interface 91. The user interface 91 includes the status bar 400 and the home screen. The home screen includes display elements such as weather information 914, time information 915, an application icon bar 916, and a shortcut application bar 913. The application icon bar 916 may include one or more application icons, such as a WeChat icon 901, a QQ icon 902, a Twitter icon 903, a Facebook icon 904, an Email icon 905, an Alipay icon 906, a Cloud Sharing icon 907, and a Memo icon 908. The shortcut application bar 913 may include one or more icons, for example, a phone button 909, a contacts button 910, an SMS message button 911, and a camera button 912. This is similar to Example 2 to Example 5. As shown FIG. 9B-1 and FIG. 9B-2, when the electronic device displays the user interface 91, if it is detected that the electronic device switches from an expanded state to a folded state, the electronic device performs step 301 to step 306 to display a user interface 92. The main interaction elements (for example, the application icon bar 916 and the shortcut application bar 913) are displayed in the main interaction area (for example, the display area 401b), and the main display elements (for example, the weather information 914 and the time information 915) are displayed in the main display area (for example, the display area 401a).

It should be noted that Example 2 to Example 6 are described by using a scenario in which content displayed by the electronic device before and after folding does not change. In other words, a user interface (for example, the user interface 51, the user interface 61, the user interface 71, the user interface 81, or the user interface 91) displayed when the electronic device switches from an expanded state to a folded state is a to-be-displayed user interface. It may be understood that the method described in embodiments of this application is also applicable to a scenario in which content displayed by the electronic device before and after folding changes. For example, when the electronic device displays a first user interface, if it is detected that the electronic device switches from an expanded state to a folded state, the electronic device respectively displays the first user interface and a second user interface in the first display area and the second display area. The second user interface may be, for example, a user interface (referred to as a recently displayed user interface below) displayed by the electronic device before the first user interface is displayed, or may be a user interface that is at an upper layer than the first user interface, or may be a user interface that is at a same layer as the first user interface. For the user interface that is at an upper layer than the first user interface, for example, when the first user interface is a chat interface of WeChat, a chat information list interface is the user interface that is at an upper layer than the first user interface.

Example 7

Figure 10A:
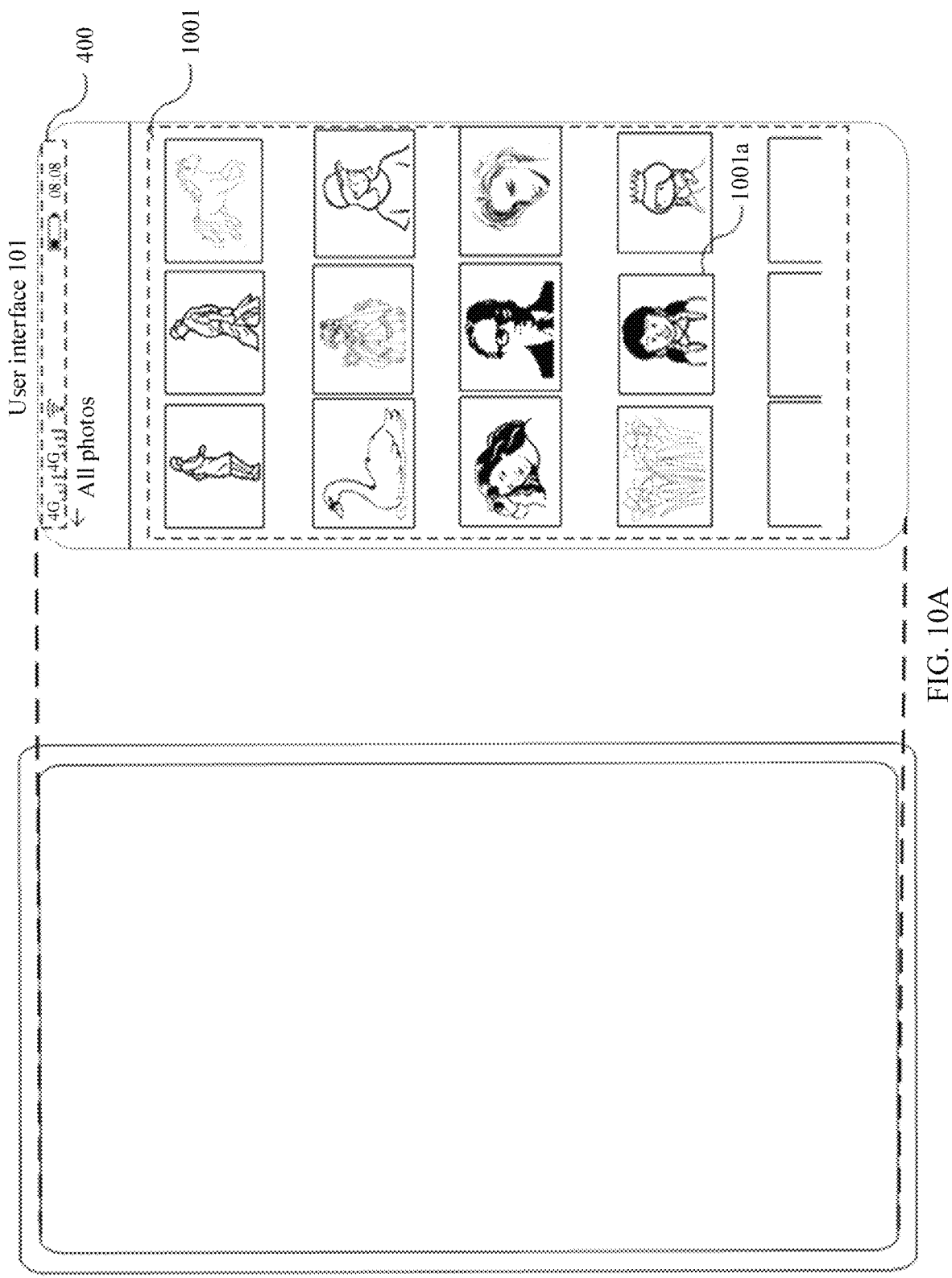
Figure 10B:
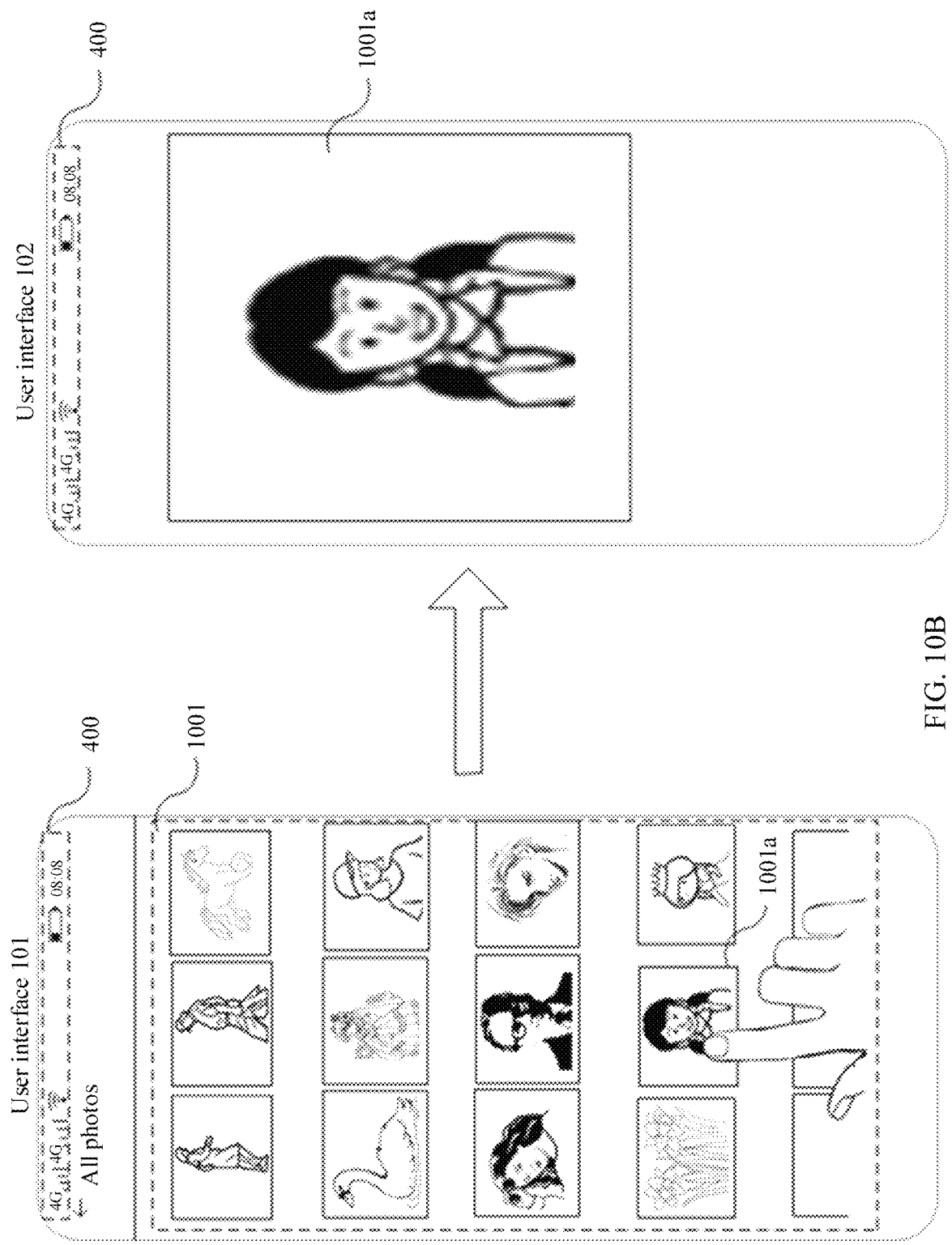
Figure 10C:
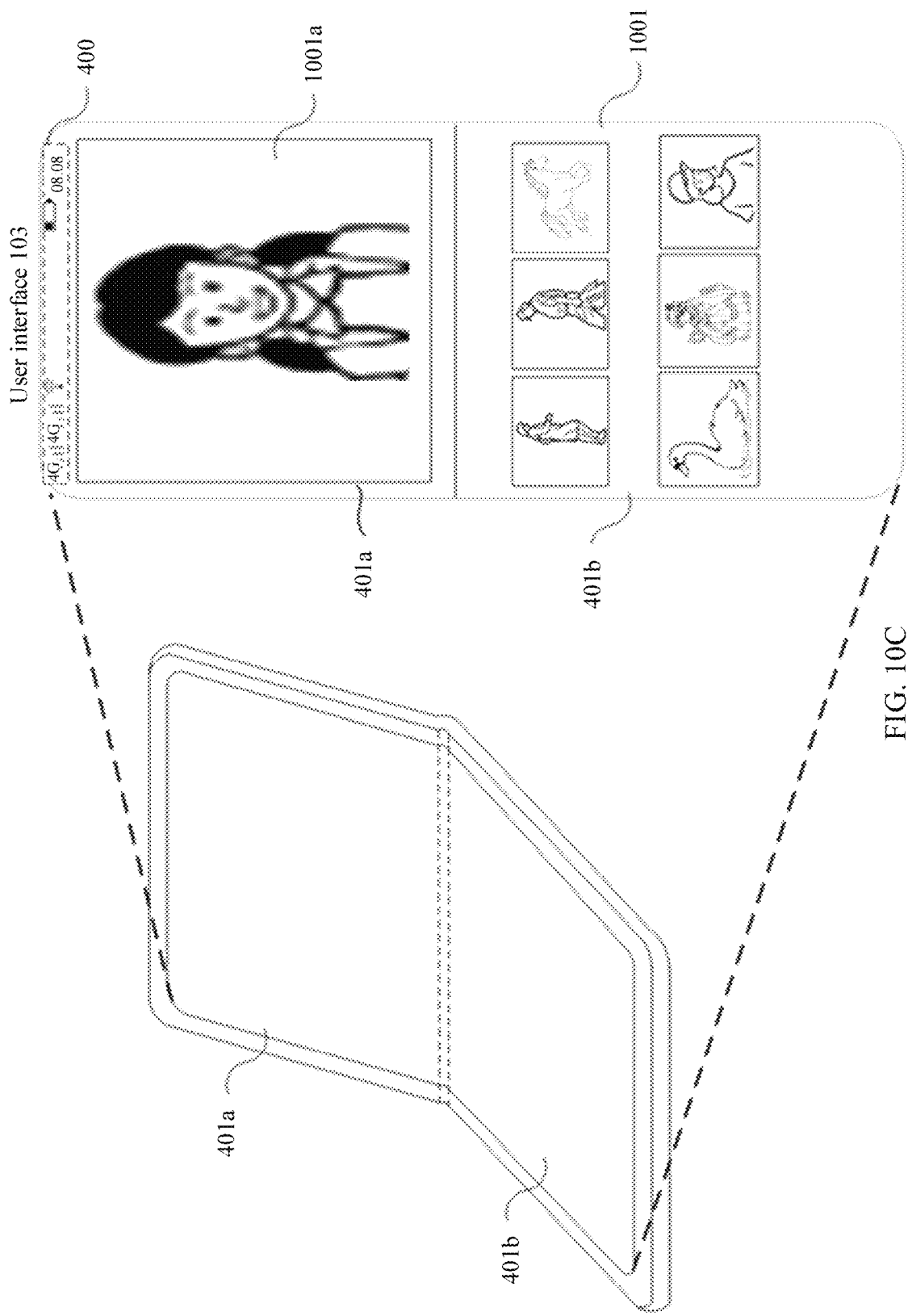

As shown in FIG. 10A, the electronic device is in an expanded state. The electronic device displays a user interface 101. The user interface 101 includes a gallery 1001. The gallery 1001 includes several pictures, for example, a picture 1001a. In response to an operation that the user taps the picture 1001*a*, the electronic device displays a user interface 102. The user interface 102 includes the picture 1001*a*. When the electronic device displays the user interface 102, if it is detected that the electronic device switches from an expanded state to a folded state, the electronic device performs step 301 to step 306. It is assumed that the content displayed by the electronic device before folding is the first user interface (for example, the user interface 102), and the content displayed by the electronic device after folding is the first user interface (for example, the user interface 102) and the recently displayed user interface (for example, the user interface 101), as shown in FIG. 10B. In this case, as shown in FIG. 10C, the electronic device displays a user interface 103. In other words, the first user interface (for example, the user interface 101) and the second user interface (the user interface 102) are to-be-displayed user interfaces. The one or more display elements obtained by the electronic device include a display element on the first user interface and a display element on the second user interface. The electronic device displays the main display element (for example, the picture 1001*a*) on the first user interface and the second user interface in the main display area (for example, the display area 401*a*) and displays the main interaction element (for example, the gallery 1001) on the first user interface and the second user interface in the main interaction area (for example, the display area 401*b*).

Figure 10D:
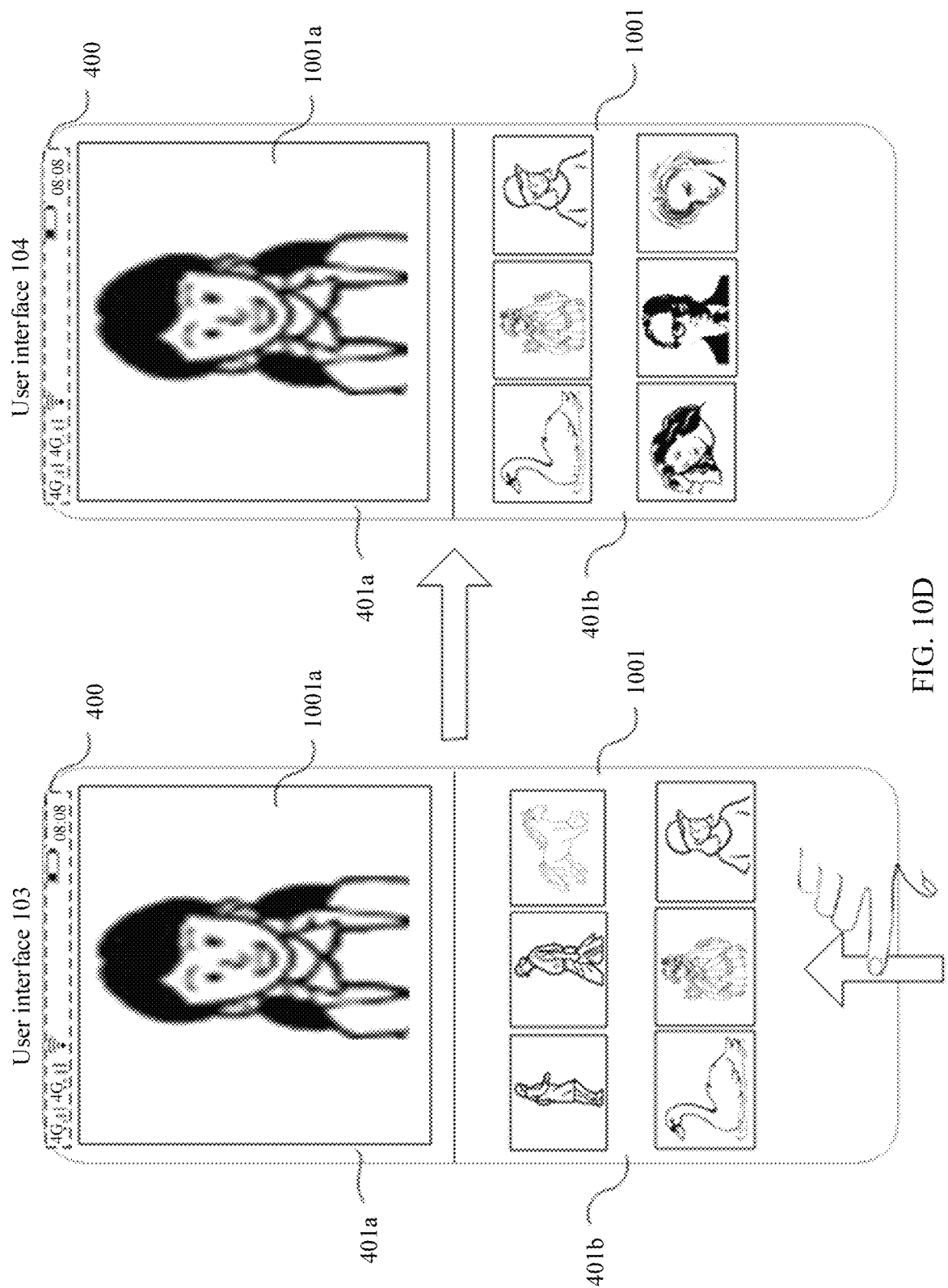

It should be noted that the electronic device may display all of the obtained display elements, or may display only some of the obtained display elements. For example, as shown in FIG. 10C, the electronic device displays only some display elements (for example, the picture 1001*a*, a picture 1001*b*, and a picture 1001*c*) in the obtained display elements (for example, the picture 1001*a*, the picture 1001*b*, the picture 1001*c*, a picture 1001*d*, a picture 10001*e*, and a picture 10010. Optionally, as shown in FIG. 10D, when some elements are displayed, in response to an operation such as a slide up/down or slide left/right operation of the user, the electronic device may change some displayed display elements.

Example 7 is described by using an example in which the second user interface is the recently displayed user interface. Example 8 is described below by using an example in which the second user interface is the user interface that is at a same layer as the first user interface.

Example 8

Figures 1, 11A:
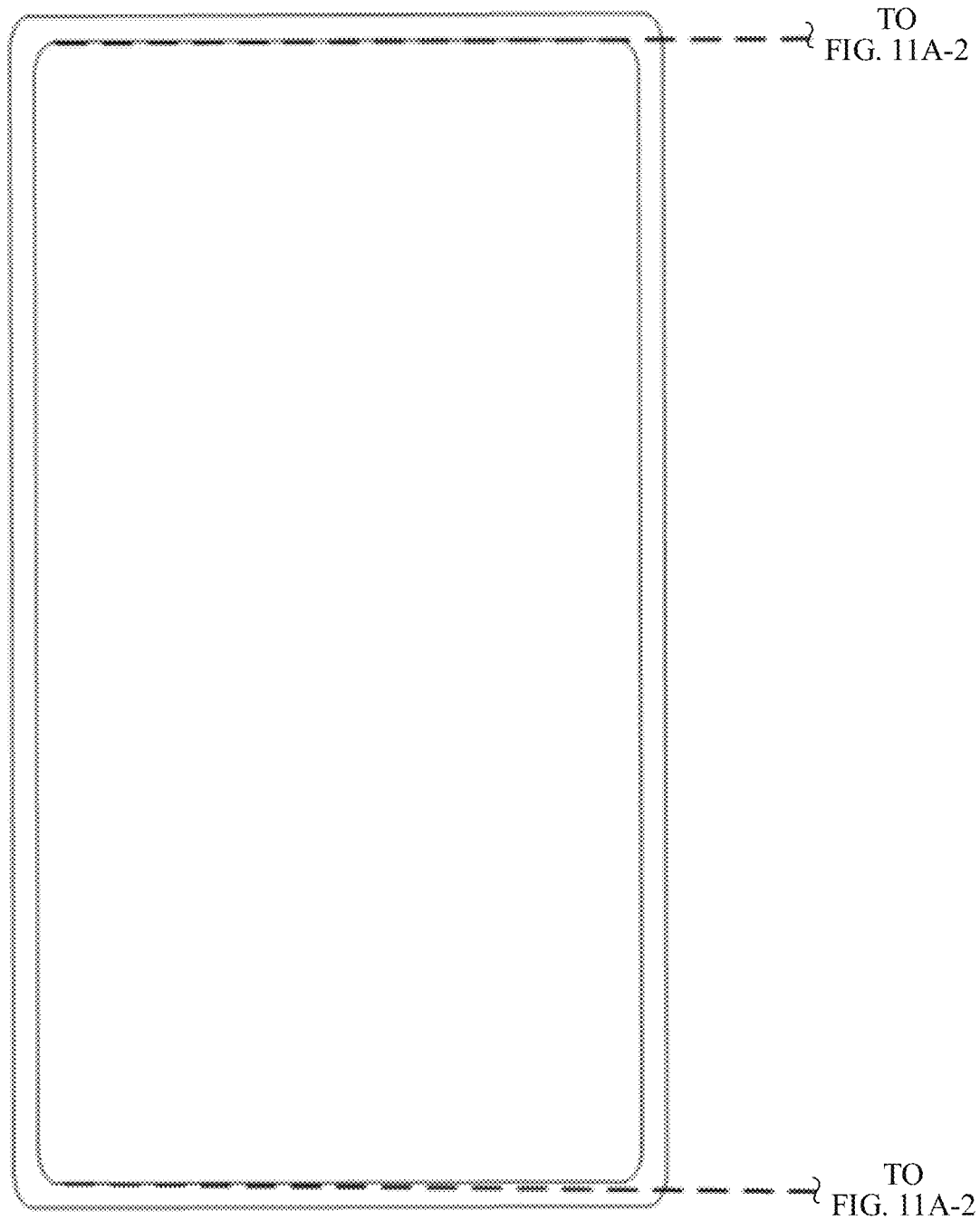
Figures 2, 11A:
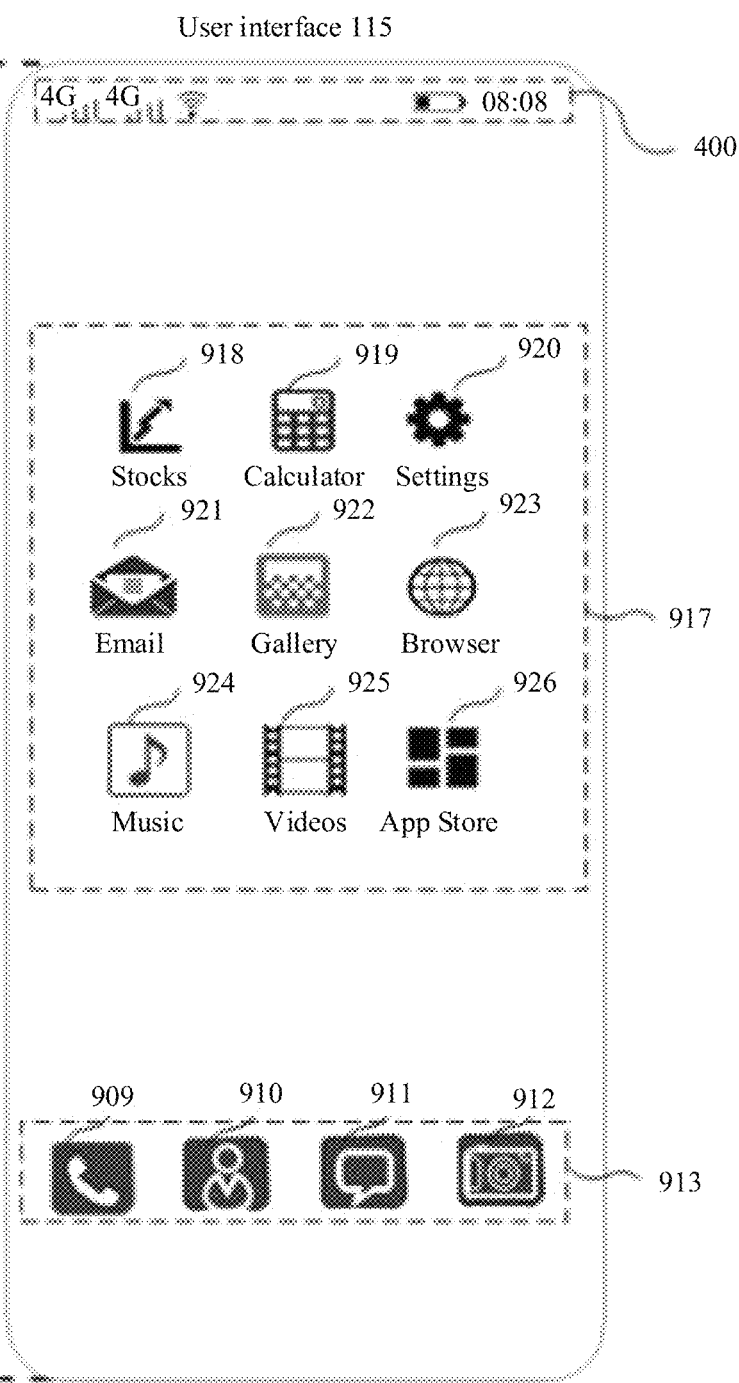
Figures 1, 11B:
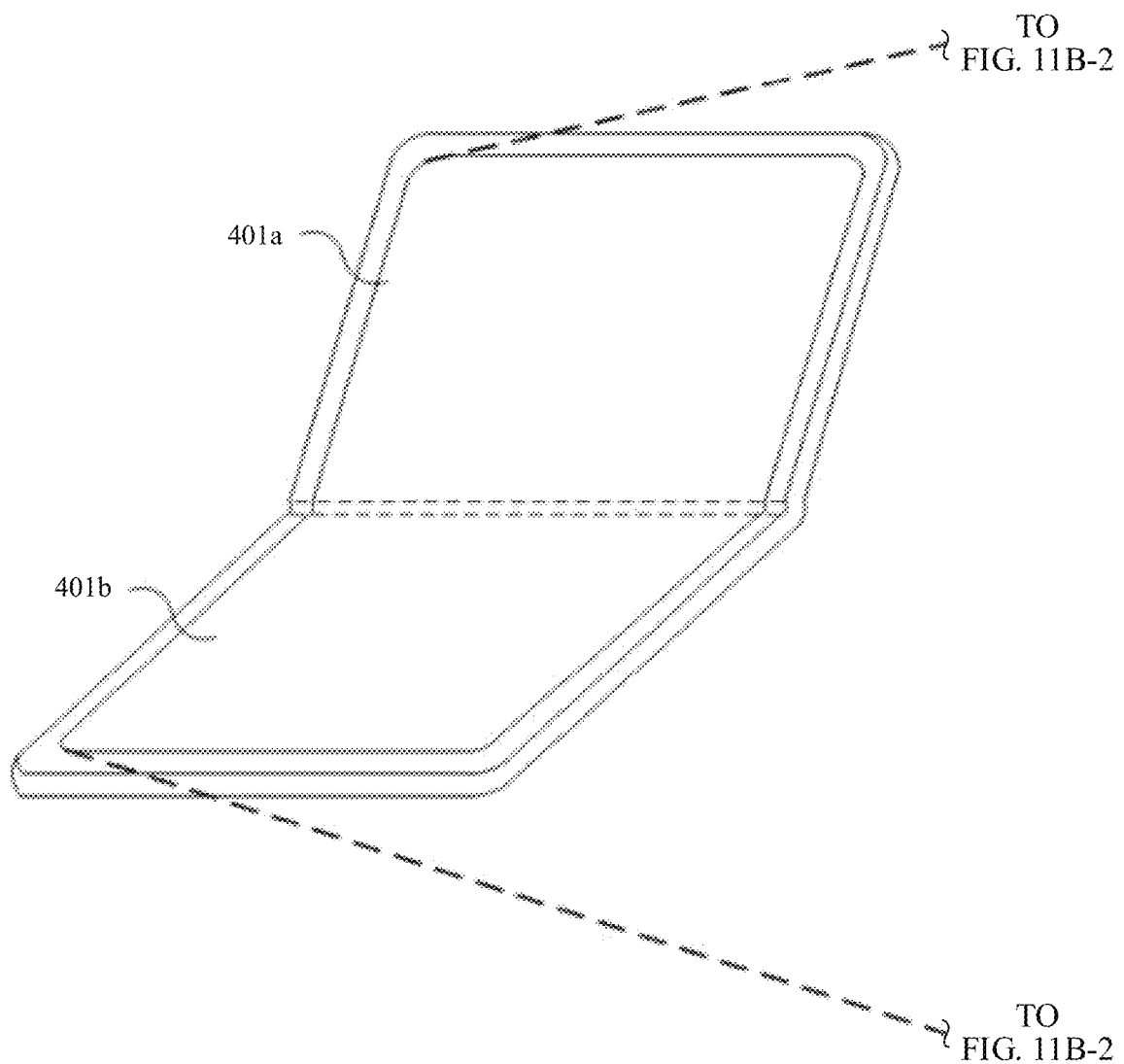
Figures 2, 11B:
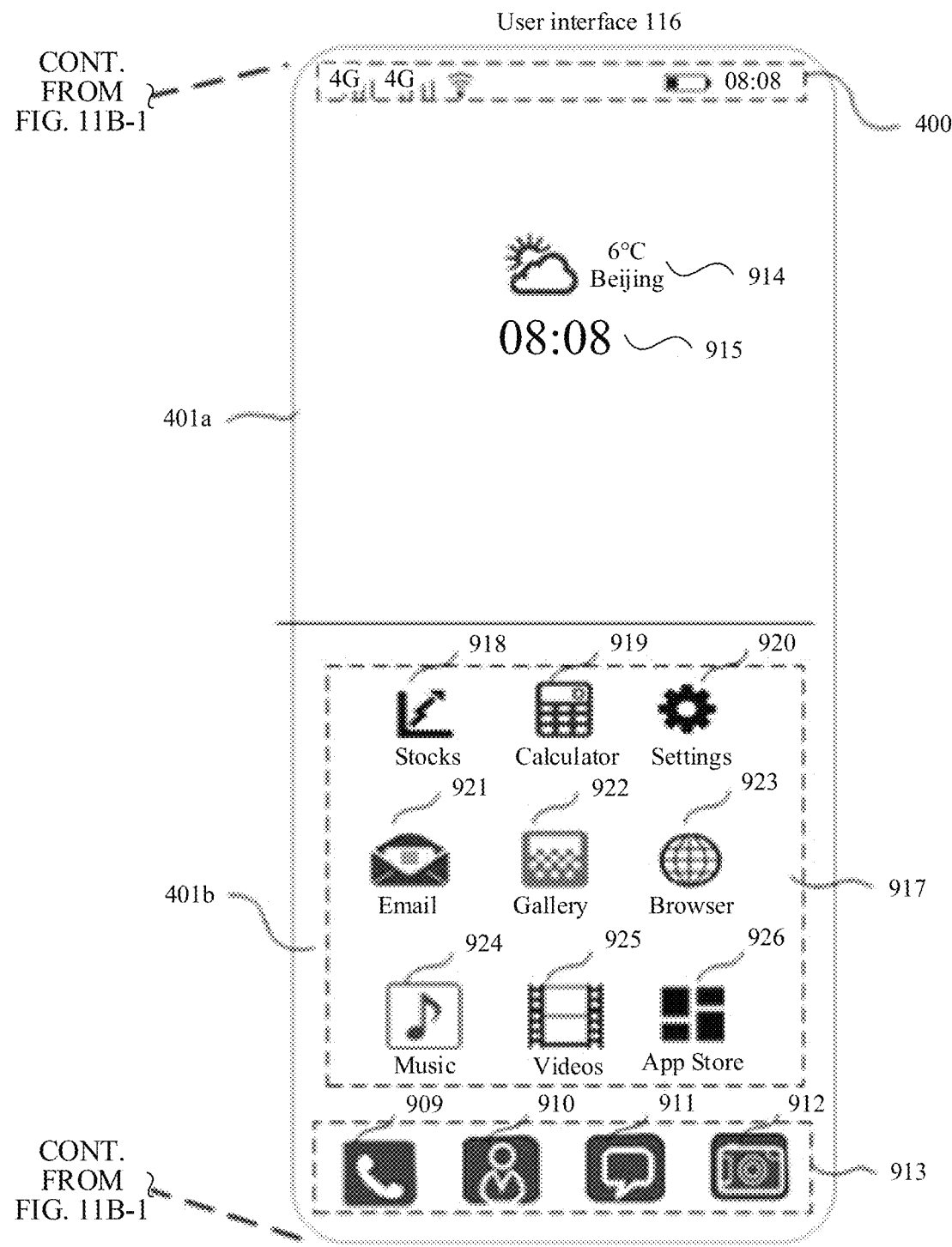

As shown in FIG. 11A-1 and FIG. 11A-2, the electronic device is in an expanded state. The electronic device displays a user interface 115. The user interface 115 includes the status bar 400 and a second main interface. The second main interface includes display elements such as an application icon bar 917 and the shortcut application bar 913. The application icon bar 917 may include icons such as Stocks 918, Calculator 919, Settings 920, Email 921, Gallery 922, Browser 923, Music 924, Videos 925, and APP Store 926. When the electronic device displays the user interface 115, if it is detected that the electronic device switches from an expanded state to a folded state, the electronic device displays a user interface 116 shown in FIG. 11B-1 and FIG. 11B-2. The user interface 116 includes the display elements (for example, the application icon bar 917 and the shortcut application bar 913) on the second main interface and display elements (for example, the weather information 914 and the time information 915) on a user interface that is at a same layer as the second main interface, that is, the first main interface (for example, the interface 91). The main interaction element is displayed in the main interaction area, and the main display element is displayed in the main display area.

Optionally, after the electronic device is triggered based on the first condition to perform step 301 to step 306, the electronic device may repeatedly perform step 301 to step 306. The electronic device stops performing step 301 to step 306 until the electronic device meets a second condition. It should be noted that the first condition and the second condition may be the same, or may be different. In a possible manner, the foregoing second condition may be that both the bodies of the electronic device are supported and are at a same height. In another possible manner, the foregoing second condition may be a preset second user operation, for example, an operation of sliding upward from a lower edge of the main interaction area.

Example 9

Figure 12A:
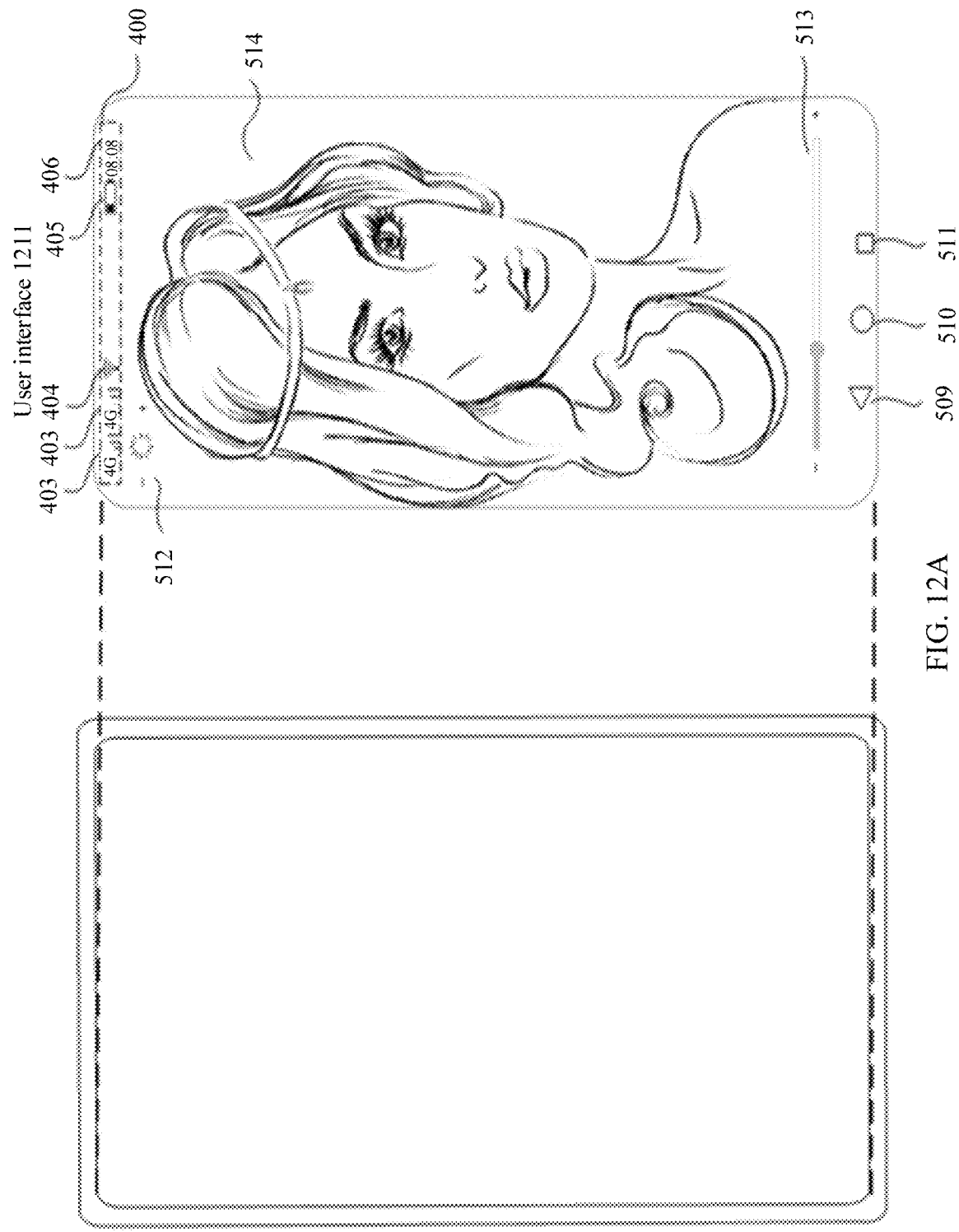
Figure 12B:
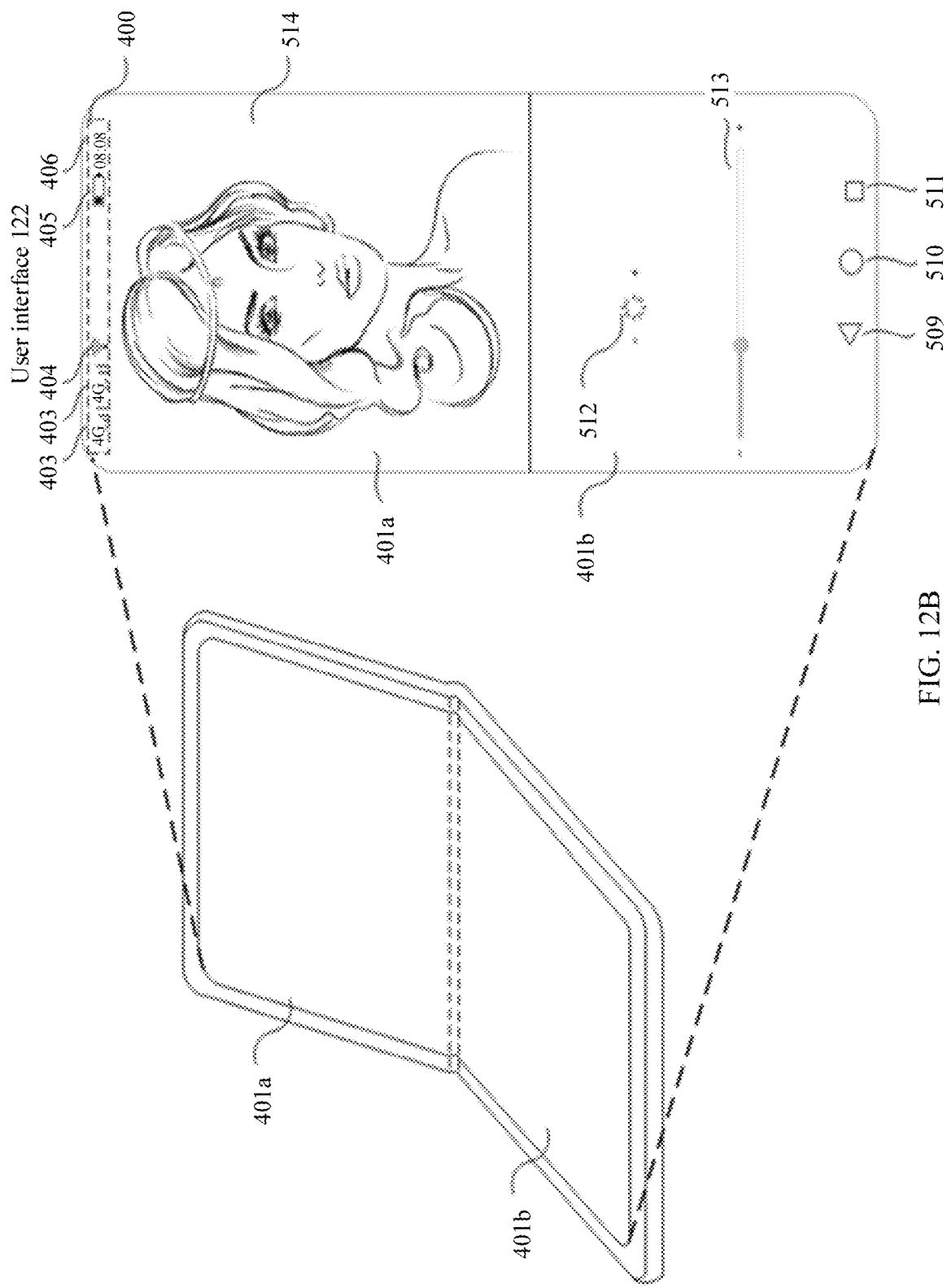
Figure 12C:
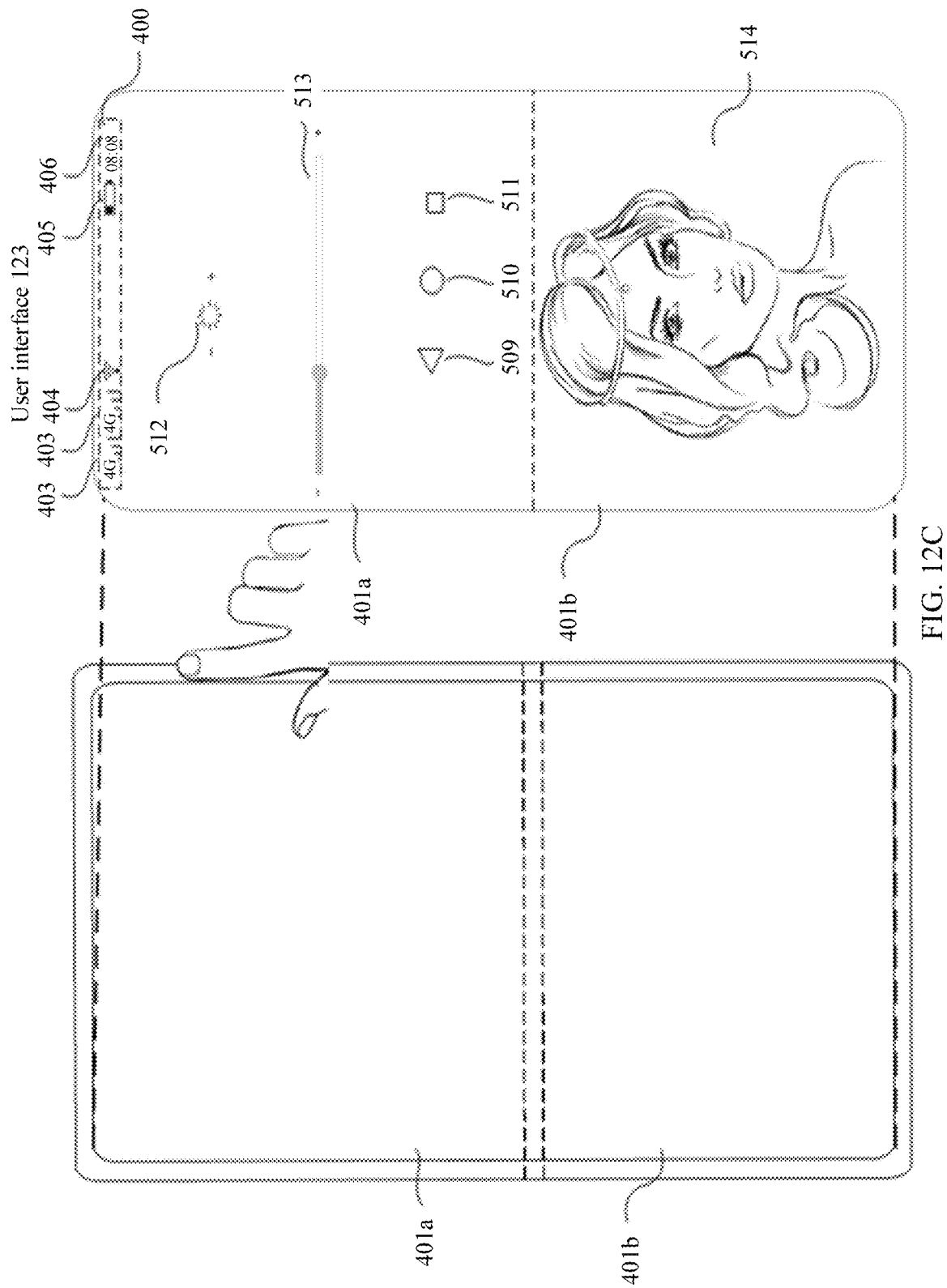

As shown in FIG. 12A, the electronic device is in an expanded state. The electronic device displays a user interface 1211. As shown in FIG. 12B, when the electronic device displays the user interface 1211, the electronic device switches from an expanded state to a folded state. Therefore, the first condition is met (for example, the electronic device is in a folded state), and the electronic device performs step 301 to step 306 to display a user interface 122. The main interaction element is displayed in the main interaction area, that is, the display area 401*b*, and the main display element is displayed in the main display area, that is, the display area 401*a*. The electronic device repeatedly performs step 301 to step 306. When the user expands the folded-state electronic device and holds the electronic device, the electronic device determines that the display area 401*a* is held, and the display area 401*b* is not supported. In this case, the electronic device determines that the held display area 401*a* is the main interaction area, and the unsupported display area 401*b* is the main display area. The electronic device displays the main interaction element in the display area 401*a*. As shown in FIG. 12C, the electronic device displays the main display element in the unsupported display area 401*b*.

It is assumed that the foregoing second condition is that both the bodies of the electronic device are supported and are at a same height. In this case, when the electronic device detects that both the first body and the second body are supported, and the first body and the second body are at the same height, the electronic device switches from the user interface 122 back to the user interface 1211.

It should be noted that the second condition may alternatively be a preset user operation. It should be noted that the preset user operation may be any operation, for example, a preset gesture operation. This is not specifically limited herein.

Example 10

Figure 13A:
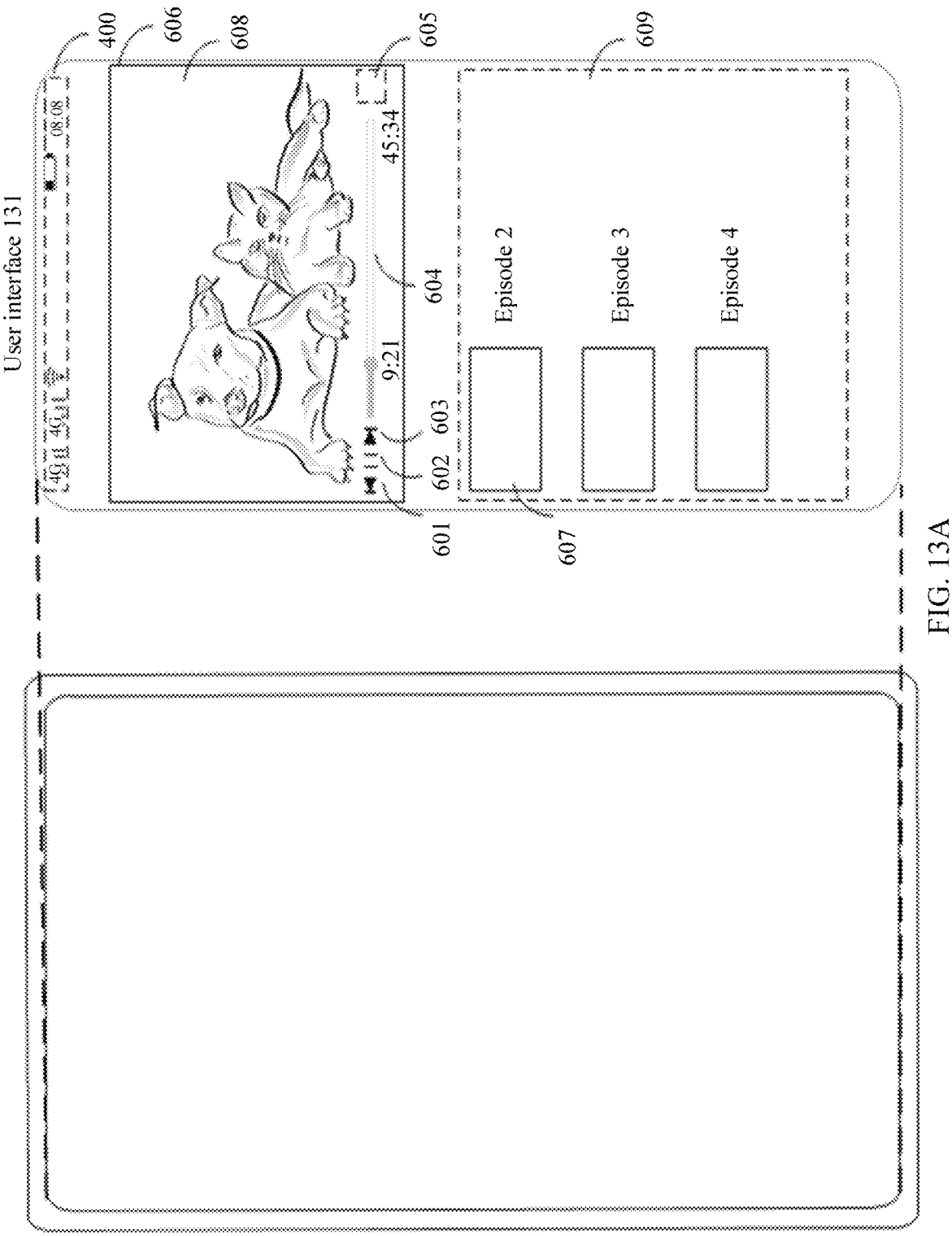
Figures 1, 13B:
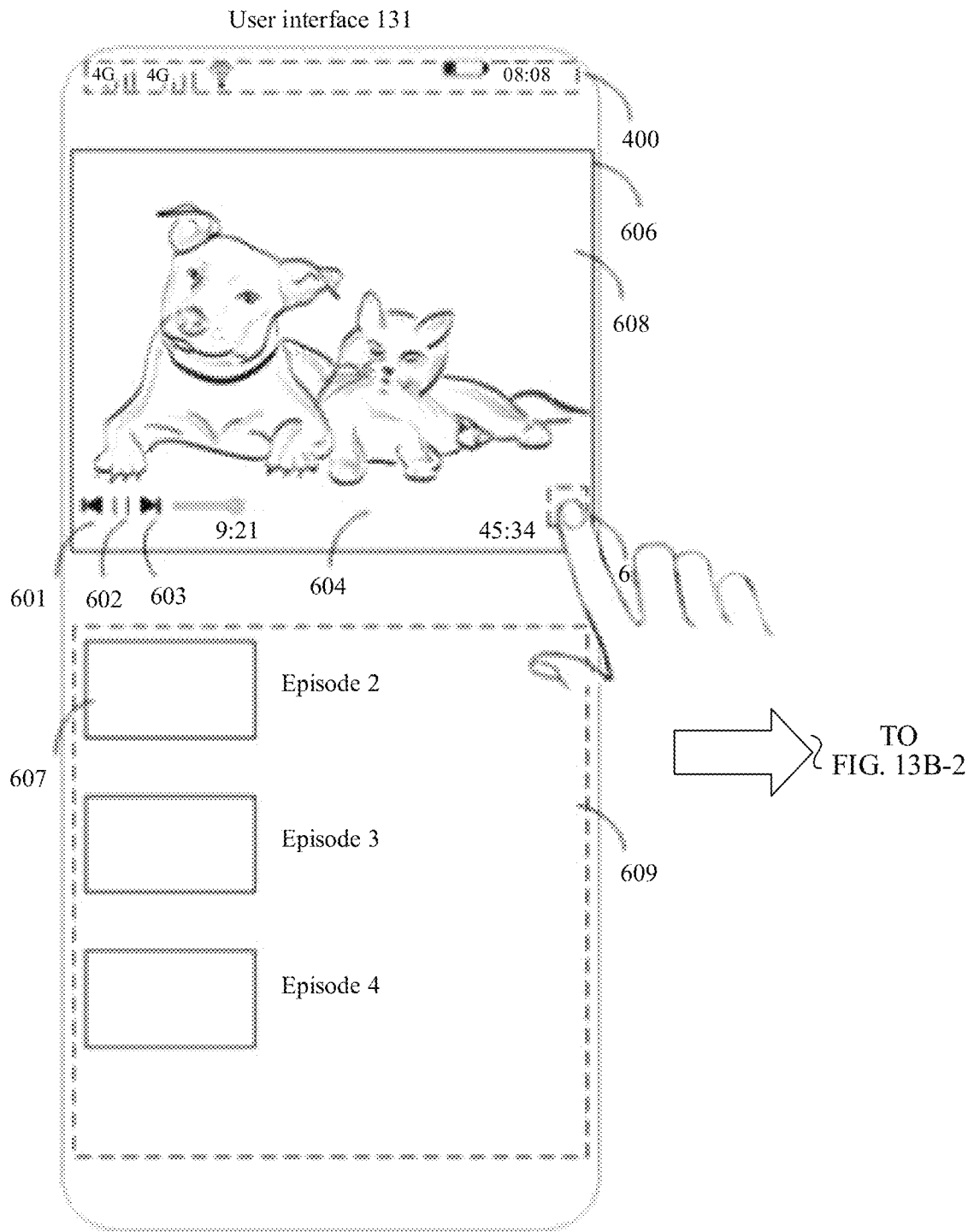
Figures 2, 13B:
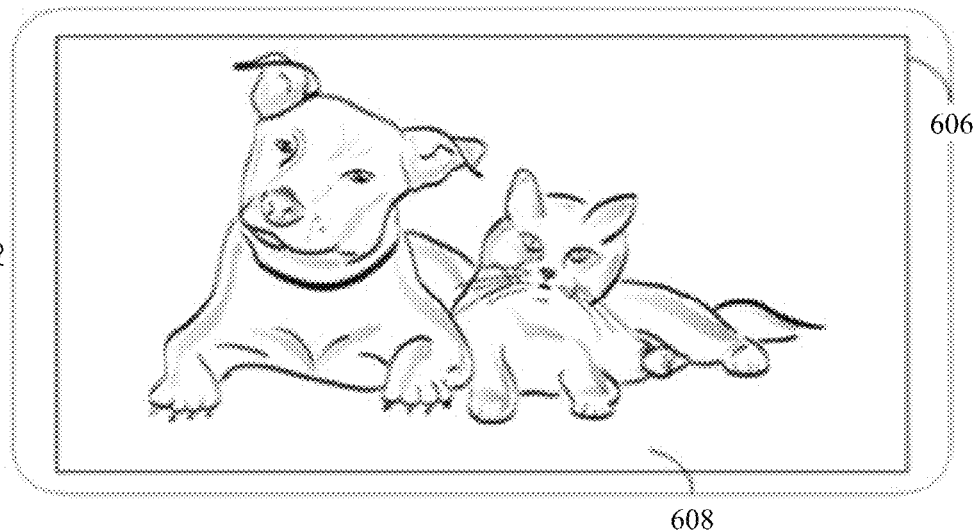
Figure 13C:
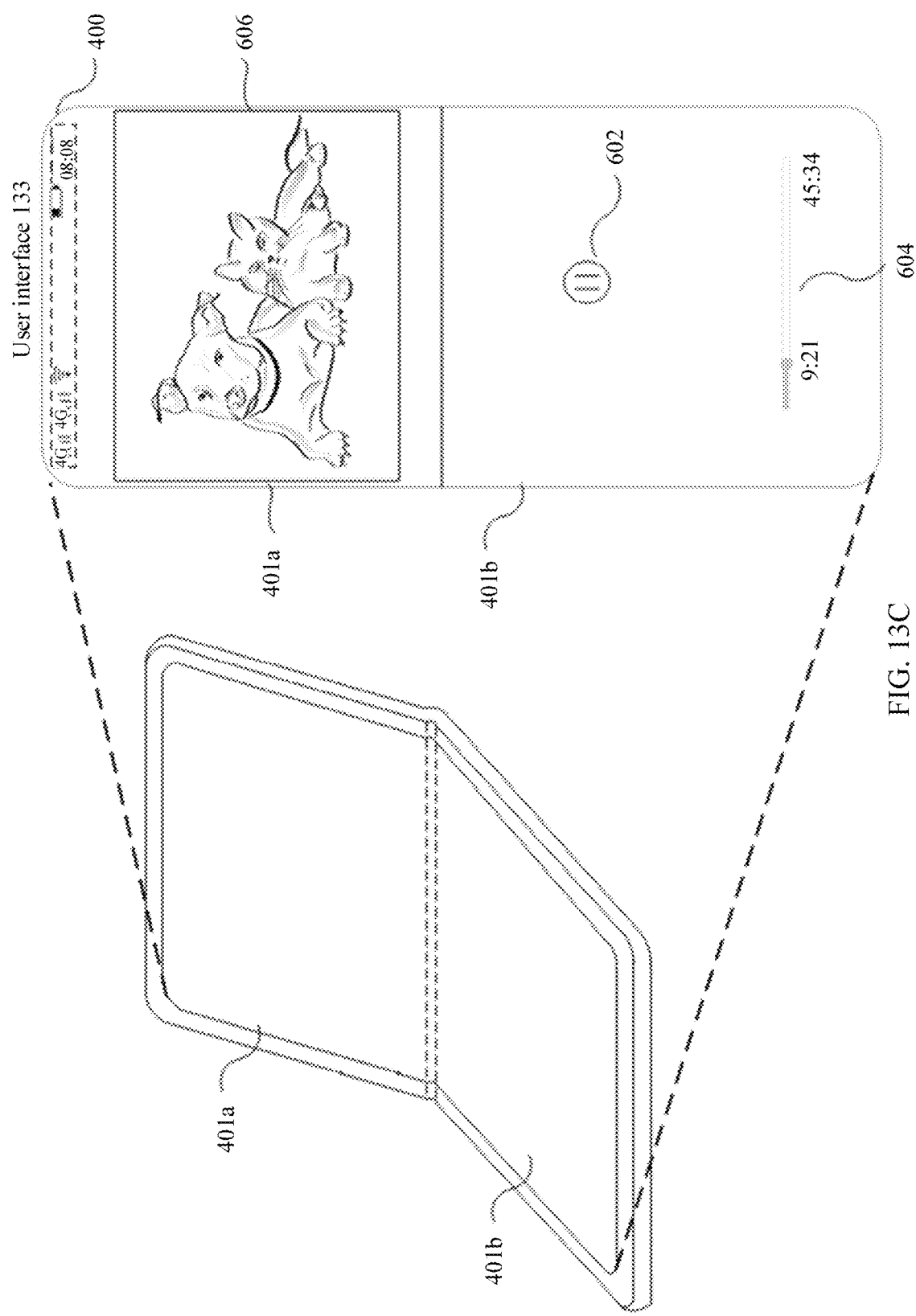
Figure 13D:
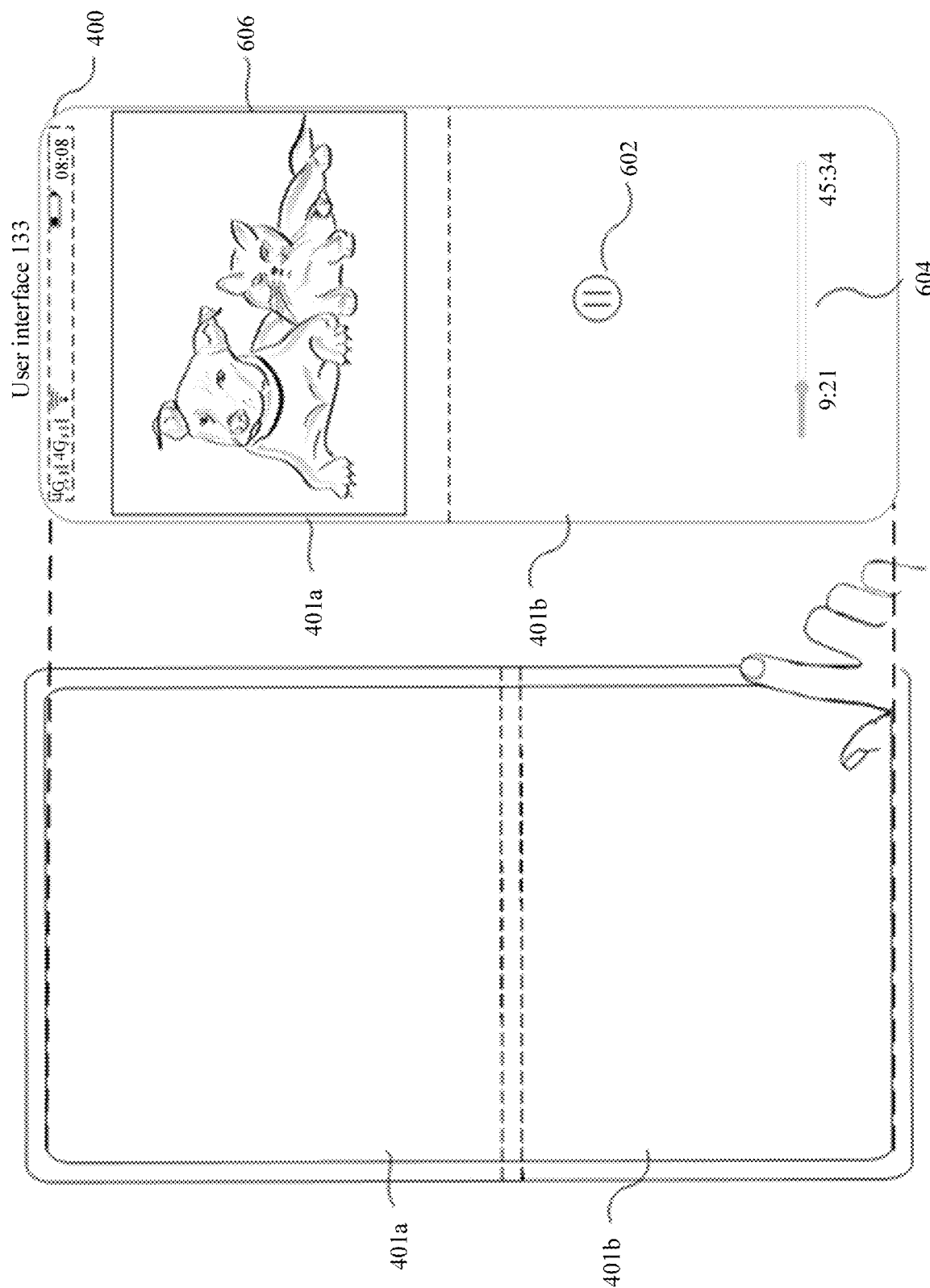
Figures 1, 13E:
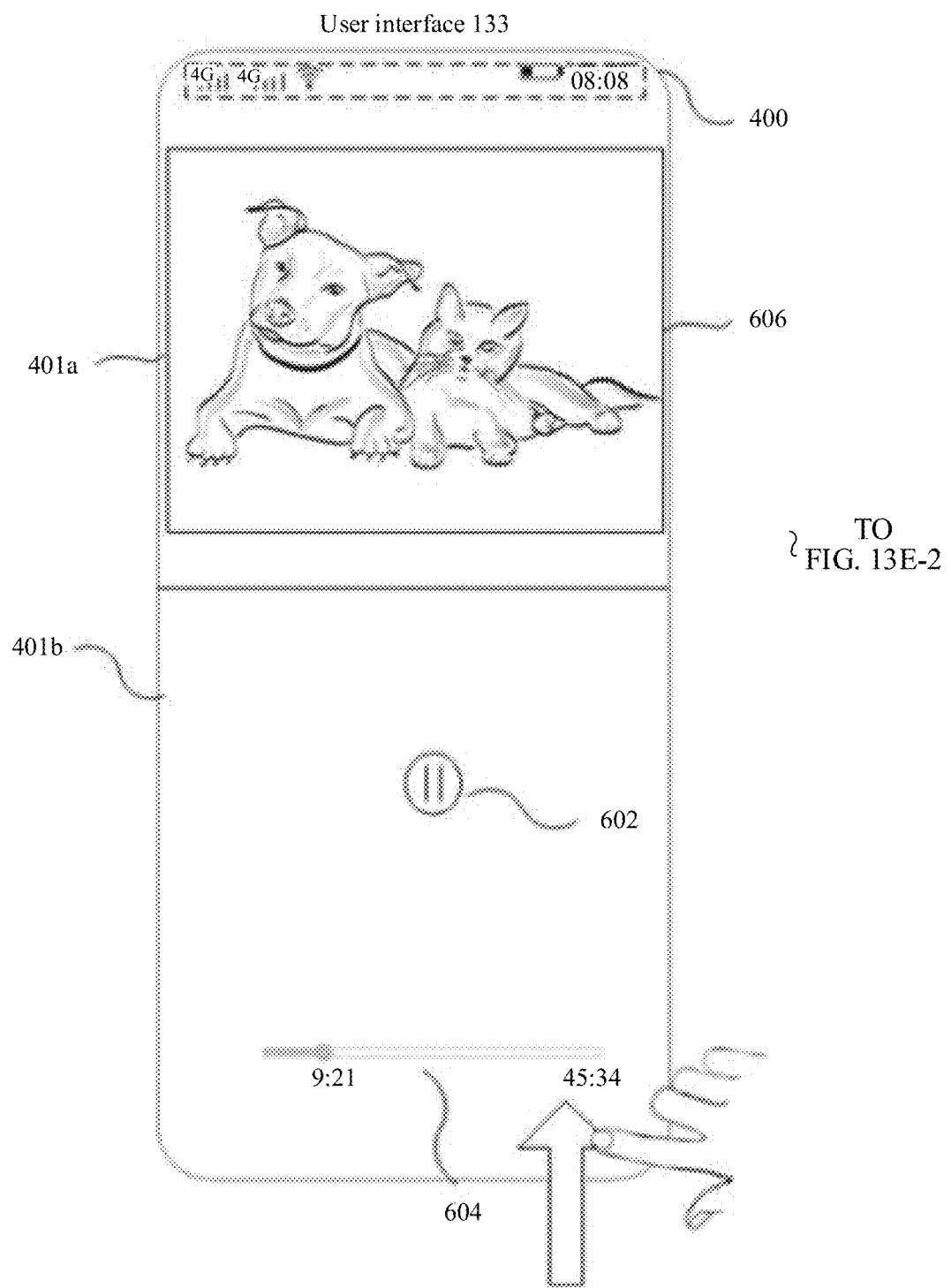
Figures 2, 13E:
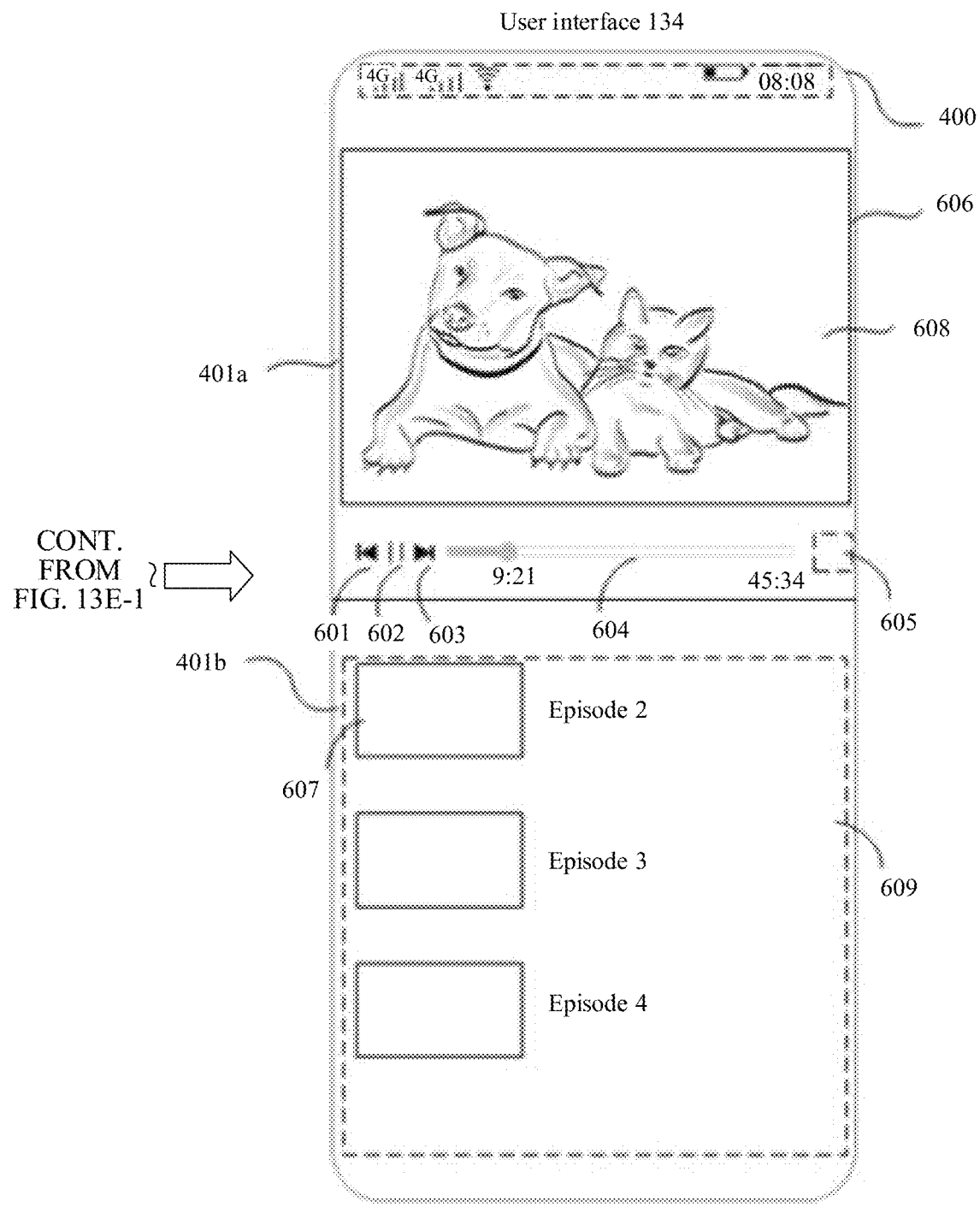

As shown in FIG. 13A, the electronic device is in an expanded state. The electronic device displays a user interface 131. The user interface 131 includes a video play interface 608 and an information recommendation interface 609. The video play interface 608 includes display elements such as a video play window 606, a video play progress rewind button 601, a video play progress fast-forward button 603, a video play pause button 602, a video play progress bar 604, a full-screen setting button 605, and the information recommendation interface 609. The information recommendation interface 609 may include a video 607*a*, a video 607*b*, a video 607c, and the like. As shown in FIG. 13B-1 and FIG. 13B-2, in response to an operation that the user taps the full-screen setting button 605, the electronic device switches from the user interface 131 to a user interface 132. The electronic device displays the video play window 606 in full screen. As shown in FIG. 13C, the electronic device switches from an expanded state to a folded state. Therefore, the first condition is met (for example, the electronic device is in a folded state), and the electronic device performs step 301 to step 306 to display a user interface 133. The main display element (for example, the video play window 606) is displayed in the main display area, and the main interaction elements (for example, the video play pause button 602 and the video play progress bar 604) are displayed in the main interaction area. As shown in FIG. 13D, the electronic device repeatedly performs step 301 to step 306 to display the user interface 133. As shown in FIG. 13E-1 and FIG. 13E-2, when the electronic device displays the user interface 133, the electronic device receives a preset user operation (for example, an operation of sliding upward from a lower edge of the main interaction area). In response to the foregoing preset user operation, the electronic device switches from the displayed user interface 133 to a user interface 134, and stops performing step 301 to step 306.

Optionally, before step 306, the method may further include step 305: The electronic device determines a display element level. Step 306 in which the electronic device displays the main interaction element in the main interaction area and displays the main display element in the main display area specifically includes: The electronic device displays the main interaction element in the main interaction area and displays the main display element in the main display area based on the display element level.

Specifically, according to the method described in embodiments of this application, the display element level may be determined by using the following policies.

Policy 1: Determine a level of the main interaction element based on an operation habit of the user.

The electronic device installs various applications. The electronic device may calculate use frequencies of different main interaction elements of each application in the electronic device. The electronic device may determine an interaction level of each main interaction element based on the use frequency of each main interaction element. For example, a higher use frequency indicates a higher interaction level. A process of calculating the use frequency of the main interaction element may be performed when the electronic device is in a folded state, or may be performed when the electronic device is in an expanded state. This is not limited in some embodiments of this application. The electronic device determines that an interaction level of a main interaction element whose use frequency is greater than a first preset threshold is level 1. The electronic device determines that an interaction level of a main interaction element whose use frequency is less than the first preset threshold and greater than a second preset threshold is level 2. By analogy, interaction levels respectively corresponding to different main interaction elements are obtained. In some embodiments of this application, an importance level of the main interaction element may be updated in real time or periodically.

For example, the electronic device obtains the use frequencies of the main interaction elements (for example, the previous chapter selection, the next chapter selection, the slide up/down control, the like button, the forward button, the comment view button, and the comment input box). The use frequencies of the previous chapter selection, the next chapter selection, and the slide up/down control are greater than the first preset threshold. The use frequencies of the like button and the forward button are less than the first preset threshold and greater than the second preset threshold. The use frequencies of the comment view button and the comment input box are less than the second preset threshold. In this case, the electronic device determines that the interaction levels of the previous chapter selection, the next chapter selection, and the slide up/down control are level 1; the electronic device determines that the interaction levels of the like button and the forward button are level 2; and the electronic device determines that the interaction levels of the comment view button and the comment input box are level 3.

Policy 2: Determine a level of a display element on an application interface based on a level of the application interface.

The electronic device may determine an interaction level of each application interface based on a preset interaction level list. For example, the interaction level list is shown in Table 1. Interaction levels of an incoming call notification interface, a video call request interface, an alarm reminder interface, and the like are relatively high, and are level 1. Interaction levels of a message notification interface, a schedule notification interface, and the like are relatively low, and are level 4. Different interfaces of a same application may have different levels. For example, a notification application includes an alarm reminder interface, a file transfer notification interface, and a schedule notification interface, and the foregoing interfaces correspond to different interface levels. The level of the display element on the application interface is the same as the level of the application interface. To be specific, if an interaction level of an E-book application interface is level 3, the electronic device may determine that an interaction level of a display element (for example, a like button or a forward button) included in the E-book application interface is level 3. If the interaction level of the video call request interface is level 1, the electronic device may determine that an interaction level of a display element (for example, a reject button 4091 or an answer button 4092) included in the video call request interface is level 1.

TABLE 1

| Application identifier | Interaction level |
| --- | --- |
| Phone application (incoming call notification interface)/Phone application (video call request interface)/Notification application (alarm reminder interface) | Level 1 |
| Notification application (file transfer notification interface) | Level 2 |
| E-book application (E-book application interface) | Level 3 |
| Notification application (message notification interface)/Notification application (schedule notification interface) | Level 4 |
| ... | ... |

Specifically, in some embodiments of this application, the main interaction element is displayed in the main interaction area and the main display element is displayed in the main display area based on the display element level by using the following policy.

Policy 1: The electronic device may perform level classification on the main interaction area to classify different areas of the main interaction area into different levels. The electronic device may display each display element based on the level classification of the main interaction area and the interaction level of each display element.

For example, the following describes a method for performing level classification on the main interaction area.

FIG. 14(1) and FIG. 14(2) are a schematic diagram of levels of a main interaction area according to an embodiment of this application. As shown in FIG. 14(1) and FIG. 14(2), the electronic device may obtain, through machine learning, an area in which the palm is continuously in contact with a screen when the user holds the electronic device with one hand, and a farthest distance within which a finger can touch the screen when the user holds the electronic device with the one hand; and determine an interaction area level based on the area and the distance. Details are as follows:

A right-hand operation is used as an example. When the user holds the electronic device with the right hand, a pressure sensor on a right bezel receives a grip force exerted by the user, and a pressure sensor on a left bezel is not stressed. Therefore, the electronic device may determine, by using the pressure sensor on the right bezel and the pressure sensor on the left bezel, whether the electronic device is held by the right hand. Similarly, the electronic device may determine whether the electronic device is held by the left hand.

The electronic device may record a farthest touch location when the electronic device is held by the right hand. The farthest touch location means that a distance from a touch location to a pressure sensor is the farthest. Therefore, a farthest distance (referred to as a first length below) within which a finger can touch the screen when the electronic device is held by the right hand is determined. The electronic device may record an area in which continuous contact is performed when the electronic device is held by the right hand, to determine an area (referred to as a first contact area below) in which the right palm is continuously in contact with the screen when the electronic device is held by the right hand. Similarly, the electronic device may record an area in which continuous contact is performed when the electronic device is held by the left hand, to determine an area (referred to as a second contact area below) in which the left palm is continuously in contact with the screen when the electronic device is held by the left hand; and record a farthest touch location when the electronic device is held by the left hand, to determine a farthest distance (referred to as a second length below) within which a finger can touch the screen when the user performs a left-hand operation.

The electronic device determines the interaction area level based on the first length, the second length, the first contact area, and the second contact area.

As shown in FIG. 14(1), a first arc 4025a is drawn by using a center W1 of the first contact area (for example, a contact area 4024a) as a circle center, using the first length as a radius, and using a point Q1 as a start point. A connection line between the point Q1 and the circle center W1 is parallel to an upper/lower boundary line of a main interaction area. A second arc 4025c is drawn between the point Q1 and a point Q2. The point Q2 is a point whose distance from the circle center W1 is 1/n of the first length. Similarly, a third arc 4025b is drawn by using a center W2 of a contact area 4024b as a circle center, using the second length as a radius, and using a point Q3 as a start point. A connection line between the point Q2 and the circle center W2 is parallel to an upper/lower boundary line of a main interaction area. A fourth arc 4025d is drawn between the point Q3 and a point Q4. The point Q4 is a point whose distance from the circle center W2 is 1/n of the second length. The electronic device determines that a closed area (for example, an area 4021) formed by the first arc 4025a, the second arc 4025c, the third arc 4025b, and the fourth arc 4025d is a level-1 interaction area; determine that an area other than the level-1 interaction area in a closed area formed by the first arc 4025a, the second arc 4025c, and a right boundary line of the main interaction area is a level-2 interaction area (for example, an area 4022a); determine that an area (for example, an area 4022b) other than the level-1 interaction area in a closed area formed by the third arc 4025b, the fourth arc 4025d, and a left boundary line of the main interaction area is a level-2 interaction area; and determine that an area other than the level-1 interaction area (for example, the area 4021) and the level-2 interaction areas (for example, the area 4022a and the area 4022b) in the main interaction area is a level-3 interaction area (for example, an area 4023). Alternatively, classification may not be performed on an interaction area whose level is below level 3.

It should be noted that, when the first length is greater than a distance from W1 to an upper right corner, or when the second length is greater than a distance from W2 to an upper left corner, the drawn first arc 4025a, second arc 4025c, third arc 4025b, and fourth arc 4025d may be shown in FIG. 14(2). In this case, a closed area formed by the first arc 4025a, the second arc 4025c, the third arc 4025b, the fourth arc 4025d, and the upper boundary line of the main interaction area is a level-1 interaction area (for example, the area 4021); an area other than the level-1 interaction area in a closed area formed by the first arc 4025a, the second arc 4025c, the upper boundary line of the main interaction area, and the right boundary line of the main interaction area is a level-2 interaction area (for example, an area 4022); and an area other than the level-1 interaction area in a closed area formed by the third arc 4025b, the fourth arc 4025d, the upper boundary line of the main interaction area, and the left boundary line of the main interaction area is a level-2 interaction area (for example, the area 4022).

Figure 15:
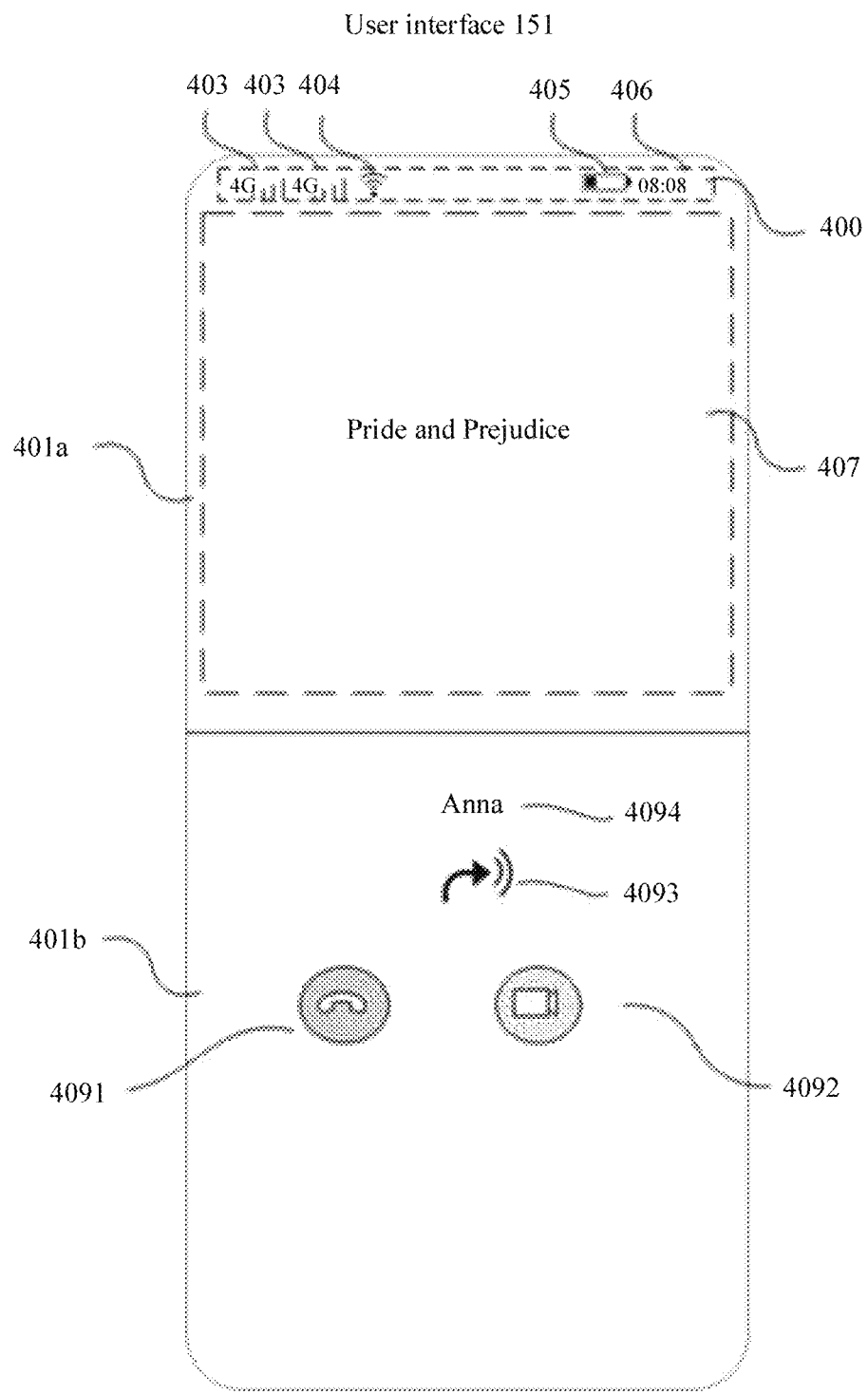

The electronic device displays the one or more display elements based on the level classification of the main interaction area and the interaction level of the display element. For example, as shown in FIG. 15, when the user uses an E-book application, the electronic device receives a video call request. The obtained display elements include display elements on an E-book application interface: text content, a previous chapter selection, a next chapter selection, a slide up/down control, a like button, a forward button, a comment view button, and a comment input box; and display elements on a video call request interface 402b: a call party name, a call party avatar, a reject button 4091, an answer button 4092, and a switch-to-voice answer button 4093. The electronic device determines the interaction level of each display element according to the policies 1 and 2; displays main interaction elements (for example, the reject button 4091 and the answer button 4092) whose interaction levels are level 1 in the level-1 interaction area; displays main interaction elements (for example, the switch-to-voice answer button 4093 and the call party avatar 4094) whose interaction levels are level 2 in the level-2 interaction area; and does not display a display element whose interaction level is level 3 in the main interaction area. It should be noted that "not displayed in the main interaction area" may mean "displayed in the main display area instead of the main interaction area" and "displayed in neither the main interaction area nor the main display area".

According to some embodiments of this application, display element level classification and display area level classification are performed; a display element of a relatively high interaction level is displayed in a main interaction area of a relatively high level, to help the user better operate the electronic device; and a display element of a relatively high display level is displayed in a main display area of a relatively high level, to help the user better view content displayed by the electronic device.

Optionally, the user may adjust a display location of each display element.

Figure 16A:
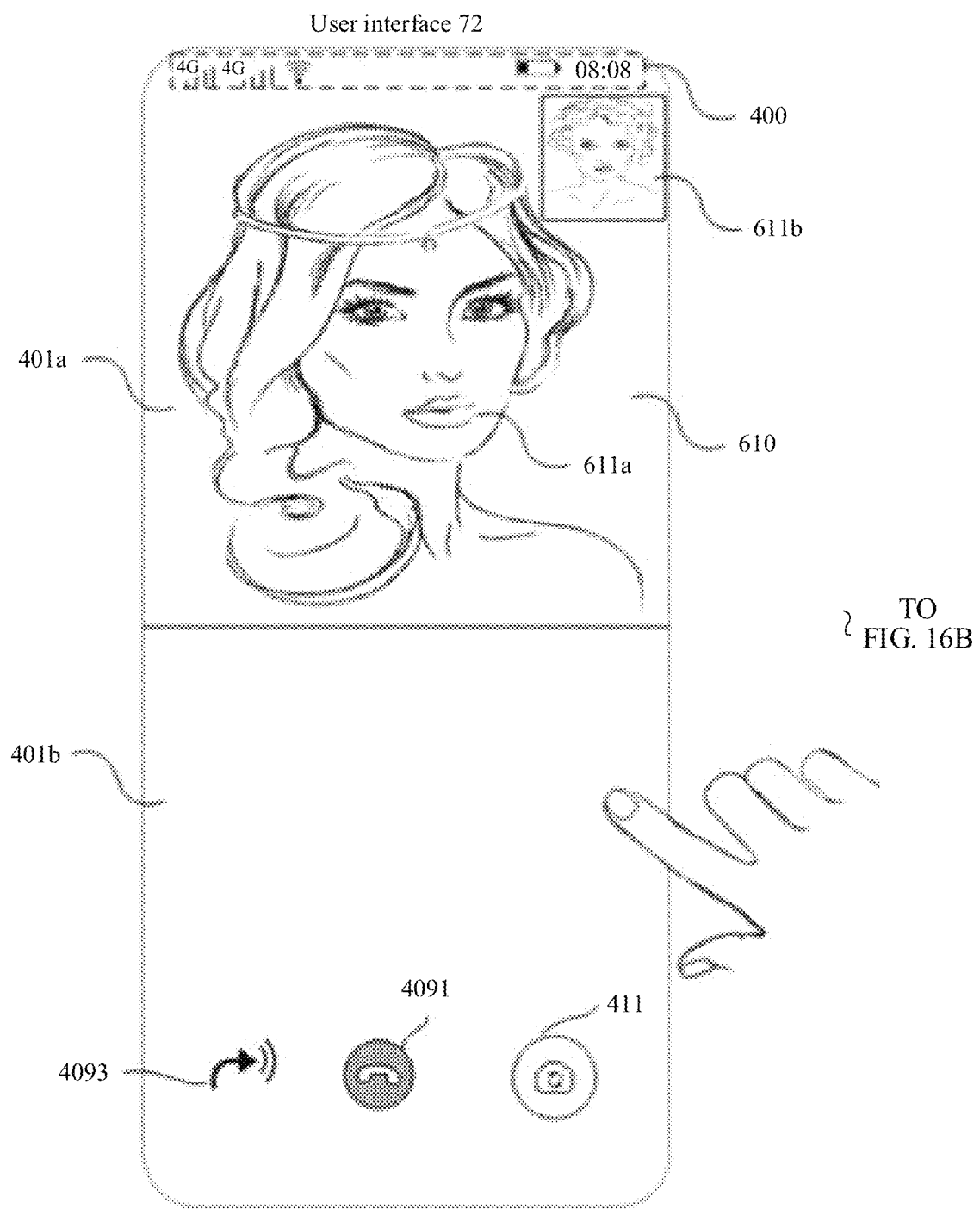
Figure 16B:
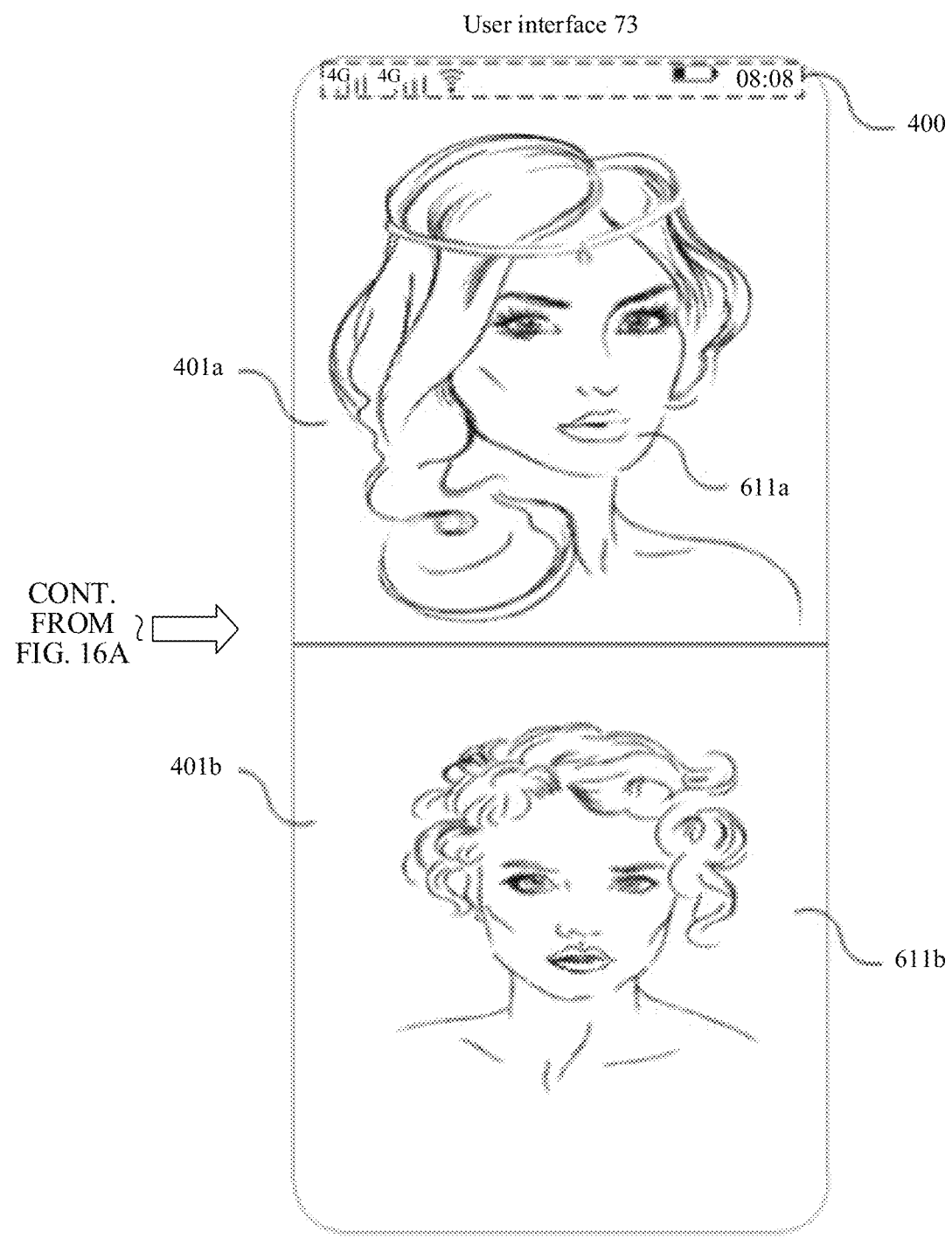

For example, in FIG. 16A and FIG. 16B, when the user interface 72 is displayed, if a preset user operation (for example, an operation of double tapping the main interaction area) is detected, the electronic device moves a video picture 611b of a call party displayed in the main display area (for example, the display area 401a) to the main interaction area (for example, the display area 401b) for display, and hides the voice answer button 4093, the reject button 4091, and the camera switch button 411 that are displayed in the main interaction area.

Figures 1, 17A:
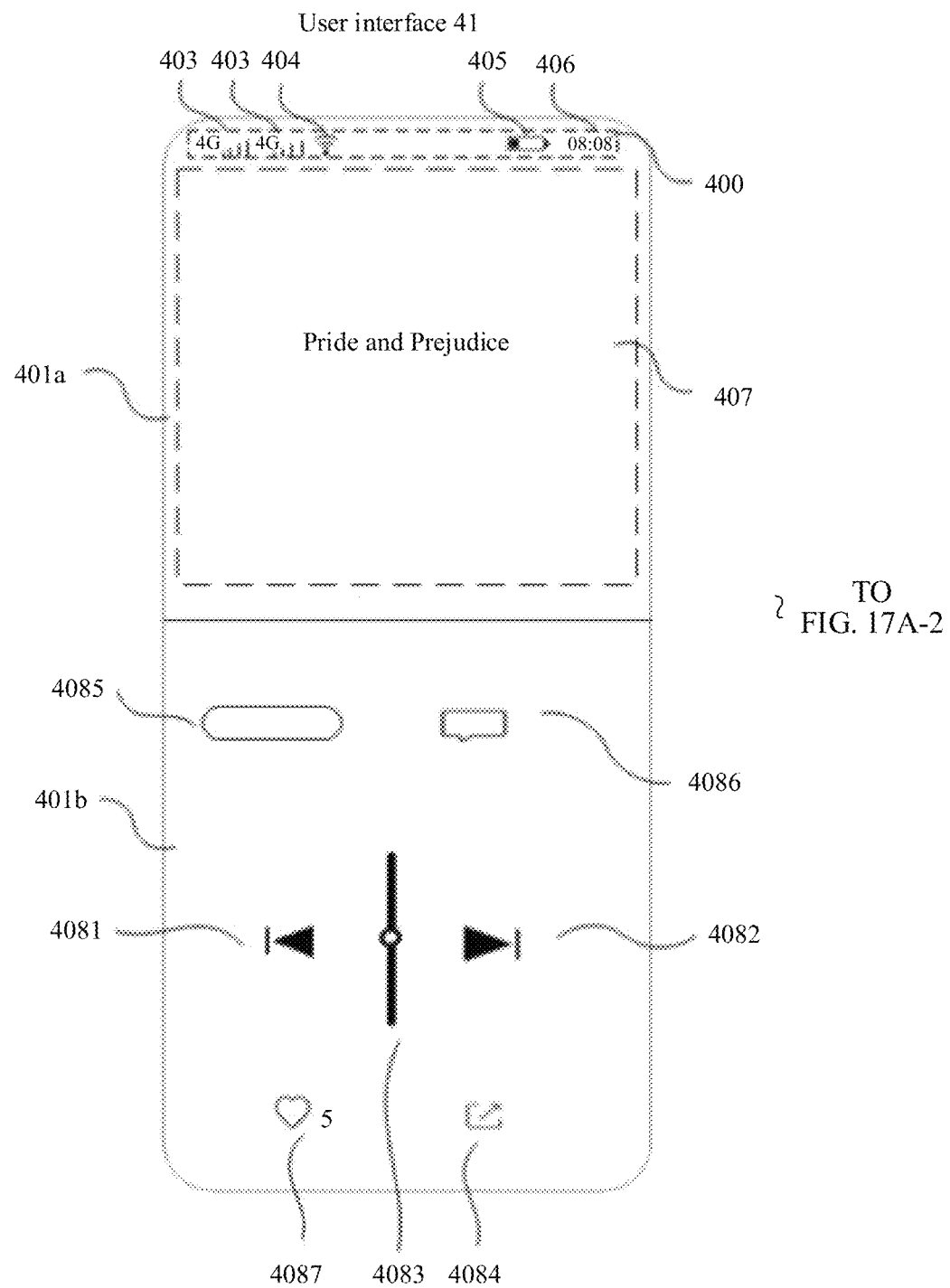
Figures 2, 17A:
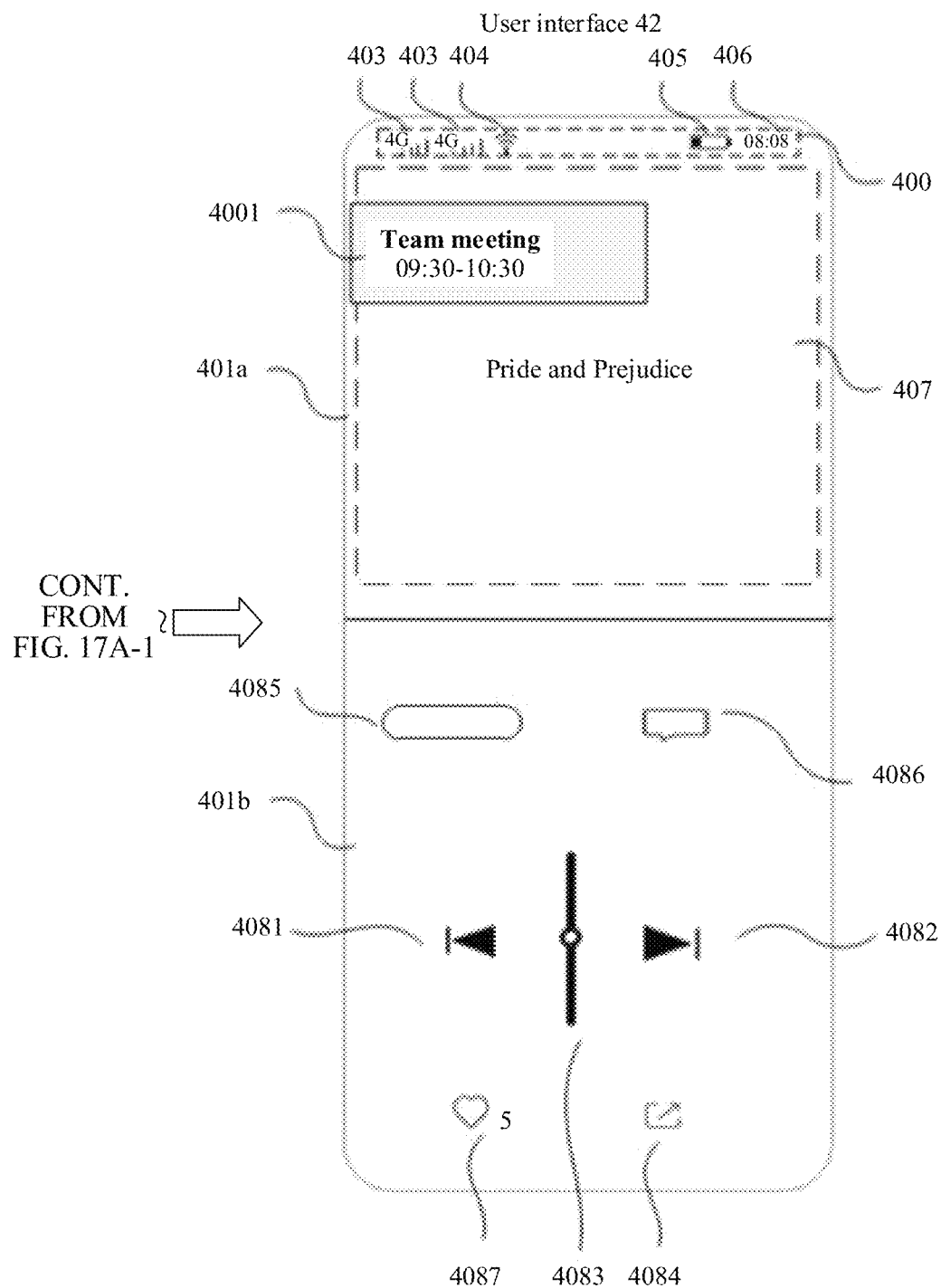
Figures 1, 17B:
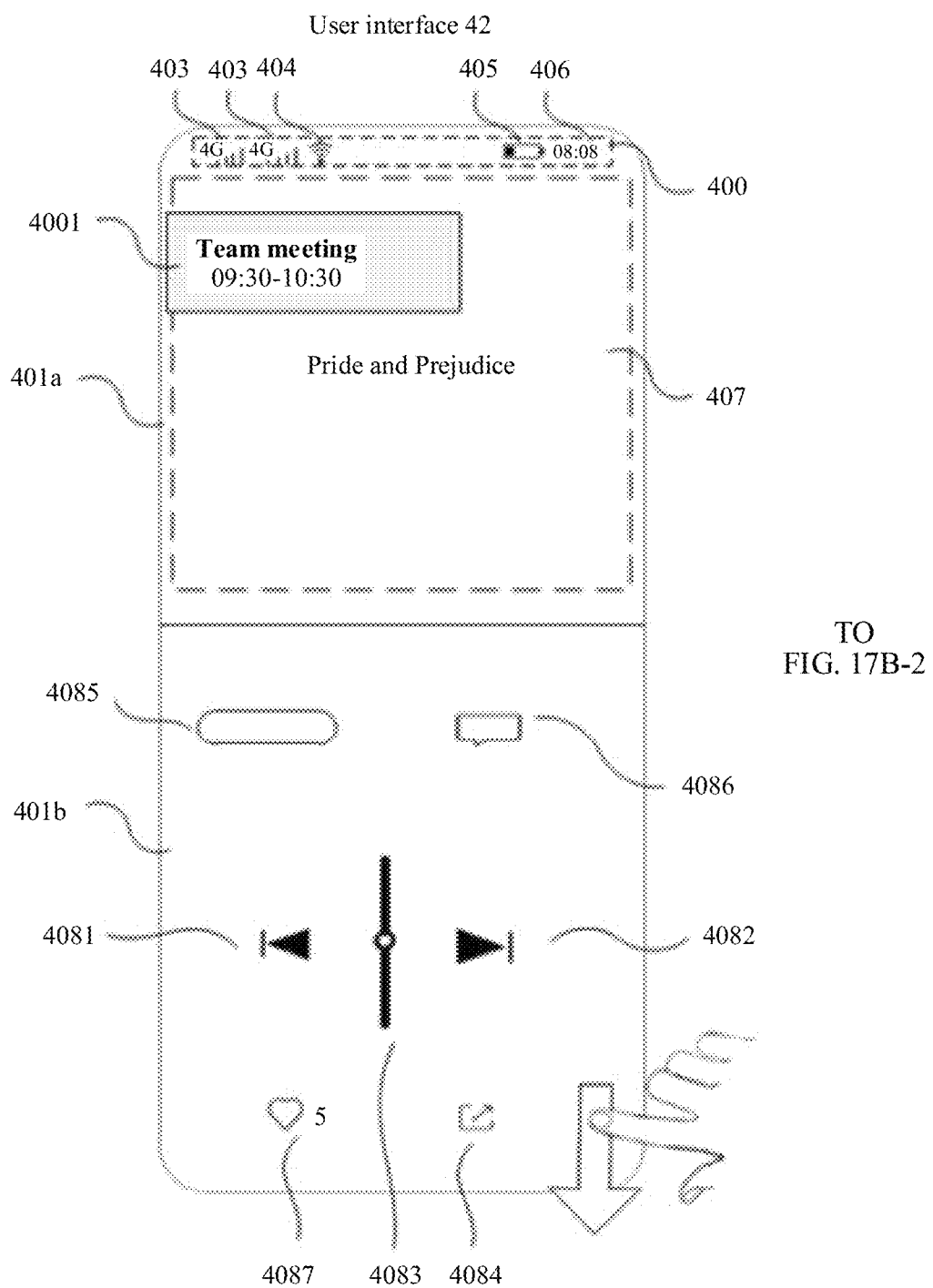
Figures 2, 17B:
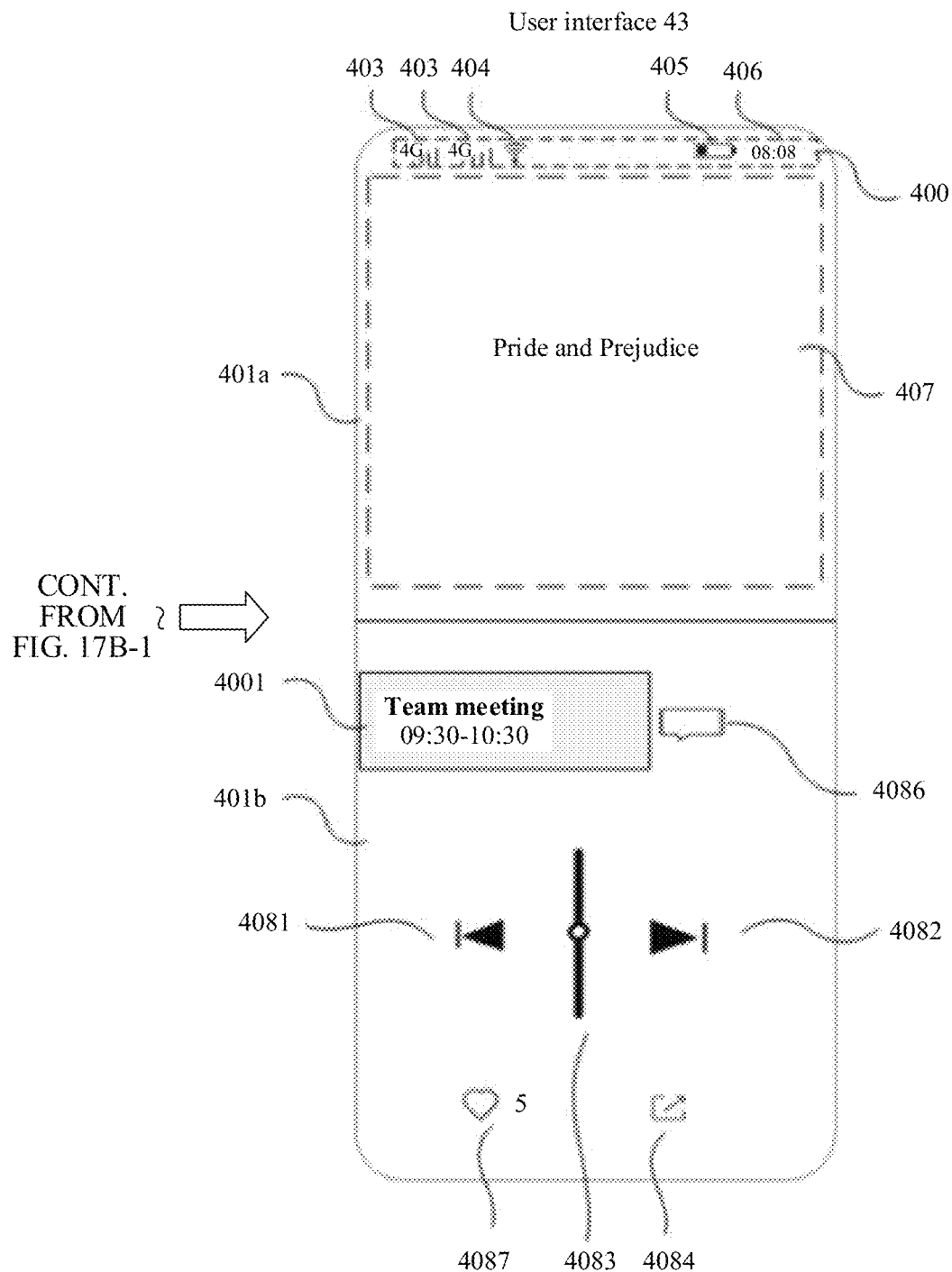
Figures 1, 18A:
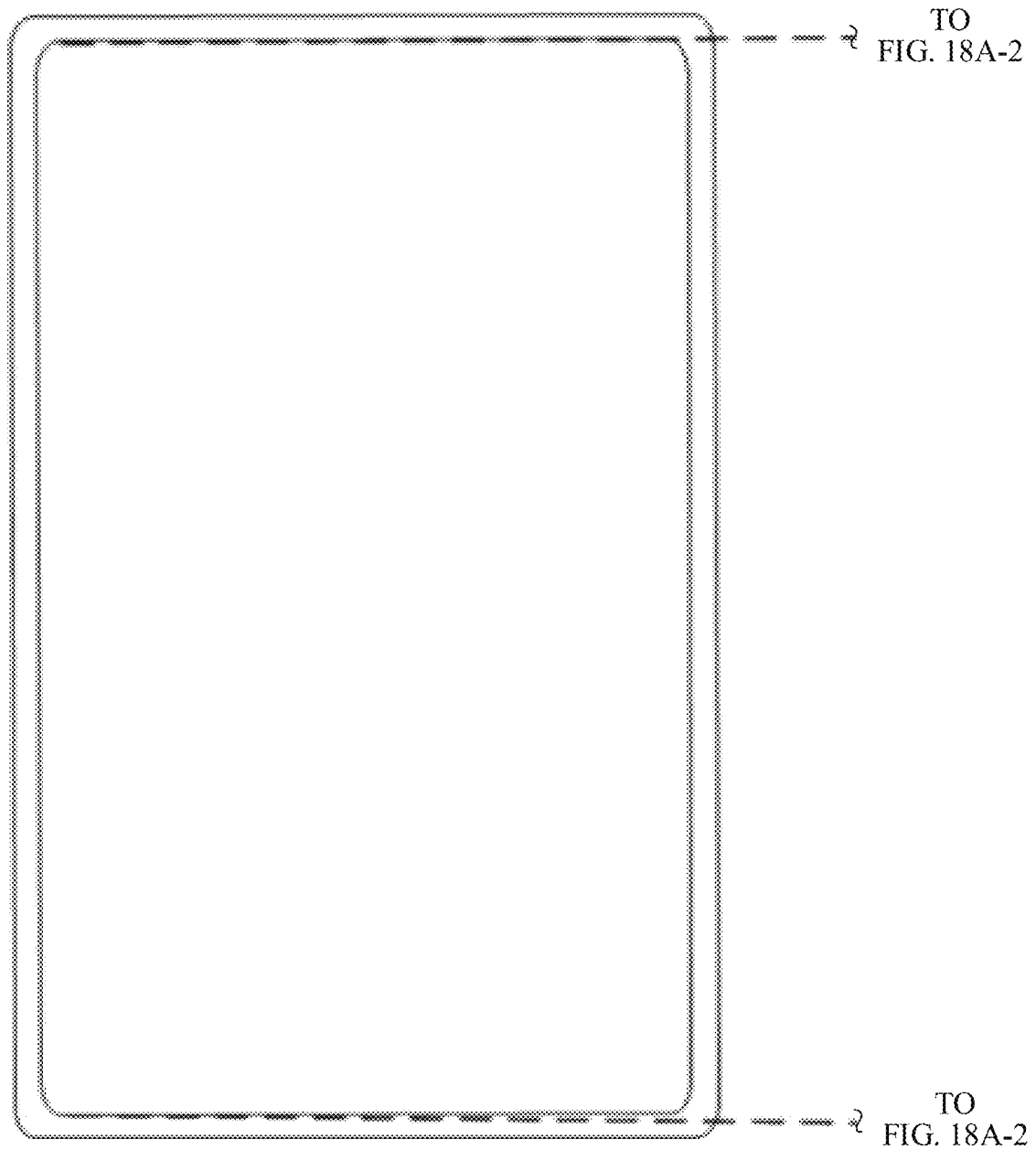
Figures 2, 18A:
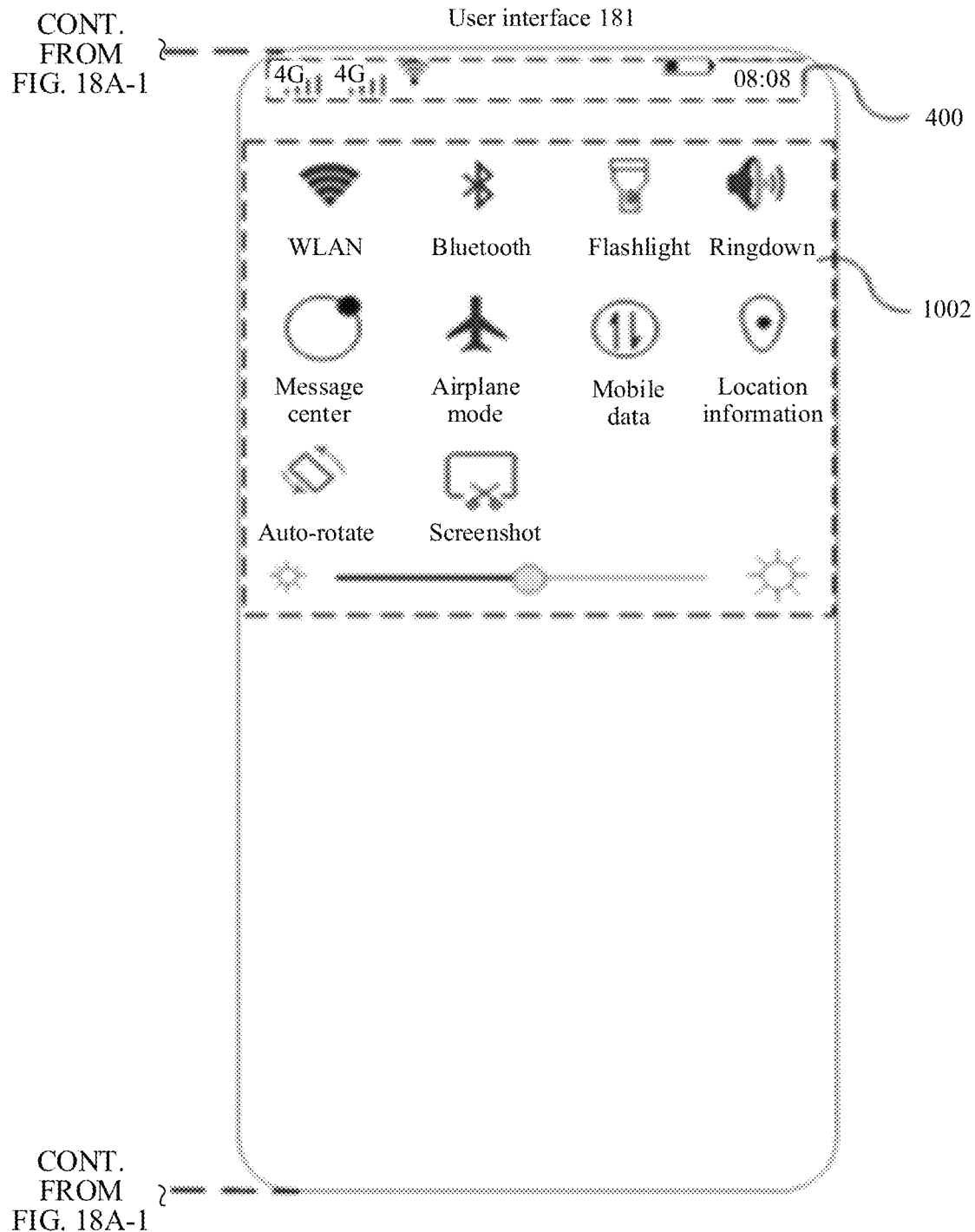
Figures 1, 18B:
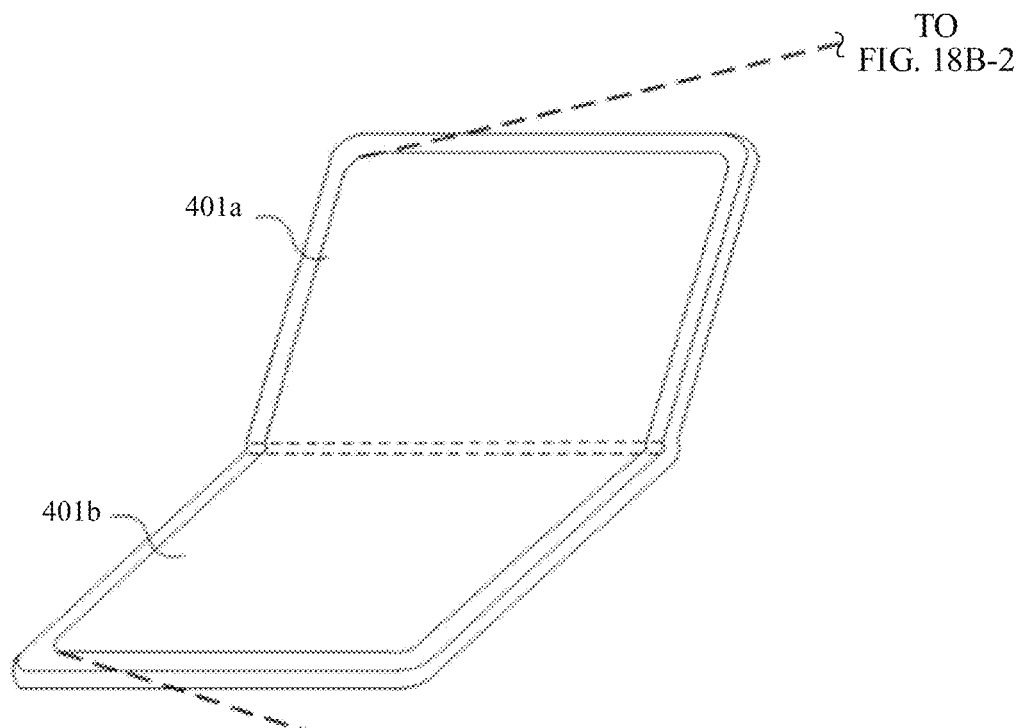
Figures 2, 18B:
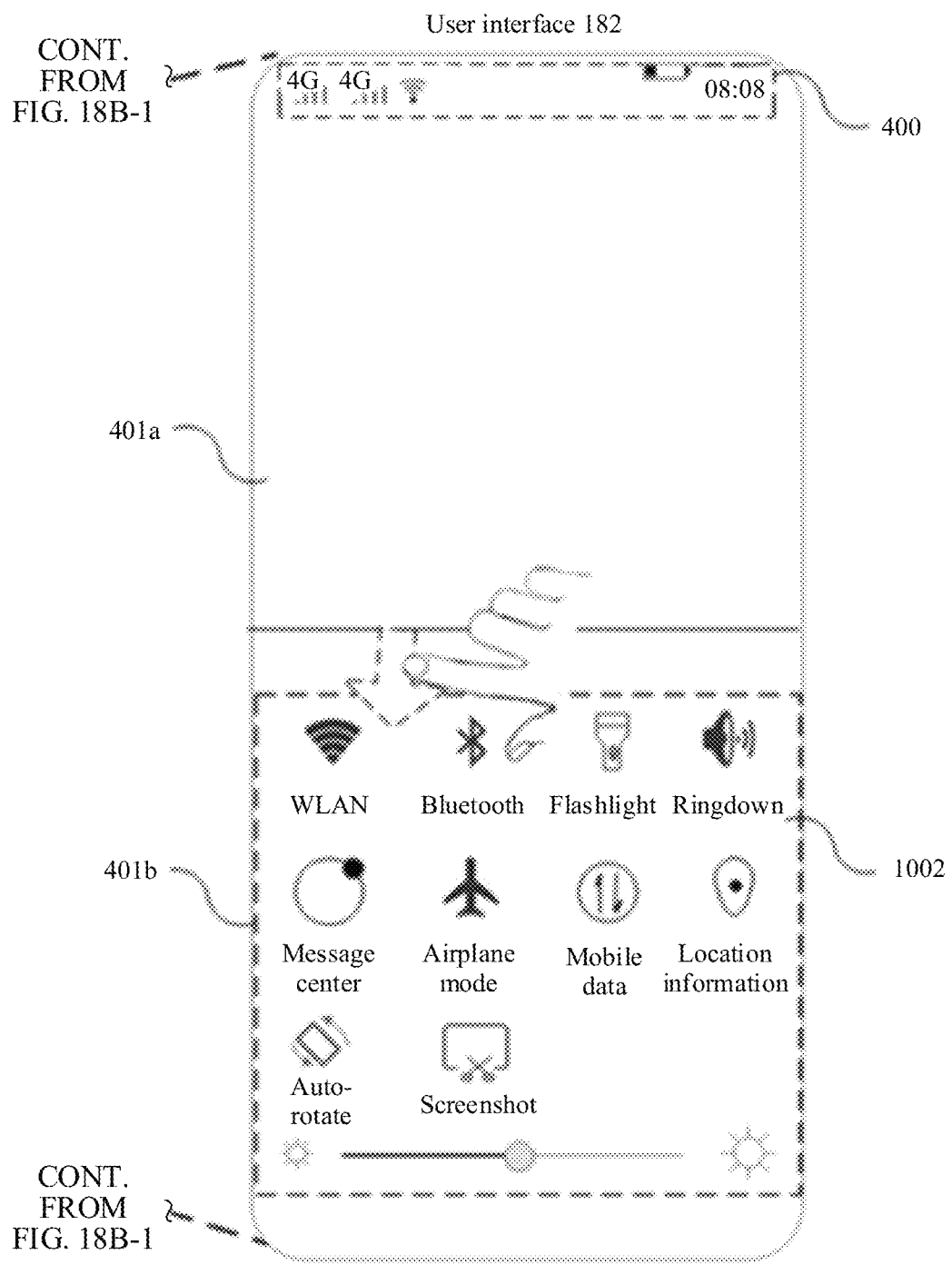
Figures 1, 19A:
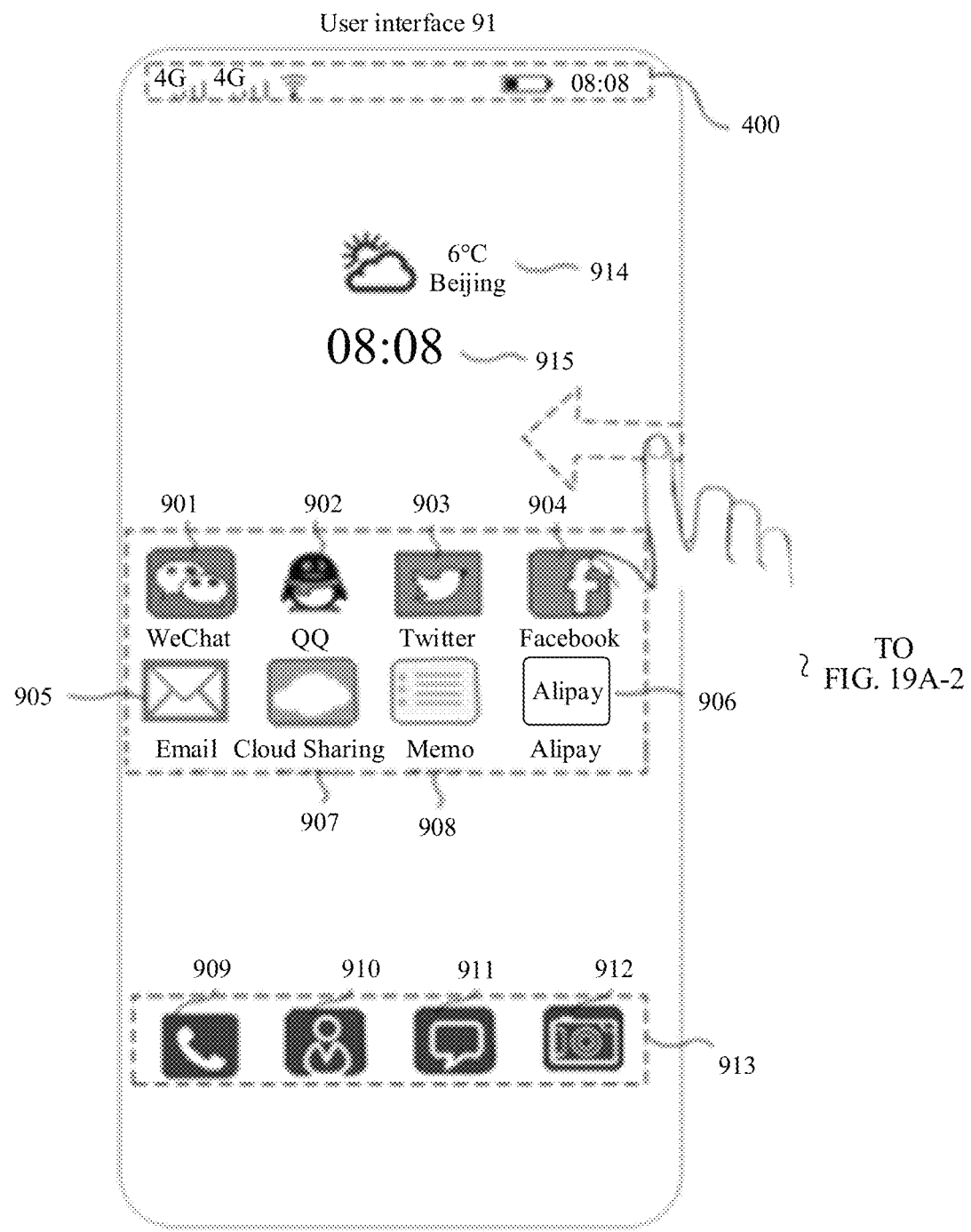
Figures 2, 19A:
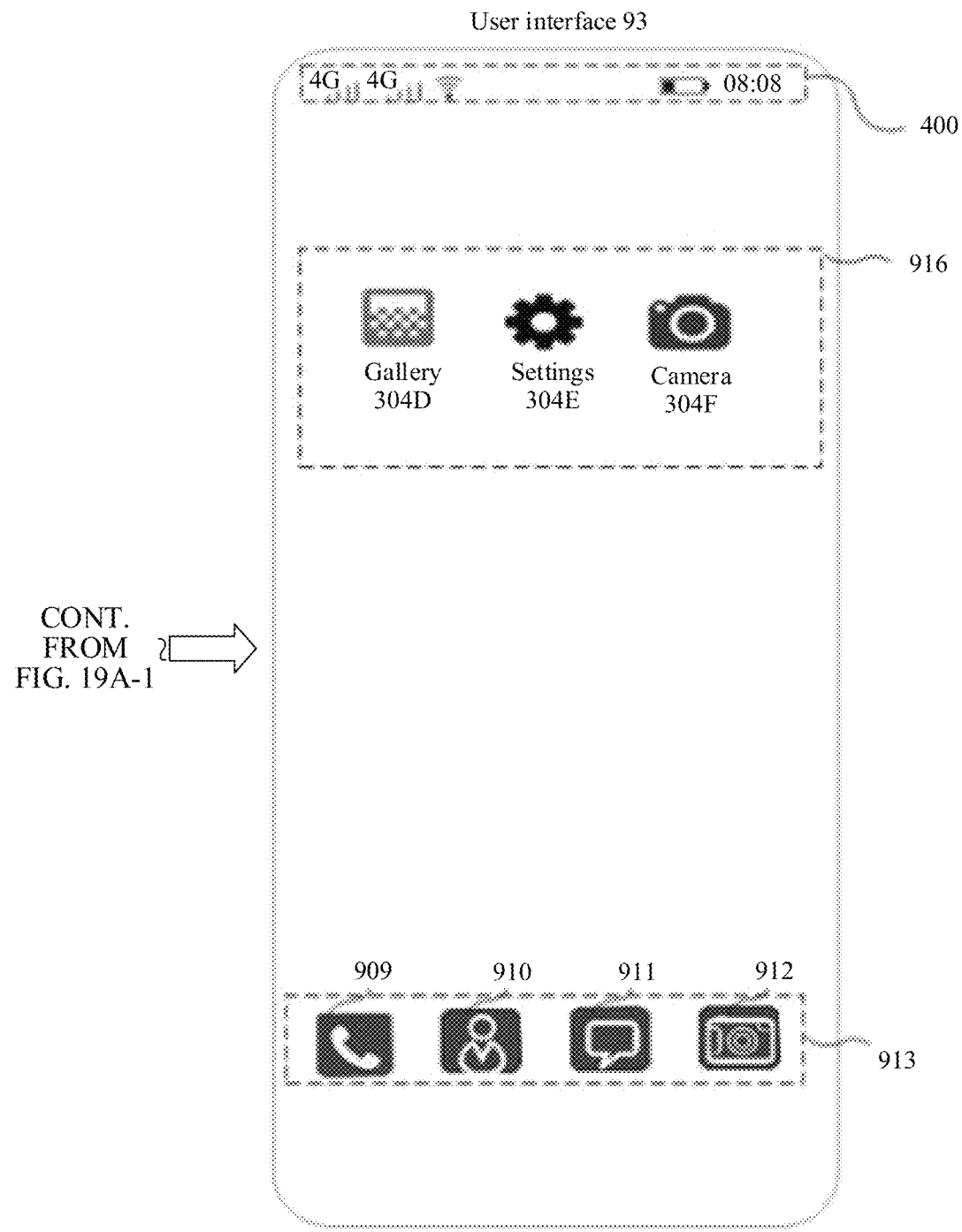
Figures 1, 19B:
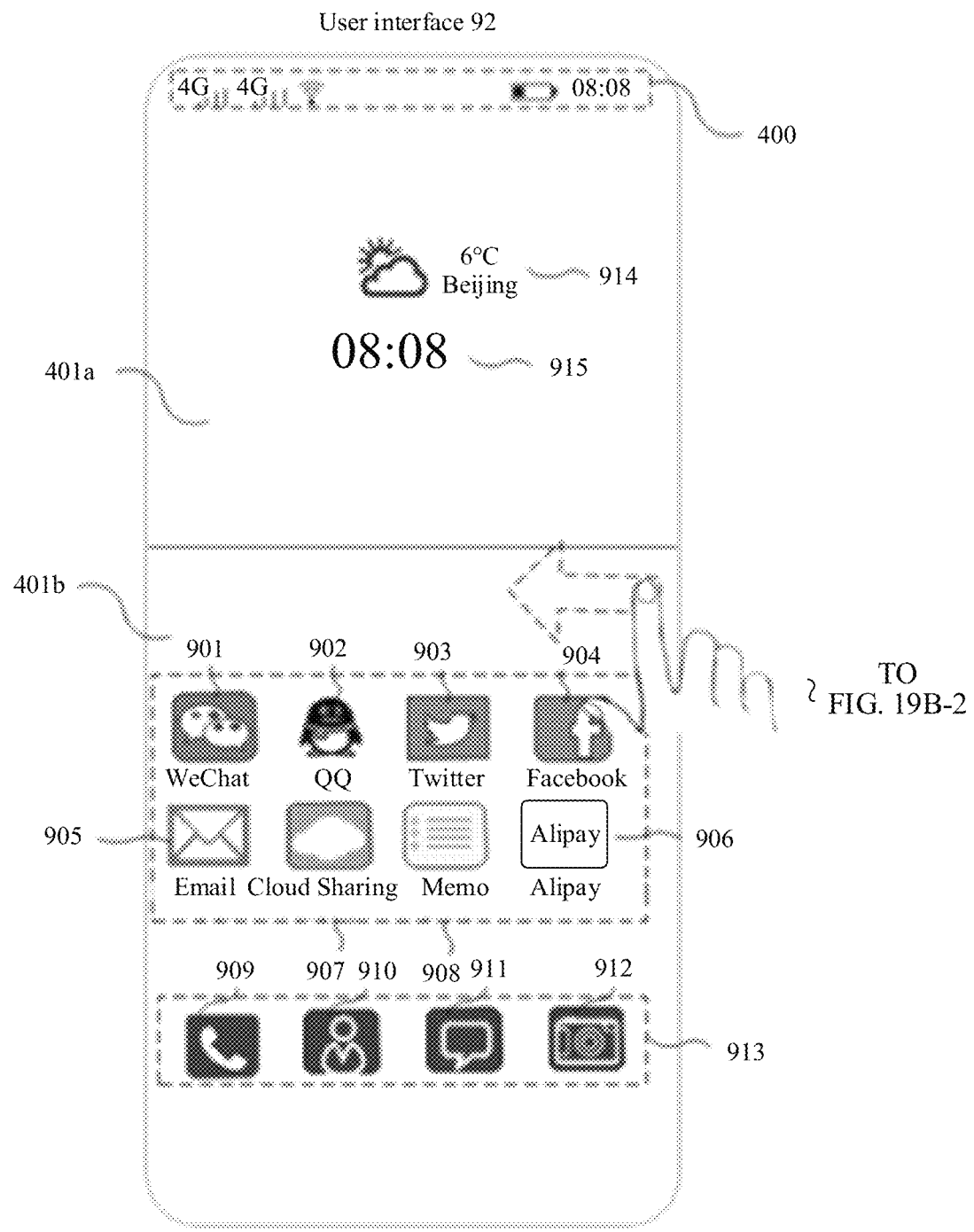
Figures 2, 19B:
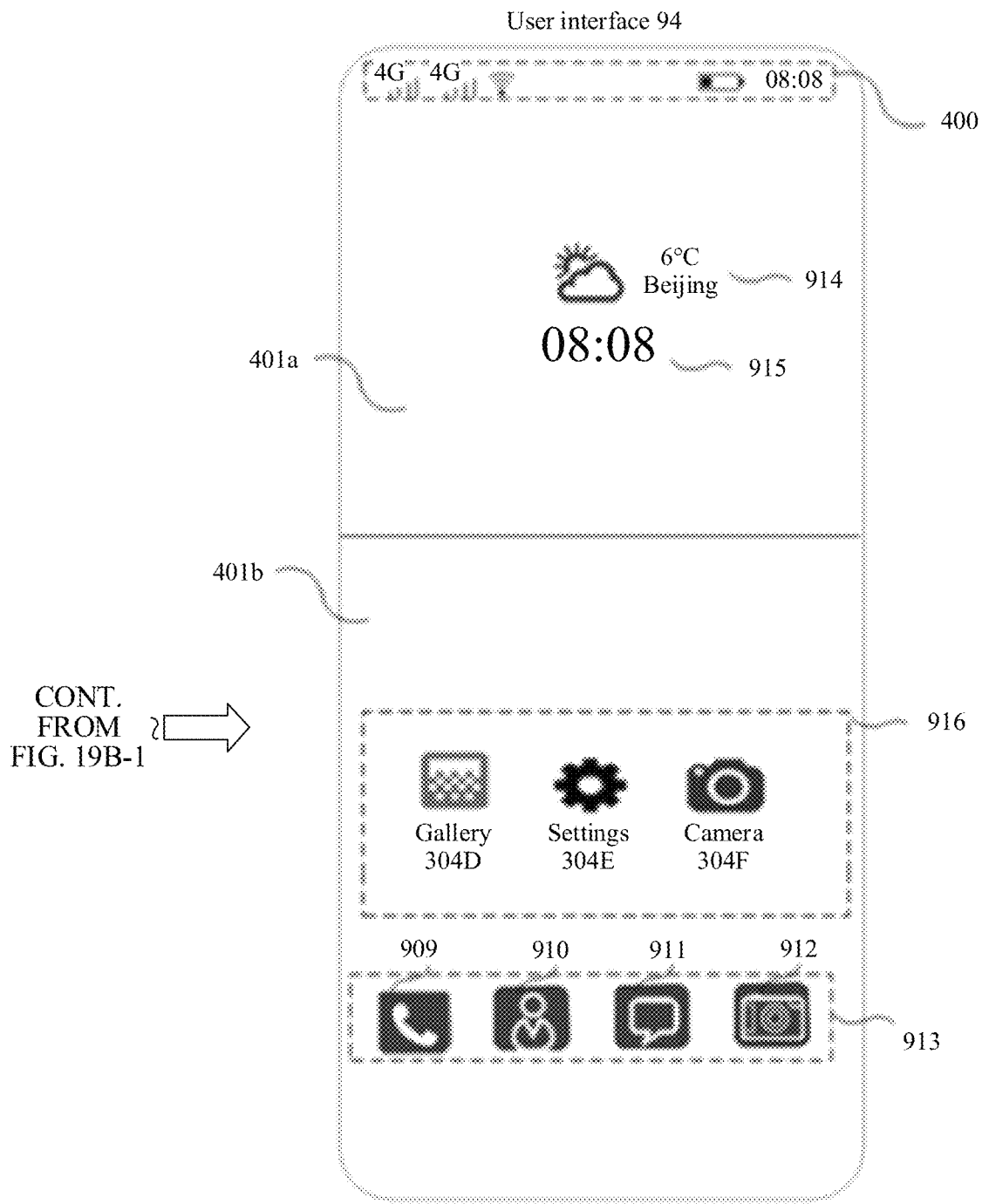

For example, FIG. 17A-1 and FIG. 17A-2 show a scenario in which the electronic device pops up a schedule notification message when the user reads an e-book. The electronic device determines that the schedule notification message 4001 is a main display element, and displays the schedule notification message 4001 in a main display area (for example, the display area 401a). The electronic device displays a user interface 42. As shown in FIG. 17B-1 and FIG. 17B-2, if a preset user operation (for example, an operation of sliding from top to bottom in a main interaction area) is detected within a preset time, the electronic device moves the display element (for example, the schedule notification message 4001) displayed in the main display area to the main interaction area (for example, the display area 401b) for display.

Optionally, in addition to performing display element adjustment that "the main display element is displayed in the main display area and the main interaction element is displayed in the main interaction area", the electronic device may further adjust a system operation.

For example, as shown in FIG. 18A-1 and FIG. 18A-2, and FIG. 18B-1 and FIG. 18B-2, the electronic device may adjust "displaying a notification bar 1002 in response to an operation of sliding downward from an upper edge of the display" to "displaying the notification bar 1002 in response to an operation of sliding downward from an upper edge of the main interaction area".

For another example, as shown in FIG. 19A-1 and FIG. 19A-2, and FIG. 19B-1 and FIG. 19B-2, the electronic device may adjust "the electronic device performs an operation of returning to a previous interface in response to an operation that the user slides inward from a right edge of the display" to "the electronic device performs an operation of returning to a previous interface in response to an operation that the user slides inward from a right edge of the main interaction area".

To implement the functions in the method provided in embodiments of this application, a terminal device may include a hardware structure and/or a software module, to implement the functions in a form of a hardware structure, a software module, or a hardware structure and a software module. Whether a function in the foregoing functions is performed by using the hardware structure, the software module, or the combination of the hardware structure and the software module depends on particular applications and design constraints of the technical solutions.

Figure 20:
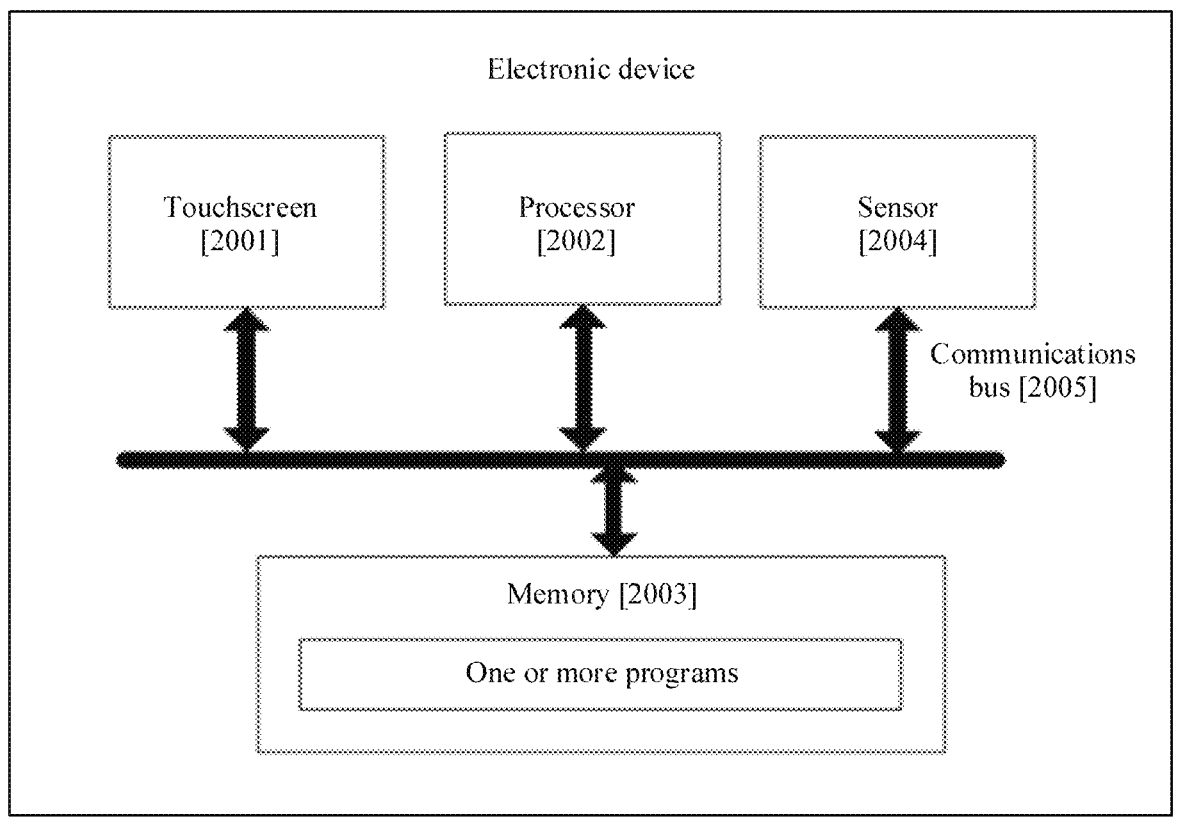
FIG. 20 is a schematic diagram of a structure of an electronic device according to an embodiment of this application.

As shown in FIG. 20, embodiments disclose an electronic device. The electronic device may include a touchscreen 2001, one or more processors 2002, a memory 2003, and a sensor 2004. The foregoing components may be connected through one or more communications buses 2005. The sensor 2009 may be an acceleration sensor, a gyroscope, or the like.

The memory 2003 may store one or more computer programs. The one or more computer programs are configured to be executed by the one or more processors 2002. The one or more computer programs include instructions. The foregoing instructions may be used to perform the steps in Embodiment 1.

The processor 2002 may be the processor 110, the sensor 2004 may be the sensor module 180, and the memory 2003 may be the internal memory 121. For detailed descriptions, refer to the descriptions in FIG. 1A to FIG. 1F. Details are not described herein again.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof without departing from the scope of the technical solutions of embodiments of this application.

What is claimed is:

1. A display method, performed by an electronic device comprising a first body and a second body, wherein the first body is bendable relative to the second body, the first body and the second body respectively correspond to first and second display areas of the electronic device and the method comprises:

when the electronic device is in an expanded state:
      displaying first notification information in the first display area;
      receiving a first user operation on the first display area;
      in response to the first user operation, displaying an interface corresponding to the first notification information; and when the state of the electronic device is in a folded state:
      displaying second notification information in the first display area;
      receiving a second user operation on the second display area;
      in response to the second user operation, moving the displayed second notification information from the first display area to the second display area;
      receiving a third user operation on the displayed second notification information; and
      in response to the third user operation, displaying an interface corresponding to the second notification information; and at least one of:
      when the electronic device is in the expanded state, receiving an operation of sliding downward from an upper edge of the combined first and second display areas and in response displaying a notification bar; and when the electronic device is in the folded state, receiving an operation of sliding downward from an upper edge of the second display area and in response displaying the notification bar; or
      when the electronic device is in the expanded state, receiving an operation of sliding inward from a right edge of the combined first and second display areas and in response returning to a first previous interface; and when the electronic device is in the folded state, receiving an operation of sliding inward from a right edge of the second display area and in response returning to a second previous interface,
wherein the second display area is below the first display area.

2. The method according to claim 1, further comprising: displaying a status bar at a top portion of the first display area.

3. The method to according to claim 2, wherein the status bar comprises:
a mobile communications signal, a Wi-Fi signal, a battery status indicator, or a time indicator.

4. The method according to claim 1, further comprising: displaying a three-button navigation button in a bottom portion of the second display area.

5. The method according to claim 1, wherein when the electronic device is in the folded state, an included angle between the first display area and the second display area is less than 180 degrees.

6. The method according to claim 1, further comprising:
determining the change from the expanded state to the folded state according to the angle between the first body and the second body.

7. An electronic device, comprising:
one or more processors;
a memory, configured to store computer instructions;
a touchscreen;
a first body; and
a second body, wherein
the first body is bendable relative to the second body, the first body and the second body respectively correspond to first and second display areas of the electronic device and
when the one or more processors execute the computer instructions, the electronic device is enabled to perform following operations:
when the electronic device is in an expanded state:
displaying first notification information in the first display area;
receiving a first user operation on the first display area;
in response to the first user operation, displaying an interface corresponding to the first notification information; and
when the state of the electronic device is in a folded state:
displaying second notification information;
receiving a second user operation on the second display area;
in response to the second user operation, moving the displayed second notification information from the first display area to the second display area;
receiving a third user operation on the displayed second notification information; and
in response to the third user operation, displaying an interface corresponding to the second notification information; and
at least one of:
when the electronic device is in the expanded state, receiving an operation of sliding downward from an upper edge of the combined first and second display areas and in response displaying a notification bar; and when the electronic device is in the folded state, receiving an operation of sliding downward from an upper edge of the second display area and in response displaying the notification bar; or
when the electronic device is in the expanded state, receiving an operation of sliding inward from a right edge of the combined first and second display areas and in response returning to a first previous interface;
and when the electronic device is in the folded state, receiving an operation of sliding inward from a right edge of the second display area and in response returning to a second previous interface,
wherein the second display area is below the first display area.

8. The electronic device according to claim 7, wherein when the one or more processors execute the computer instructions, the electronic device is enable to further perform:
display the status bar at a top portion of the first display area.

9. The electronic device according to claim 8,
wherein the status bar comprising:
a mobile communications signal, a Wi-Fi signal, a battery status indicator, or a time indicator.

10. The electronic device according to claim 7, wherein when the one or more processors execute the computer instructions, the electronic device is enable to further perform:
displaying a three-button navigation button in a bottom portion of the second display area.

11. The electronic device according to claim 7,
wherein when the electronic device is in the folded state, an included angle between the first display area and the second display area is less than 180 degrees.

12. The electronic device according to claim 7, wherein when the one or more processors execute the computer instructions, the electronic device is enable to further perform:
determining the changes from the expanded state to the folded state according to the angle between the first body and the second body.

13. A non-transitory computer-readable storage medium, wherein the computer-readable storage medium stores a computer program, and when the computer program is executed by a processor of an electronic device comprising a first display area and a second display area, the computer program causes the electronic device to perform the following operations:
when the electronic device is in an expanded state:
displaying first notification information in the first display area;
receiving a first user operation on the first display area;
in response to the first user operation, displaying an interface corresponding to the first notification information; and
when the state of the electronic device is in a folded state:
displaying second notification information in the first display area;
receiving a second user operation on the second display area;
in response to the second user operation, moving the displayed second notification information from the first display area to the second display area;
receiving a third user operation on the displayed second notification information; and
in response to the third user operation, displaying an interface corresponding to the second notification information; and
at least one of:
when the electronic device is in the expanded state, receiving an operation of sliding downward from an upper edge of the combined first and second display areas and in response displaying a notification bar; and when the electronic device is in the folded state, receiving an operation of sliding downward from an upper edge of the second display area and in response displaying the notification bar; or when the electronic device is in the expanded state, receiving an operation of sliding inward from a right edge of the combined first and second display areas and in response returning to a first previous interface; and when the electronic device is in the folded state, receiving an operation of sliding inward from a right edge of the second display area and in response returning to a second previous interface, wherein the second display area is below the first display area.

14. The method according to claim 1, wherein the second notification information is a notification message.

15. The method according to claim 1, wherein the second notification information is a notification bar.

16. The method according to claim 1, further comprising returning to a previous interface in response to an operation that the user slides inward from an edge of the display.

\* \* \* \* \*